US 8,736,753 B2

(12) United States Patent
Kaga et al.

(10) Patent No.: US 8,736,753 B2
(45) Date of Patent: May 27, 2014

(54) CAMERA BODY AND IMAGE PICKUP UNIT ATTACHABLE TO AND DETACHABLE FROM CAMERA BODY, AND IMAGING APPARATUS

(75) Inventors: Ryota Kaga, Tokyo (JP); Atsushi Sato, Yokohama (JP); Junichi Shinohara, Yokohama (JP); Shu Kambe, Fujisawa (JP); Takashi Tada, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 101 days.

(21) Appl. No.: 13/392,959

(22) PCT Filed: Sep. 13, 2010

(86) PCT No.: PCT/JP2010/066121
§ 371 (c)(1),
(2), (4) Date: Feb. 28, 2012

(87) PCT Pub. No.: WO2011/030928
PCT Pub. Date: Mar. 17, 2011

(65) Prior Publication Data
US 2012/0154665 A1    Jun. 21, 2012

(30) Foreign Application Priority Data

Sep. 14, 2009  (JP) .................................. 2009-211446
Oct. 19, 2009  (JP) .................................. 2009-240596
Nov. 5, 2009   (JP) .................................. 2009-254029

(51) Int. Cl.
*H04N 5/225*     (2006.01)
*G03B 17/02*     (2006.01)

(52) U.S. Cl.
USPC ........................................ 348/373; 396/541

(58) Field of Classification Search
USPC ........... 348/373–376; 396/529–533, 535, 541
See application file for complete search history.

(56) References Cited

U.S. PATENT DOCUMENTS 7,106,959 B2    9/2006  Sato
7,259,923 B2    8/2007  Nuno et al.
(Continued)

FOREIGN PATENT DOCUMENTS

JP    2921879       4/1999
JP    11 305315    11/1999
(Continued)

OTHER PUBLICATIONS

International Search Report Issued Dec. 21, 2010 in PCT/JP10/66121 Filed Sep. 13, 2010.

(Continued)

*Primary Examiner* — Tuan Ho
*Assistant Examiner* — Shahbaz Nazrul
(74) *Attorney, Agent, or Firm* — Oblon, Spivak, McClelland, Maier & Neustadt, L.L.P.

(57) ABSTRACT

A camera body includes a recess to which an image pickup unit is detachably attached to be placed therein. The image pickup unit includes a housing having an optical system, an image pickup device, a first connector section. The recess has three wall sections including a back wall section facing a rear of the housing of the image pickup unit and a side wall section facing a side surface of the housing when the image pickup unit is placed in the recess. The side wall section includes a second connector section to be connected to the first connector section to perform communication. The back wall section is provided with a controlling member. A rear of the image pickup unit has an insertion opening into which the controlling member is to be inserted and an abutting section to allow the controlling member to abut thereon. When the image pickup unit is attached to the recess, the first connector section and the second connector section are connected to each other when the controlling member is inserted into the insertion opening, and the first connector section is not connected to the second connector section when the controlling member abuts on the abutting section.

20 Claims, 49 Drawing Sheets

(56) References Cited

U.S. PATENT DOCUMENTS

| | | |
|---|---|---|
| 7,280,147 B2 | 10/2007 | Kitajima et al. |
| 7,286,164 B2 | 10/2007 | Shinohara et al. |
| 7,477,454 B2 | 1/2009 | Shinohara et al. |
| 7,505,216 B2 | 3/2009 | Nuno |
| 7,643,750 B2 | 1/2010 | Irisawa et al. |
| 7,664,385 B2 | 2/2010 | Shinohara et al. |
| 7,683,939 B2 | 3/2010 | Shinohara et al. |
| 2002/0176020 A1 | 11/2002 | Kawaguchi et al. |
| 2004/0062545 A1 | 4/2004 | Ushiro |
| 2005/0062876 A1* | 3/2005 | Okutani et al. ............... 348/371 |
| 2005/0200737 A1 | 9/2005 | Shinohara et al. |
| 2006/0088314 A1 | 4/2006 | Matsushita et al. |
| 2006/0228110 A1* | 10/2006 | Senba ........................... 396/529 |
| 2007/0058972 A1 | 3/2007 | Misawa |
| 2007/0086772 A1 | 4/2007 | Shinohara |
| 2007/0268371 A1* | 11/2007 | Misawa et al. ........... 348/207.99 |
| 2008/0024654 A1 | 1/2008 | Shinohara |
| 2008/0043419 A1 | 2/2008 | Tatsukami |
| 2008/0043423 A1 | 2/2008 | Tatsukami et al. |
| 2008/0218622 A1 | 9/2008 | Shinohara |
| 2011/0102668 A1 | 5/2011 | Kaga et al. |
| 2011/0109790 A1 | 5/2011 | Shinohara et al. |
| 2011/0216237 A1* | 9/2011 | Shinohara et al. ............ 348/373 |
| 2013/0141640 A1* | 6/2013 | Kim et al. ..................... 348/375 |

FOREIGN PATENT DOCUMENTS

| | | |
|---|---|---|
| JP | 2000 106640 | 4/2000 |
| JP | 2000 187268 | 7/2000 |
| JP | 2002 354310 | 12/2002 |
| JP | 2003 32531 | 1/2003 |
| JP | 2004 109970 | 4/2004 |
| JP | 2005 354177 | 12/2005 |
| JP | 2006 119498 | 5/2006 |
| JP | 3835533 | 10/2006 |
| JP | 2007 78827 | 3/2007 |
| JP | 2007 174040 | 7/2007 |
| JP | 2008 46882 | 2/2008 |
| JP | 2008 71333 | 3/2008 |
| JP | 2008 276079 | 11/2008 |
| JP | 2009 181719 | 8/2009 |
| JP | 2009 252457 | 10/2009 |
| WO | WO2010061960 * | 6/2010 |

OTHER PUBLICATIONS

Korean Office Action mailed on Jan. 27, 2014 in corresponding Korean Application No. 10-2012-7009658.

* cited by examiner

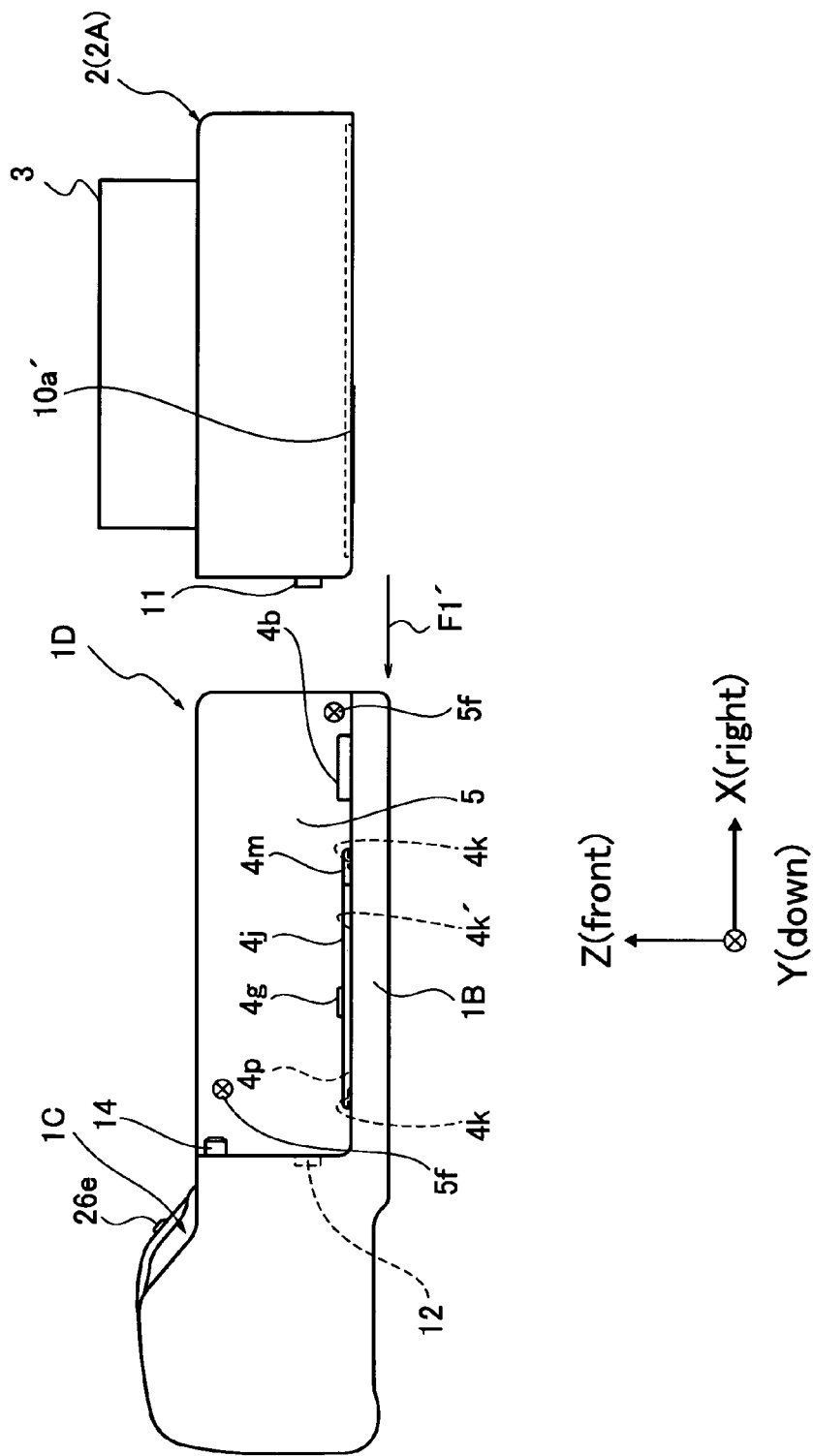

CAMERA BODY AND IMAGE PICKUP UNIT ATTACHABLE TO AND DETACHABLE FROM CAMERA BODY, AND IMAGING APPARATUS

TECHNICAL FIELD

The present invention relates to improvements of a camera body which an image pickup unit is attached to or detached from, an image pickup unit which is attached to or detached from the camera body, and an imaging apparatus including a combination of the image pickup unit and the camera body.

BACKGROUND ART

Conventionally, an imaging apparatus in which an image pickup unit is detachably attachable to a camera body has been known (see Japanese Patent Application Publication No. 2005-354177, for example).

In this conventional imaging apparatus, a camera body has a housing recess to which an image pickup unit is detachably attached to be housed therein. The housing recess includes a back wall section, and includes an upper wall section, a lower wall section and a side wall section which are integrally formed with the back wall section. In the camera body, an attachment/detachment opening is provided on the side far from the side wall section, the attachment/detachment opening being formed of the back wall section, the upper wall section, and the lower wall section.

In the conventional imaging apparatus, the image pickup unit is housed in the camera body by placing the image pickup unit in front of the attachment/detachment opening and pushing the image pickup unit toward the side wall section along the back wall section. On the other hand, the image pickup unit is removed from the camera body by pulling the image pickup unit out in a direction away from the side wall section along the back wall section.

However, although the imaging apparatus is configured so that the image pickup unit is attached to or detached from the camera body while being guided along the upper wall section and the lower wall section, the conventional imaging apparatus has a problem that it is difficult to accurately and smoothly connect the camera body and the image pickup unit to each other when detachably attaching the image pickup unit to the camera body.

SUMMARY OF INVENTION

The present invention has been made in light of the circumstances described above, and an object of the present invention is to provide a camera body and an image pickup unit to be attached to and detached from the camera body, the camera body and the image pickup unit being connectable to each other accurately and smoothly when the image pickup unit is detachably attached to the camera body, and to provide an imaging apparatus.

A camera body according to an embodiment of the present invention includes a recess to which an image pickup unit is detachably attached to be placed therein. The image pickup unit includes an optical system configured to guide light incoming from a subject, an image pickup device configured to convert a subject image guided by the optical system into an electrical signal, an image-pickup-unit connector section configured to perform communication with outside, and a housing configured to house the optical system, the image pickup device, and the image-pickup-unit connector section. The recess includes three wall sections; one of the three wall sections being a back wall section facing a rear of the housing of the image pickup unit when the image pickup unit is placed in the recess, another one of the three walls being a side wall section facing a side surface of the housing of the image pickup unit when the image pickup unit is placed in the recess and including a camera-body connector section to be connected to the image-pickup-unit connector section to perform communication. The back wall section is provided with a controlling member. A rear of the image pickup unit is provided with an insertion opening into which the controlling member is configured to be inserted and a controlling member abutting section configured to allow the controlling member to abut thereon. When the image pickup unit is attached to the recess, the image-pickup-unit connector section and the camera-body connector section are connected to each other when the controlling member is inserted into the insertion opening, and the image-pickup-unit connector section and the camera-body connector section are not connected to each other when the controlling member abuts on the controlling member abutting section.

BRIEF DESCRIPTION OF DRAWINGS

FIG. 37G is a view explaining how the image pickup unit is attached to the camera body shown in FIG. 37A.

MODE FOR CARRYING OUT THE INVENTION

An inventive embodiment according to one embodiment of the present invention will be explained hereinafter with reference to the drawings.

Embodiments

Figure 4:
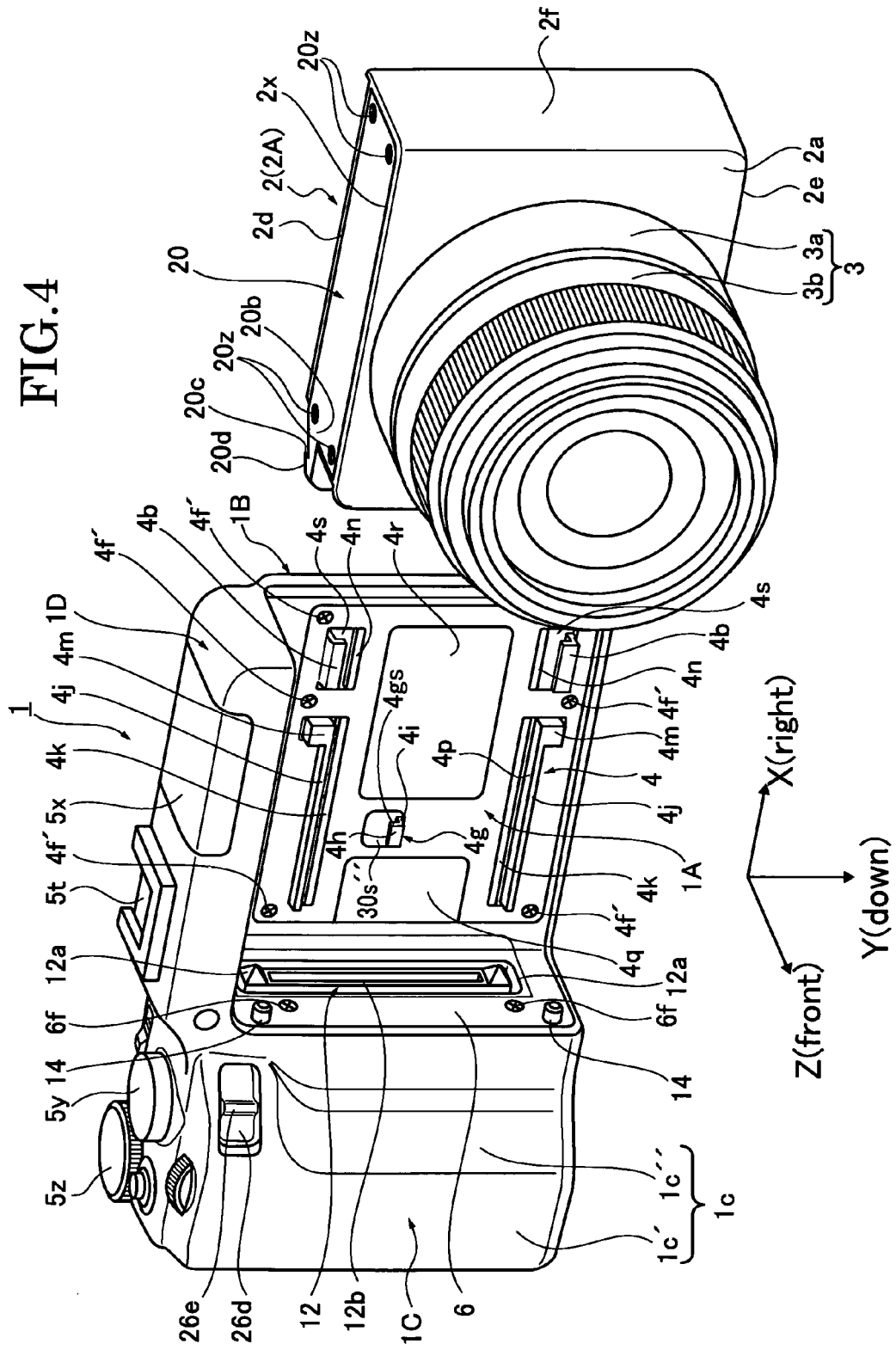
FIG. 4 is an explanatory diagram showing a state before the image pickup unit is attached to the camera body shown in FIG. 1 or a state after the image pickup unit is pulled out of the camera body, and a view of the camera body and the image pickup unit according to an embodiment 1 of the present invention as viewed from the front side and from a right oblique direction.

In an imaging apparatus according to an embodiment of the present invention having a camera body 1 and an image pickup unit 2, for example, as shown in FIG. 4, the camera body 1 includes a recess 1A to which an image pickup unit 2 is detachably attached to be placed therein. The image pickup unit 2 includes an optical system configured to guide light incoming from a subject, an image pickup device configured to convert a subject image guided by the optical system into an electrical signal, an image-pickup-unit connector section 11 configured to perform communication with outside, and a housing 2A configured to house the optical system, the image pickup device, and the image-pickup-unit connector section 11. The recess 1A includes three wall sections; one of the three wall sections being a back wall section 1B facing a rear of the housing of the image pickup unit when the image pickup unit is placed in the recess, another one of the three walls being a side wall section 1C facing a side surface of the housing of the image pickup unit 2 when the image pickup unit 2 is placed in the recess 1A and including a camera-body connector section 12 to be connected to the image-pickup-unit connector section 11 to perform communication. The back wall section 1B is provided with a controlling member 4g. A rear of the image pickup unit 2 is provided with an insertion opening 10h into which the controlling member 4g is configured to be inserted and a controlling member abutting section 10h' configured to allow the controlling member 4g to abut thereon. When the image pickup unit 2 is attached to the recess 1A, the image-pickup-unit connector section 11 and the camera-body connector section 12 are connected to each other when the controlling member 4g is inserted into the insertion opening 10h, and the image-pickup-unit connector section 11 and the camera-body connector section 12 are not connected to each other when the controlling member 4g abuts on the controlling member abutting section 10h'.

(Outline Description of Camera Body 1 and Image Pickup Unit 2)

Figure 1:
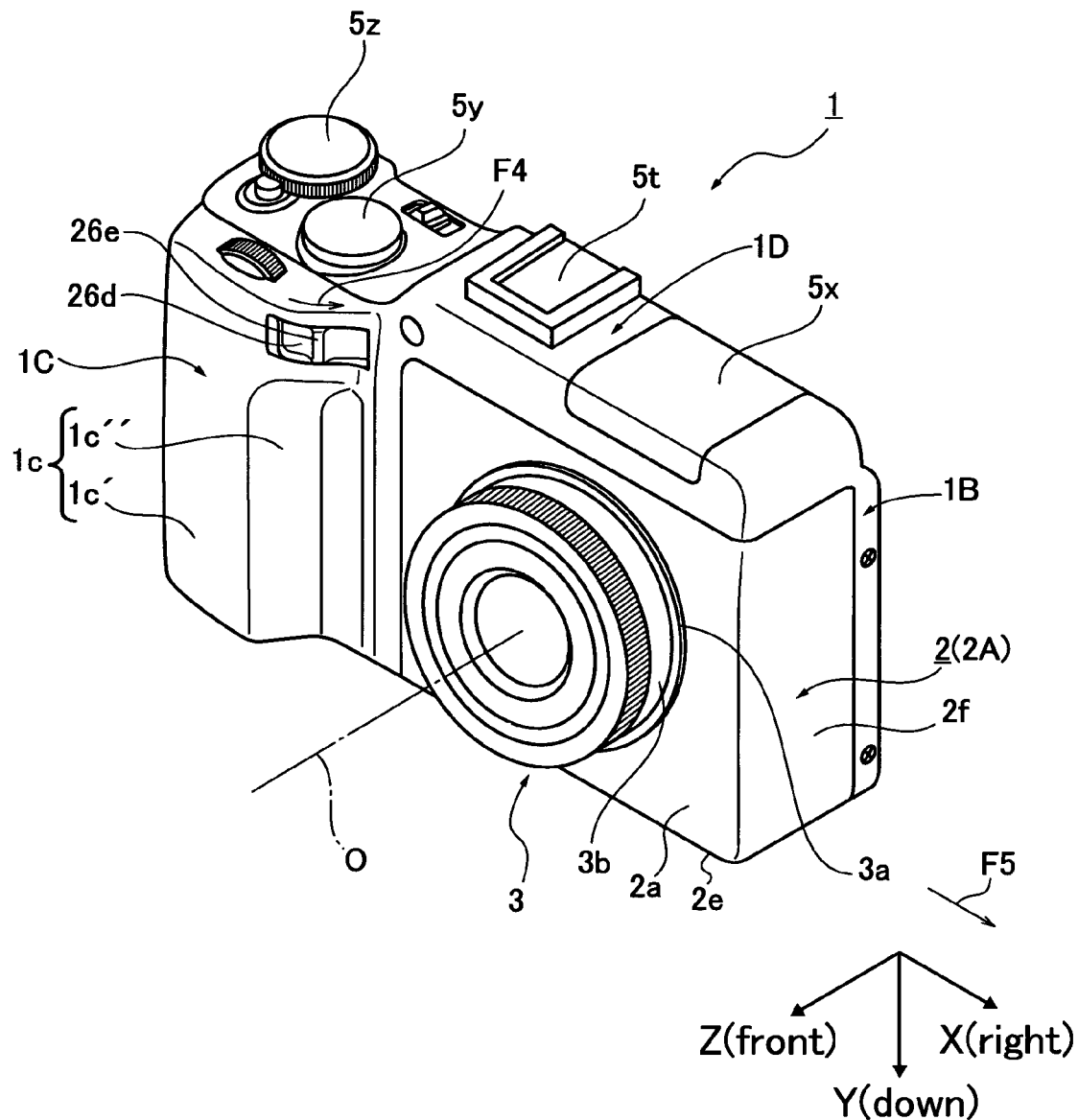
FIG. 1 is an explanatory diagram showing a state where a camera body and an image pickup unit to which the present invention is applied are attached to each other, and an external view of an imaging apparatus including the camera body and the image pickup unit as viewed from a front oblique direction.
Figure 2:
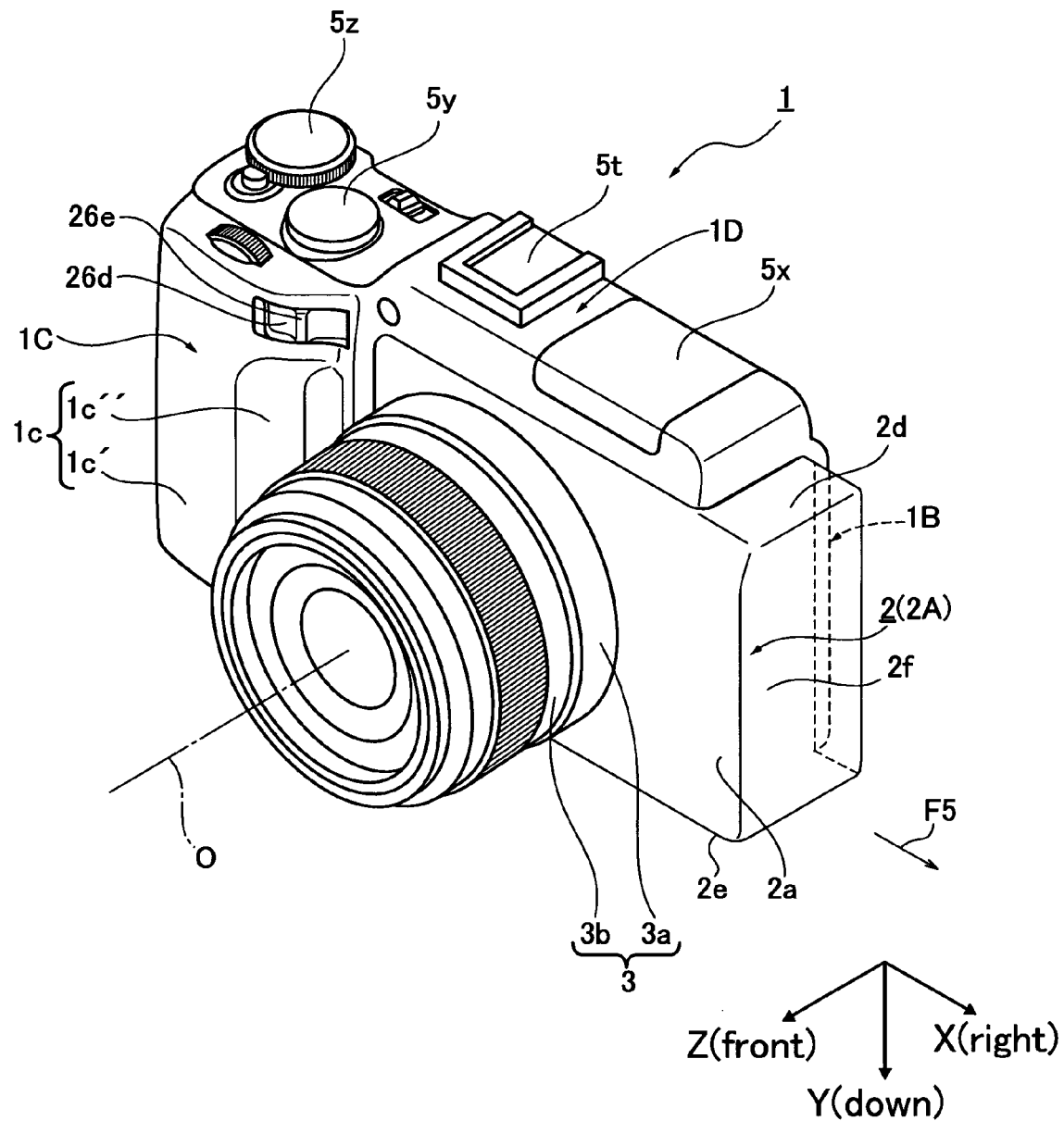
FIG. 2 is an explanatory diagram showing a state where an image pickup unit, which is different from the image pickup unit shown in FIG. 1, is attached to the camera body to which the present invention is applied, and an external view of an imaging apparatus including the camera body and the image pickup unit as viewed from a front oblique direction.
Figure 3:
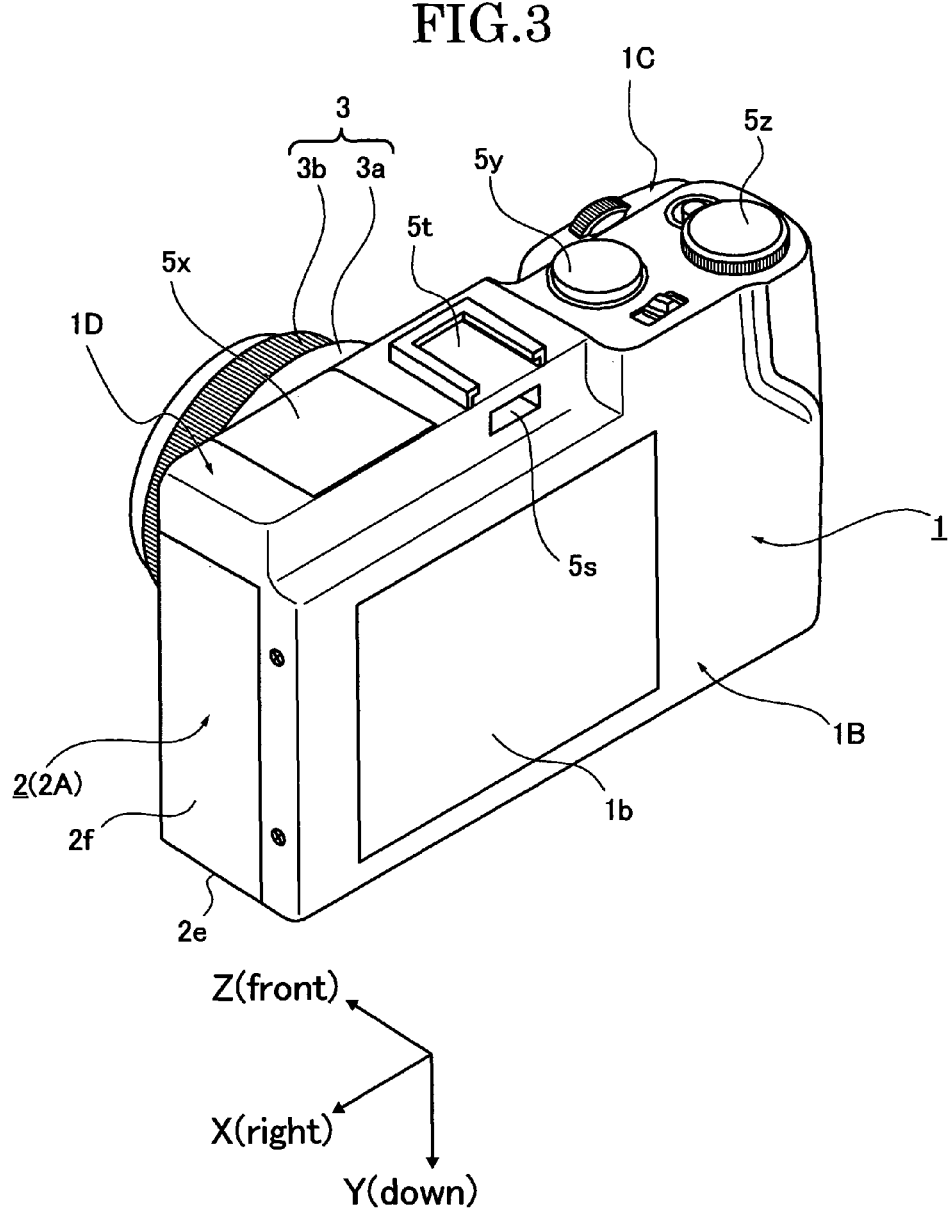
FIG. 3 is an external view of the image pickup unit shown in FIG. 1 as viewed from the rear side.

FIGS. 1 to 3 show a state where an image pickup unit having a cuboid shaped housing according to an embodiment of the present invention is attached to a camera body. FIGS. 1 and 2 show the camera body which the image pickup unit is attached to and which is viewed from a front oblique direction, and FIG. 3 shows the camera body in FIG. 1 viewed from a rear oblique direction.

In FIGS. 1 to 3, numeral 1 designates the camera body and 2 the image pickup unit. The image pickup unit 2 has a cuboid-shaped housing 2A. Here, the image pickup unit 2 includes an interchangeable lens barrel unit which includes an image pickup optical system and an image pickup device. FIG. 2 shows a state where an image pickup unit 2 having a housing 2A that has different size from the image pickup unit 2 attached to the camera body 1 shown in FIG. 1 is attached to the camera body 1.

The size of an image pickup device placed inside the housing 2A of the image pickup unit 2 shown in FIG. 2 is different from that of an image pickup device placed inside the housing 2A of the image pickup unit 2 shown in FIG. 1.

That housing 2A has a lens barrel 3 on its front face 2a. As shown in FIG. 4, the image pickup unit 2 can be attached to and detached from the camera body 1. FIG. 4 shows a state where the image pickup unit 2 shown in FIG. 1 is pulled out of the camera body shown in FIG. 1.

As shown in FIGS. 1, 2, and 4, the lens barrel 3 includes a guiding cylinder 3a and a movable barrel 3b. The movable barrel 3b is placed on the guiding cylinder 3a so that the movable barrel 3b can advance or retreat in a direction in which an optical axis O extends. A lens system such as zoom lens or the like is provided on the movable barrel 3b. The image pickup optical system including the lens system directs light incoming from a subject to the image pickup device, and the subject image is formed on the image pickup device which converts incident light into an electrical signal.

The Z direction in FIG. 1 is a direction parallel to an optical axis direction of the image pickup optical system (lens system) of the lens barrel 3 with the image pickup unit 2 attached to the camera body 1, and referred to as a front-back direction in this embodiment. A positive side of the Z direction is the front face side of the camera (front side) and a negative side of the Z direction is a rear side (back side) of the camera.

The X direction in FIG. 1 is a direction perpendicular to the optical axis direction of the image pickup optical system (lens system) of the lens barrel 3 with the image pickup unit 2 attached to the camera body 1, and referred to as a left-right direction in this embodiment. A positive side of the X direction is right side and a negative side of the X direction is left side.

The Y direction in FIG. 1 is a direction perpendicular to the optical axis direction of the image pickup system (lens system) of the lens barrel 3 with the image pickup unit 2 attached to the camera body 1, and referred to as an up-down direction in this embodiment. A positive side of the Y direction is a lower side and a negative side of the Y direction is an upper side.

(Embodiment 1)
(Detailed Description of Camera Body 1)

Figure 5A:
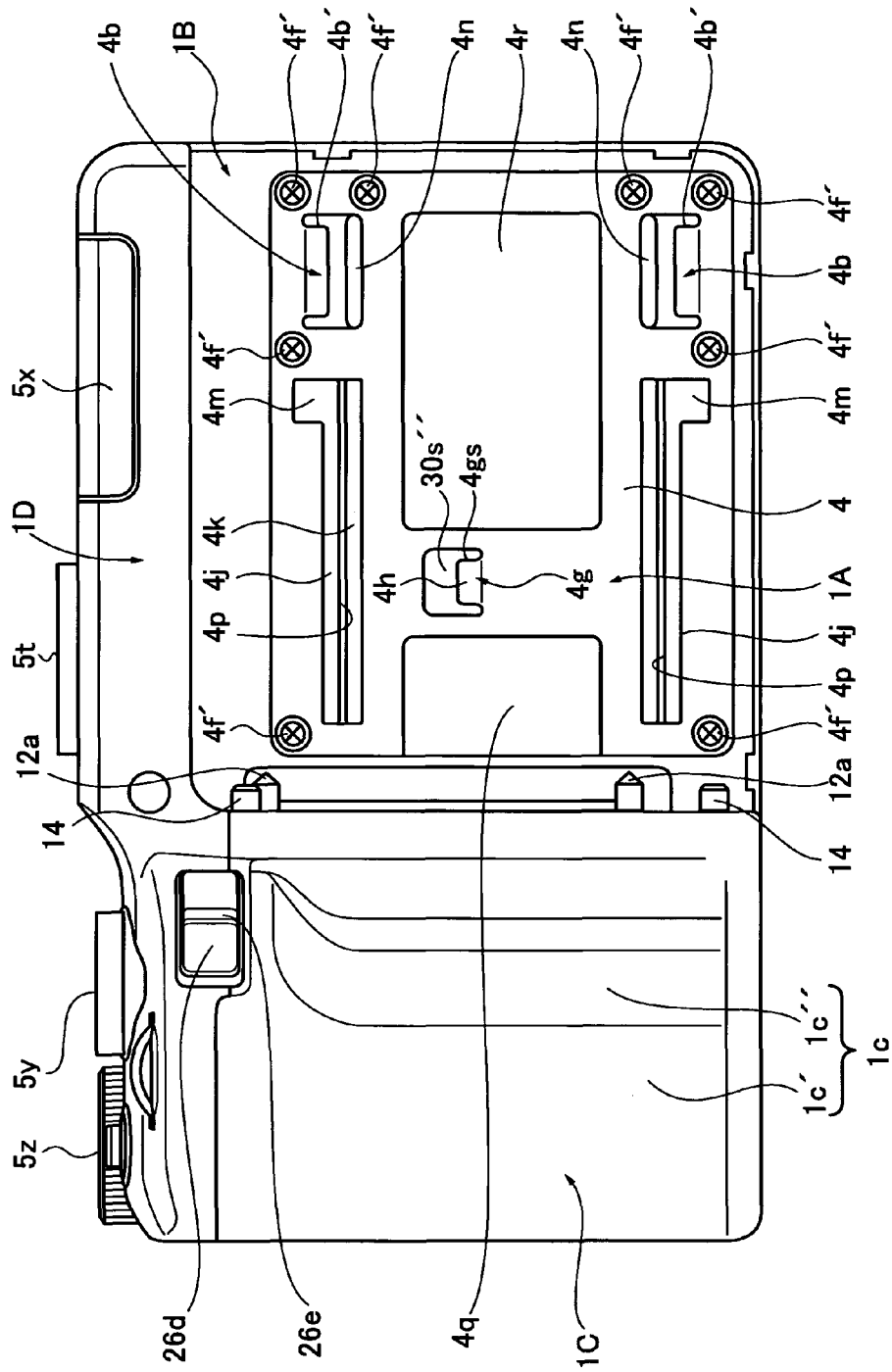
FIG. 5A is a view of the camera body shown in FIG. 4 as viewed from the front face side.

As shown in FIGS. 4 and 5A, the camera body 1 has a recess 1A as a space in which the housing 2A is placed. The recess 1A is formed of three wall sections of a back wall section 1B, a side wall section 1C, and an upper wall section 1D which are made of resin. The back wall section 1B and the side wall section 1C are orthogonal to each other. The upper wall section 1D is orthogonal to the both wall sections 1B, 1C.

When the image pickup unit 2 is attached to the recess 1A and this image pickup unit 2 is viewed from a front face, that is to say, a subject side in the optical axis direction of the optical system, a rear part 2b (see FIG. 6) of the housing 2A faces the back wall section 1B. When the image pickup unit 2 is attached to the housing 1A and the image pickup unit 2 is viewed from the front face, a left side surface 2c of the housing 2A shown in FIG. 8 faces the side wall section 1C. When the image pickup unit 2 is placed in the recess 1A and the image pickup unit 2 is viewed from the front face, an upper surface 2d of the housing 2A faces the upper wall section 1D.

The back wall section 1B, the side wall section 1C and the upper wall section 1D are integrally formed. The recess 1A has its outline shape defined by a rear wall (XY plane) of the back wall section 1B, a side surface wall (YZ plane) of the side wall section 1C and an upper surface wall (ZX plane) of the upper wall section 1D. When the housing 2A is placed, the recess 1A is opened to a downward direction (Y direction) in which a lower surface 2e of the housing 2A is located, a right lateral direction (X direction) in which a right side surface 2f of the housing 2A is located, and a forward direction (Z direction) in which the front face 2a of the housing 2A is located.

Note that the X direction is also referred to as a first direction in which the image pickup unit 2 moves toward or away from the side wall section 1C, and the Y direction is referred to as a vertical direction (Y direction) to the first direction.

Manipulating sections for electrically manipulating the camera body 1 and the image pickup unit 2 are provided at appropriate positions on the back wall section 1B, the side wall section 1C and the upper wall section 1D. In the embodiment, as shown in FIGS. 1 to 4, a release button 5y and a dial 5z, for example, are provided as the manipulating sections on the upper wall section 1D. In addition, a popup type strobe device 5x and a hot shoe section 5t are provided on the upper wall section 1D. In addition, as shown in FIG. 3, an electronic viewfinder connection terminal 5s is provided on the back wall section 1B. An electronic viewfinder device (not shown) is connected to the electronic viewfinder connection terminal 5s.

Figure 7A:
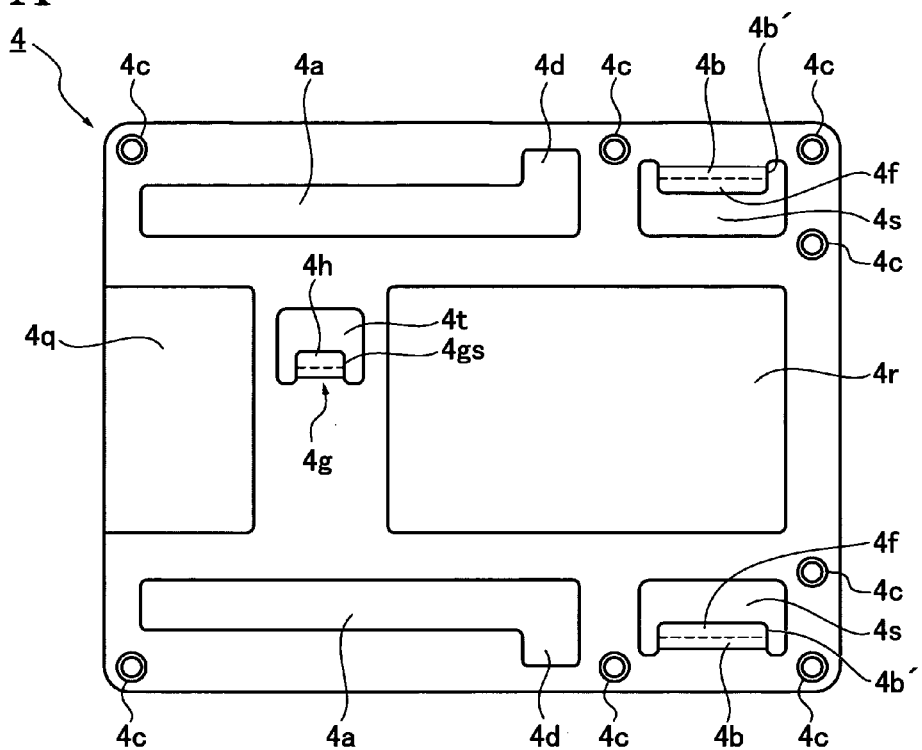
FIG. 7A is a plan view of the rear wall reinforcing sheet metal member for body shown in FIG. 5A and a front face view thereof.
Figure 7B:
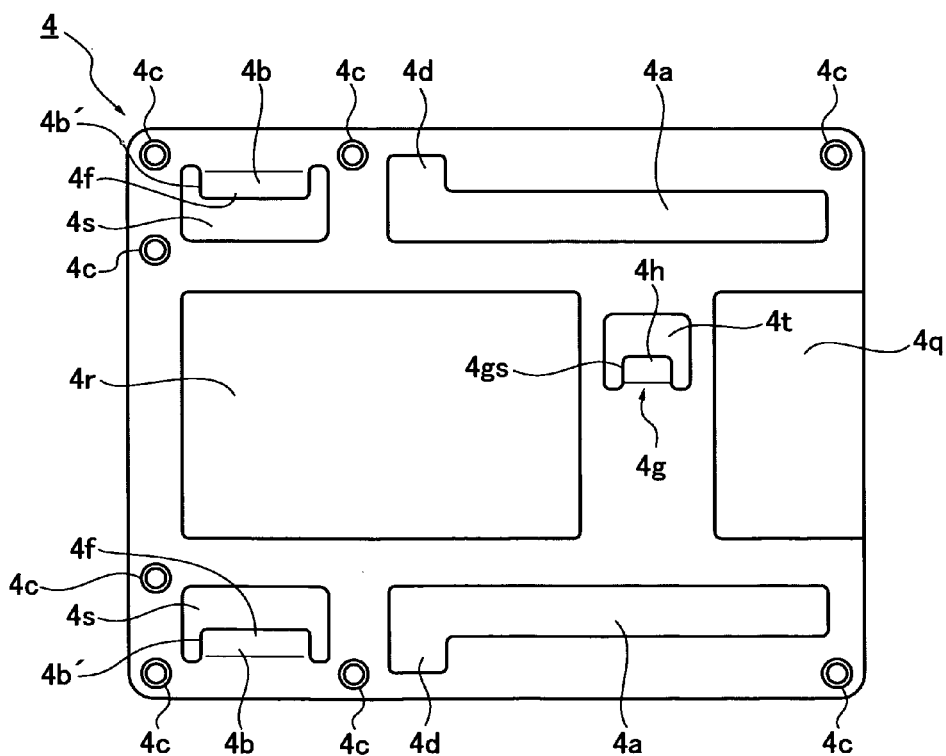
FIG. 7B is a plan view of the rear wall reinforcing sheet metal member for body shown in FIG. 7A and a backside view thereof.
Figure 7C:
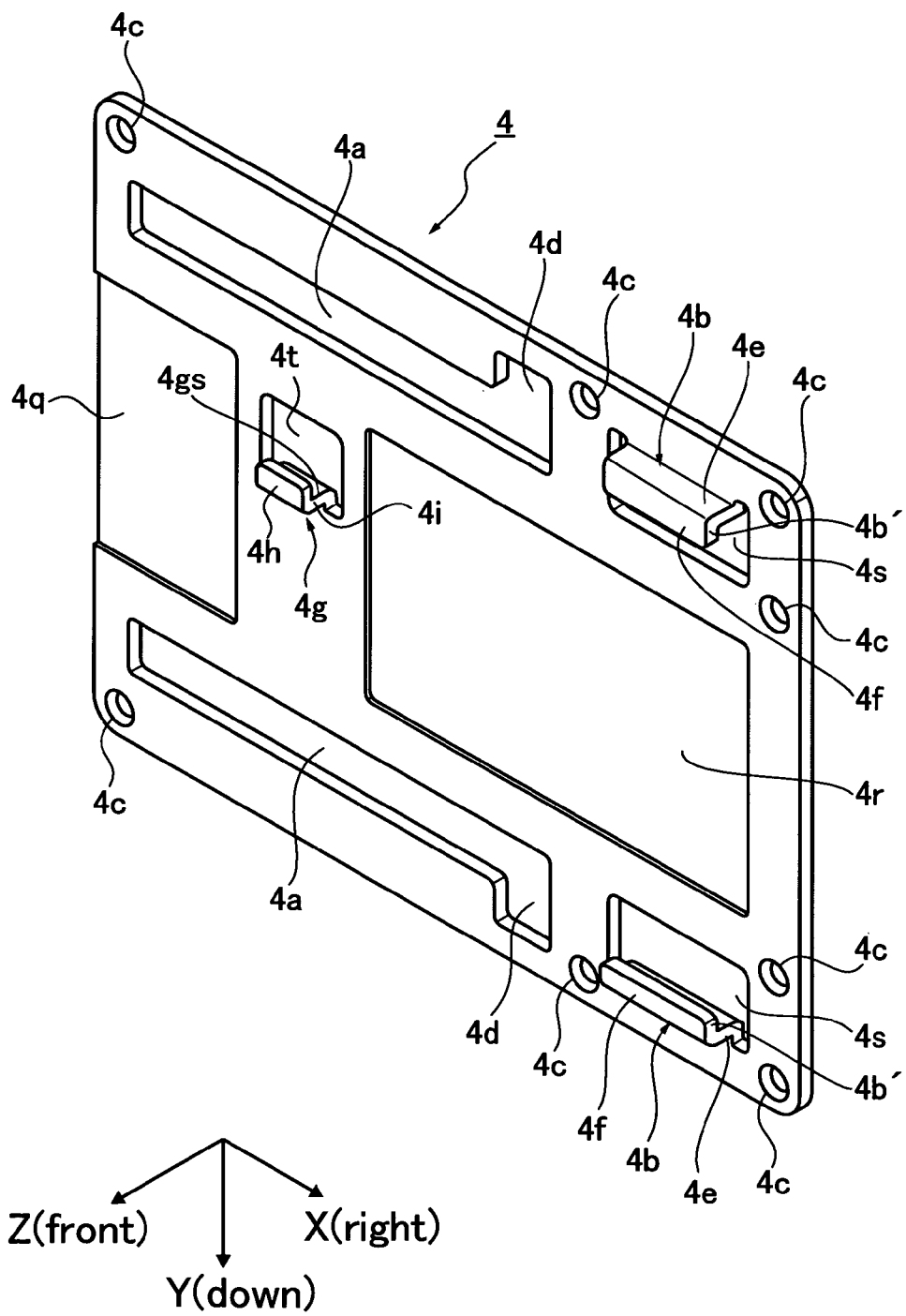
FIG. 7C is a perspective view of the rear wall reinforcing sheet metal member for body shown in FIGS. 7A and 7B.

As shown in FIG. 5A, and FIGS. 7A to 7C, on the back wall section 1B, a rear wall reinforcing sheet metal member for body 4 is provided as a rear wall. FIGS. 7A to 7C show the rear wall reinforcing sheet metal member for body 4 which has been removed from the back wall section 1B. When the image pickup unit 2 is set to the camera body 1, the rear part 2b thereof faces the rear wall reinforcing sheet metal member for body 4.

(Description of Rear Wall Reinforcing Sheet Metal Member for Body 4)

The rear wall reinforcing sheet metal member for body 4 has an almost rectangular outline. This rear wall reinforcing sheet metal member for body 4 is molded by pressing, for example. As enlarged and shown in FIGS. 7A to 7C, this rear wall reinforcing sheet metal member for body 4 has paired insertion openings 4a, 4a, paired engaging claws 4b, 4b which also serve as an biasing section to be described later, and screw holes 4c.

In addition, the biasing section includes a first biasing section and a second biasing section, and any one of the paired engaging claws 4b, 4b is referred to as a first engaging claw and any other one a second engaging claw.

The paired insertion openings 4a, 4a are formed at an interval in a vertical direction (up-down direction) and extend in parallel to each other in a horizontal direction (left-right direction). Right ends of the paired insertion openings 4a, 4a are rectangular openings 4d, 4d. Rectangular stopper protrusions are fitted into the rectangular openings 4d, 4d.

The paired engaging claws 4b, 4b are placed at positions far away from the side wall section 1C and placed at an interval in a vertical direction (up-down direction). As enlarged and shown in FIG. 7C, the paired engaging claws 4b, 4b each include a cut and bent section 4e and an inflected section 4f. In the rear wall reinforcing sheet metal member for body 4, insertion openings 4s, 4s are formed at parts where the paired engaging claws 4b, 4b are formed.

On the rear wall reinforcing sheet metal member for body 4, an engaging protrusion 4g is formed at an almost middle position of the vertical direction (up-down direction) in which the insertion opening 4a and the insertion opening 4a are formed at an interval. The engaging protrusion 4g includes a cut and bent section 4i and an inflected section 4h. An insertion opening 4t is formed at a part where this engaging protrusion 4g is formed. The engaging protrusion 4g serves a function to have later-described connector sections to fit into each other at appropriate posture and angle. This engaging protrusion 4g, detailed structure of which will be described later, is located at an almost center of the camera-body connector section 12 when it is viewed from a vertical direction (Y direction) to a first direction in which the image pickup unit 2 moves toward or away from the side wall section 1C.

(Description of Resin Plate 30)

Figure 5B:
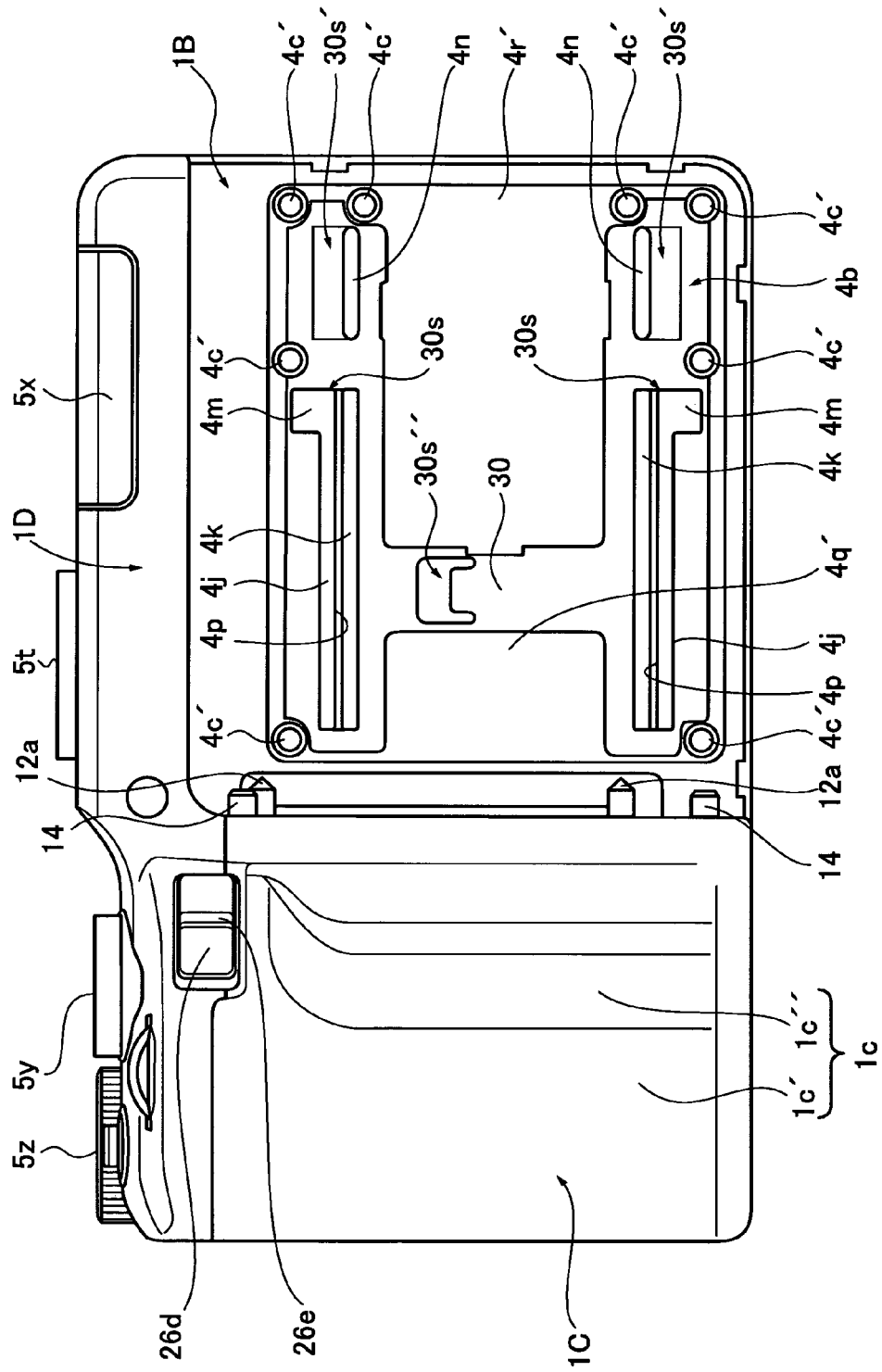
FIG. 5B is a view of the camera body from which a rear wall reinforcing sheet metal member for body shown in FIG. 5A is removed, as viewed from the front face side.

FIG. 5B shows a state in which the rear wall reinforcing sheet metal member for body 4 is removed from the back wall section 1B. In the back wall section 1B formed is a recess in which a resin plate 30 is placed. On the resin plate 30, paired raised sections 30s are formed at parts facing the paired insertion openings 4a, 4a, paired raised sections 30s' is formed at parts facing the paired insertion openings 4s, 4s, and a raised section 30s" is formed at a part facing the insertion opening 4t. On the paired raised sections 30s, paired resin-made guiding protrusions 4j, 4j which extend in a left-right direction, and paired resin-made sliding contact ribs 4k, 4k are formed. Rectangular protrusions 4m are formed at the right ends of the paired resin-made guiding protrusions 4j, 4j. The rectangular protrusions 4m also serve as a stopper protrusion. On the paired raised sections 30s', sliding contact ribs 4n, 4n are formed, respectively. The paired raised sections 30s, 30s are located between the side wall section 1C and the paired raised sections 30s', 30s'.

In addition, the paired resin-made guiding protrusions 4j, 4j constitute a camera-body guiding mechanism, any one of the paired resin-made guiding protrusions 4*j*, 4*j* is referred to as a first guiding protrusion and any other one of the paired resin-made guiding protrusions 4*j*, 4*j* is referred to as a second guiding protrusion.

The camera-body guiding mechanism serves as a guiding mechanism which, in cooperation with an image-pickup-unit guiding mechanism to be described later, controls a positional relation of the camera-body connector section 12 to the image-pickup-unit connector section 11 and guides the image pickup unit 2 in a direction toward or away from the side wall section 1C.

The paired resin-made sliding contact ribs 4*k*, 4*k* and the paired resin-made sliding contact ribs 4*n*, 4*n* are placed at an interval in the left-right direction. The paired sliding contact ribs 4*k*, 4*k* are provided in parallel to and in proximity to or adjacent to the paired guiding protrusions 4*j*, 4*j*, respectively. In the paired guiding protrusions 4*j*, 4*j*, guide surfaces 4*p*, 4*p* are formed on the side where the paired sliding contact ribs 4*k*, 4*k* are placed. The guide surfaces 4*p*, 4*p* exist on a plane parallel to the XY plane. The cut and bent section 4*i* extends in a positive orientation of the Z direction.

Figure 6:
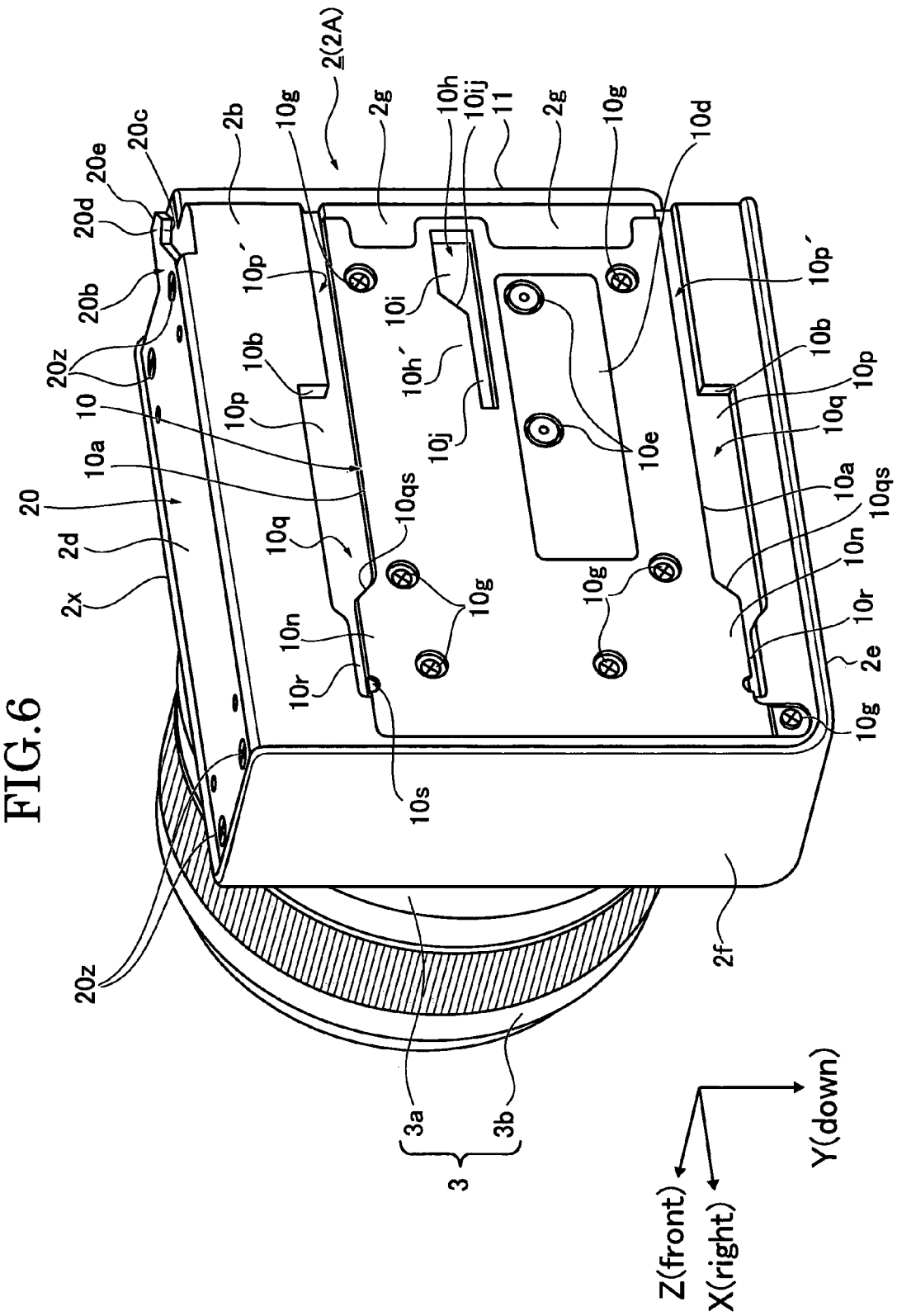
FIG. 6 is an external view of the image pickup unit shown in FIG. 4 as viewed from the rear side.

Peripheral edges 10*a*, 10*a* of a rear wall reinforcing sheet metal member for unit 10 shown in FIG. 6 are in sliding contact with the guide surfaces 4*p*, 4*p*. Notch walls 10*b*, 10*b* of the rear wall reinforcing sheet metal member for unit 10 abut on the rectangular protrusions 4*m* when the image pickup unit 2 is pulled out. A detailed structure of the rear wall reinforcing sheet metal member for unit 10 is described later. As shown in FIG. 5B, on the back wall section 1B, screw holes 4*c*' are formed at appropriate positions corresponding to screw holes 4*c* of the rear wall reinforcing sheet metal member for body 4.

(Structure for Mounting Rear Wall Reinforcing Sheet Metal Member for Body 4 and Resin Plate 30 to Back Wall Section 1B)

As shown in FIG. 7A to 7C, raised flat plate sections 4*q*, 4*r* raised to the back wall section 1B are formed on the right and left sides of and in the middle part in the vertical direction of the rear wall reinforcing sheet metal member for body 4. As shown in FIG. 5B, the resin plate 30 is H-shaped and has notches 4*q*', 4*r*' having a shape corresponding to the raised flat plate sections 4*q*, 4*r* formed. The rear wall reinforcing sheet metal member for body 4 are given rigidity by the raised flat plate sections 4*q*, 4*r*.

Figure 5C:
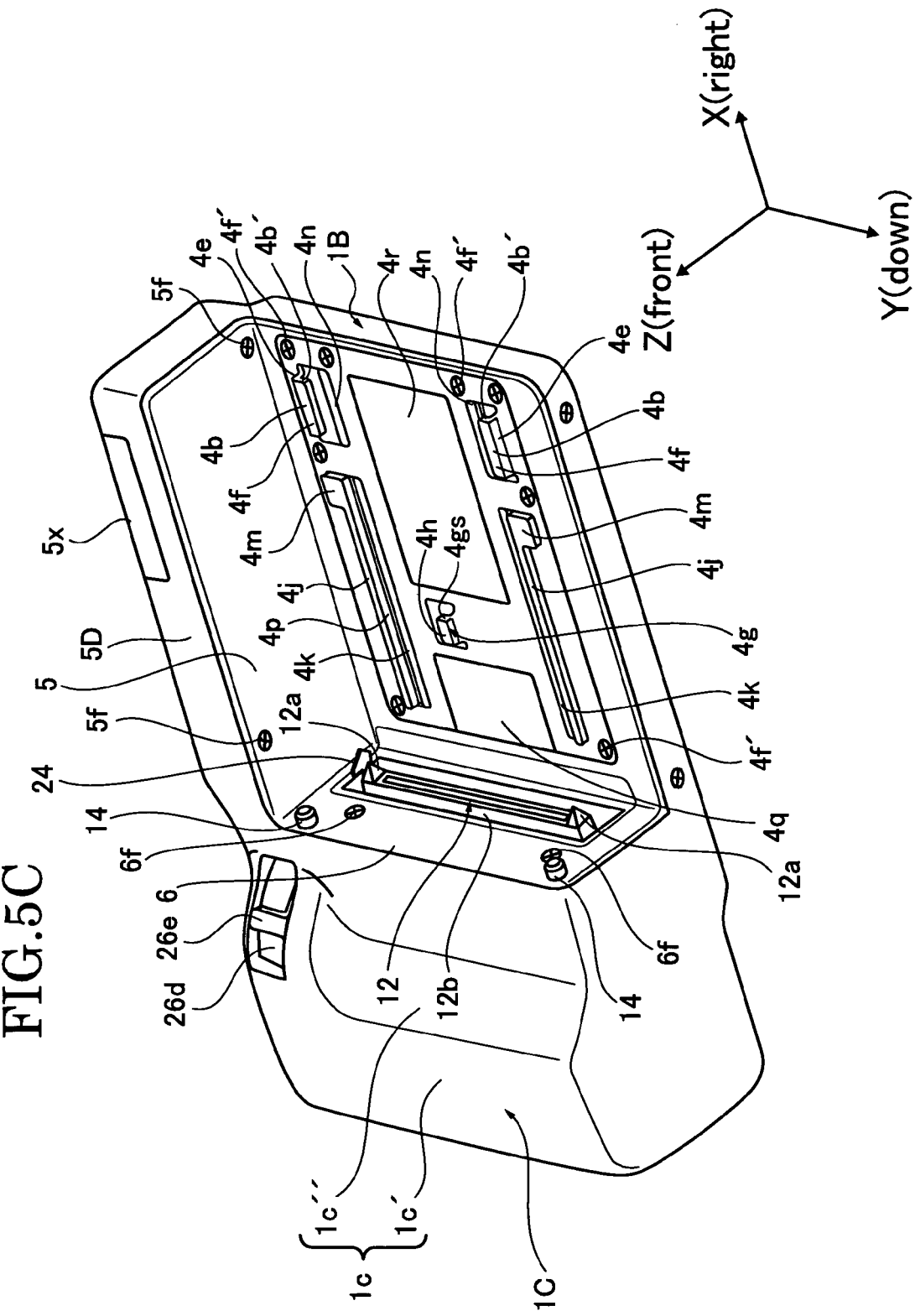
FIG. 5C is an external view of the camera body shown in FIG. 4 as viewed obliquely from below.

As shown in FIGS. 4, 5A, and 5C, the rear wall reinforcing sheet metal member for body 4 and the resin plate 30 are fixed to the back wall section 1B by locking screws 4*f* in the following state. Specifically, the raised flat plate sections 4*q*, 4*r* correspond to the notches 4*q*', 4*r*'; the raised sections 30*s*, 30*s* having the guiding protrusion 4*j*, sliding contact rib 4*k* and rectangular protrusion 4*m* are inserted into the insertion openings 4*a*, 4*a*; the raised sections 30*s*', 30*s*' having the sliding contact rib 4*n* are inserted into the insertion openings 4*s*, 4*s*; and the raised section 30*s*" is inserted into the insertion opening 4*t*.

(Structure of Side Wall Section 1C and Upper Wall Section 1D of Camera Body and Rear Configuration of Back Wall Section 1B)

A side surface wall reinforcing sheet metal member for body 6 is fixed as a side surface wall to the side wall section 1C by locking screws 6*f*, as shown in FIGS. 4 and 5C. The side surface wall reinforcing sheet metal member for body 6 faces the left side surface 2*c* of the housing 2A when it is set to the recess 1A of the housing 2A. The side surface wall reinforcing sheet metal member for body 6 stands up, when the side surface wall reinforcing sheet metal member for body 6 is viewed straight with the back wall section 1B located on the downside, the upper wall section 1D located on the right side and yet the forward direction being the topside.

An upper surface wall reinforcing sheet metal member for body 5 is fixed as an upper surface wall by locking screws 5*f* to the upper wall section 1D, as shown in FIG. 5C. The upper surface wall reinforcing sheet metal member for body 5 faces the upper surface 2*d* of the housing 2A when it is set to the recess 1A of the housing 2A. The upper surface wall reinforcing sheet metal member for body 5 stands up forward from the back wall section 1B, when the side wall section 1C is viewed straight from the lateral side with the upper wall section 1D located on the top side.

As shown in FIGS. 5A to 5C, the camera body 1 has a grip section 1*c* connected to the side wall section 1C. The grip section 1*c* includes a bulging section 1*c*' and a finger rest recess 1*c*". The bulging section 1*c*' bulges forward (the Z direction from the rear side to the front face side is defined as forward), that is to say, in a direction facing a subject in the optical axis of the optical system. The finger rest recess 1*c*" is located between the bulging section 1*c*' and the recess 1A. The finger rest recess 1*c*" is adjacent to the bulging section 1*c*'. When a user grips the grip section 1*c* with his/her right hand, he/she can place his/her long finger to little finger on the finger rest recess 1*c*".

A storage chamber is formed inside the grip section 1*c*. The storage chamber houses a battery and various electrical parts requested by the imaging apparatus. That is to say, the storage chamber houses a battery, a circuit used to control the image pickup unit 2 by manipulating the manipulating sections, a processing circuit to process an image captured by the image pickup unit 2, a recording medium which stores an image data captured by the image pickup unit 2 and is processed by the processing circuit, a power circuit, a strobe control circuit, a circuit board on which circuit parts constituting these are mounted, etc.

As shown in FIG. 3, on the rear of the back wall section 1B provided is a display surface 1*b* which displays images as a display section on the basis of image data captured by the image pickup unit 2. On the display surface 1*b*, images recorded in a recording medium are reproduced and displayed. The size of the back wall section 1B is almost determined by that of the display surface 1*b*.

(Outline Structure of Image-pickup-Unit Connector Section 11 and Camera-Body Connector Section 12)

Figure 8:
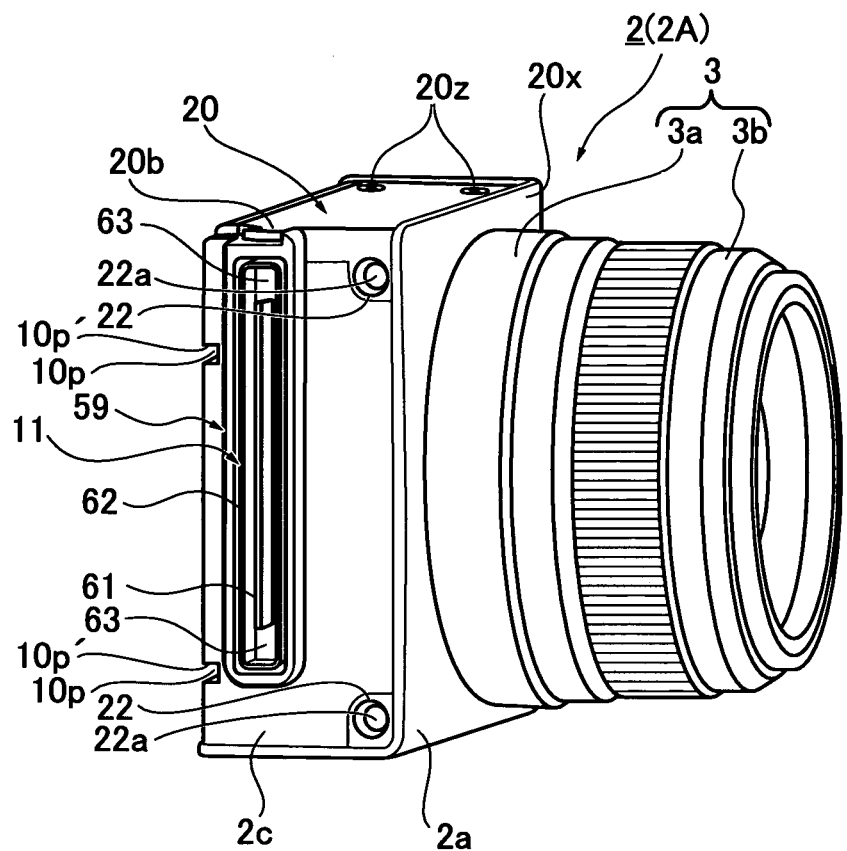
FIG. 8 is a perspective view of the image pickup unit shown in FIG. 6 as viewed from the left side.
Figure 8:
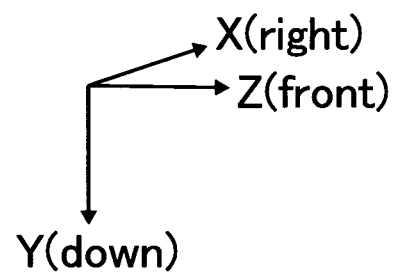

As shown in FIG. 8, on the image pickup unit 2 provided is an image-pickup-unit connector section 11 which extends vertically on the left side surface 2*c* facing the side surface wall reinforcing sheet metal member for body 6. The image-pickup-unit connector section 11 is fixed to a connector board (plug base set) on which electric circuits are wired. The plug base set is placed in a floating structure inside the image pickup unit 2. The image-pickup-unit connector section 11 protrudes outward from the left side surface 2*c*.

When the image pickup unit 2 is attached to the camera body 1 and the image-pickup-unit connector section 11 and the camera-body connector section 12 are electrically joined, this floating structure serves a function to absorb and alleviate any mounting error of the image-pickup-unit connector section 11 and the camera-body connector section 12, and to mitigate stress to be applied when the image-pickup-unit connector section 11 and the camera-body connector section 12 are fitted.

As shown in FIG. 4, on the camera body 1 provided is the camera-body connector section 12 which is adjacent to the side surface reinforcing sheet metal member for body 6 and extends vertically. The camera-body connector section 12 has positioning protrusions 12*a*, 12*a* at both ends in the vertical direction. The image-pickup-unit connector section 11 has positioning holes (to be described later) at the both ends in the vertical direction. A commercially available bay connector, for example, is used for the image-pickup-unit connector section 11 and the camera-body connector section 12.

The camera-body connector section 12 is placed so that it will not inadvertently touch a rising base of the side wall section 1C which stands up from the back wall section 1B, when the side surface wall reinforcing sheet metal member for body 6 is viewed straight with the back wall section 1B located on the downside, the upper wall section 1D located on the right side and yet the forward direction being the topside. The camera-body connector section 12 has a covering member 12b which covers a connector terminal 12c shown in FIGS. 19 and 20. The action of the covering member 12b will be described later.

The camera-body connector section 12 faces the recess 1A. As the image pickup unit 2 moves in a direction from right to left when the image pickup unit 2 is attached to and set in the camera body 1, the camera-body connector section 12 is fitted into the image-pickup-unit connector section 11 and the camera body 1 and the image pickup unit 2 are connected. In addition, details of the setting of the image pickup unit 2 to the camera body 1 and detailed structure of the image-pickup-unit connector section 11 and the camera-body connector section 12 will be described later.

(Supplementary Description of Side Wall Section 1C)

As shown in FIG. 4, and FIGS. 5A to 5C, on the side wall section 1C, paired auxiliary fitting protrusions 14, 14 are formed at an interval in the up-down direction. The auxiliary fitting protrusions 14 are located above the camera-body connector section 12 when the side wall section 1C is viewed straight with the back wall section 1B located on the downside, the upper wall section 1D located on the right side and yet the forward direction being the topside. The paired auxiliary fitting protrusions 14, 14 have a capability of preventing the connector terminal 12c of the camera-body connector section 12 and the connector terminal (to be described later) of the image-pickup-unit connector terminal 11 from being destroyed, in cooperation with paired auxiliary fitting holes to be described later, when inadvertent twisting force is applied to the image pickup unit 2.

(Description of External Shape of Image Pickup Unit 2)

In the image pickup unit 2, paired auxiliary fitting holes 22 is formed on the left side surface 2c to be faced by the side surface wall reinforcing sheet metal member for body 6, as shown in FIG. 8. When the image pickup unit 2 is attached to and set in the camera body 1, the paired auxiliary fitting protrusions 14, 14 are fitted into the paired auxiliary fitting holes 22. A shock absorbing member 22a such as a sponge, rubber or the like is placed on the bottom of the paired supplementary fitting holes 22. Alternatively, the placement may be adopted such that the paired auxiliary fitting holes 22 are formed on the lateral wall section 1C and the paired auxiliary fitting protrusions 14, 14 are formed on the left side surface 2c of the housing 2A.

Figure 9:
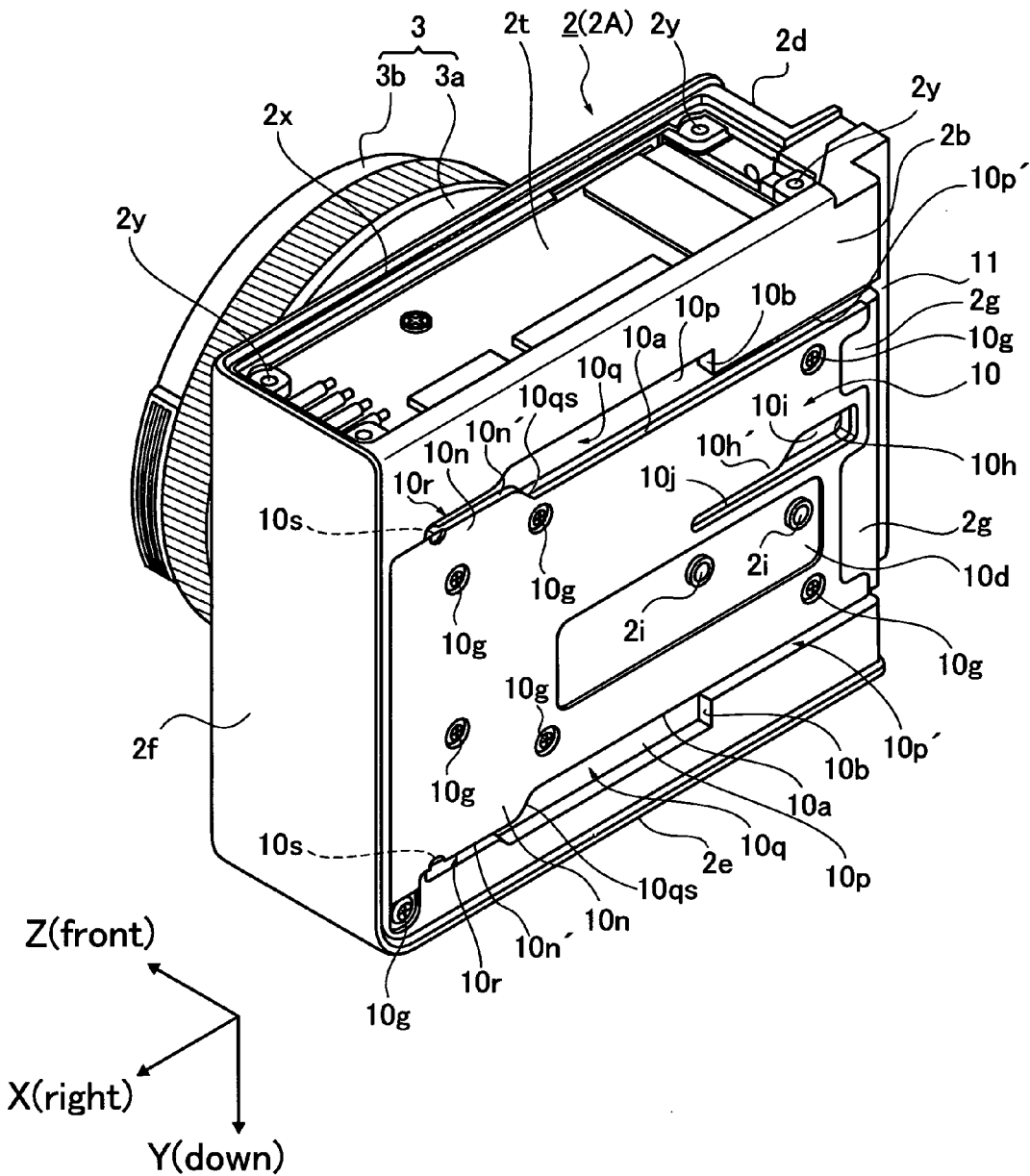
FIG. 9 is an external view of the image pickup unit, as viewed from the rear side, from which an upper surface reinforcing sheet metal member for unit shown in FIG. 6 is removed.
Figure 10A:
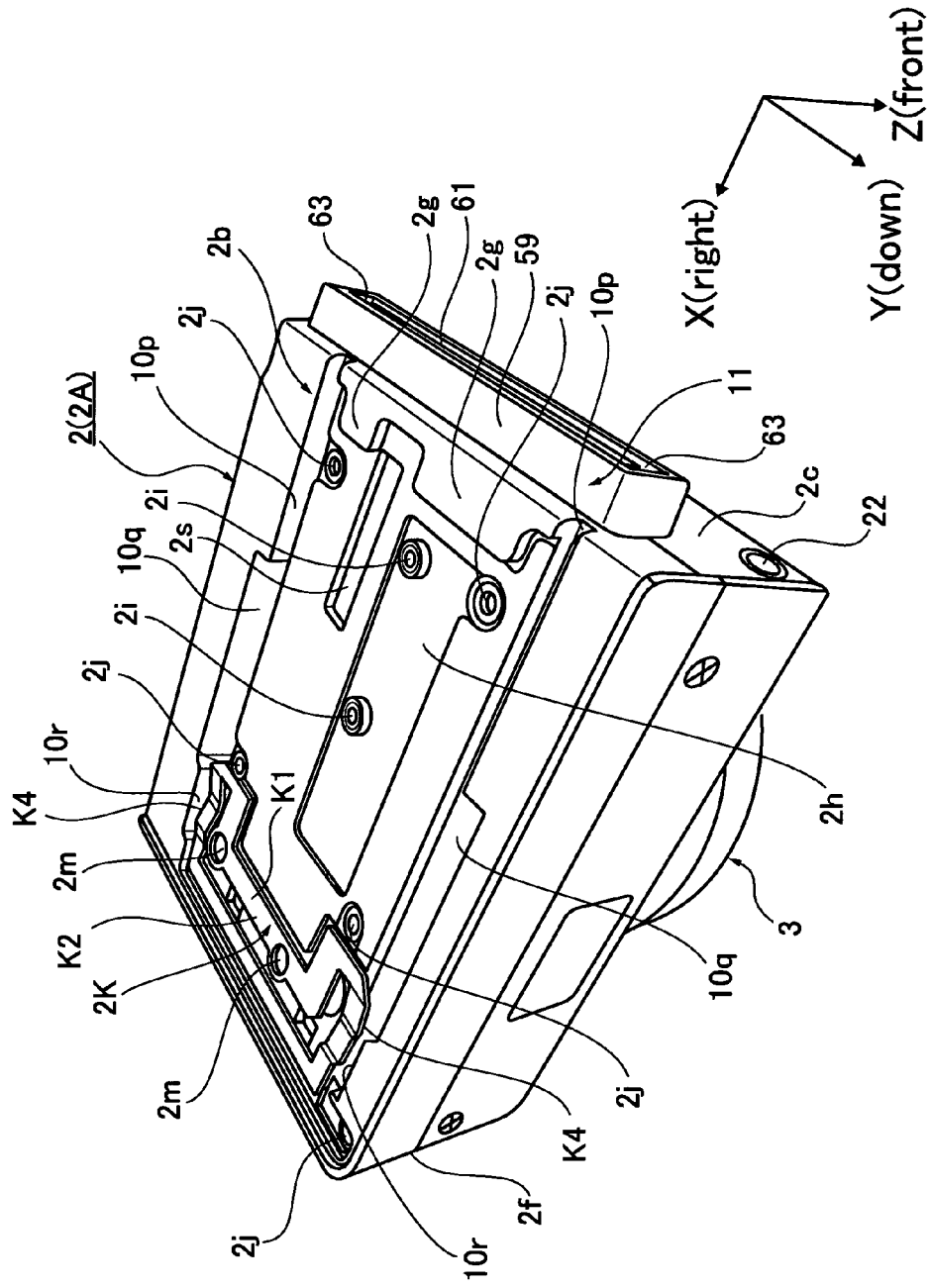
FIG. 10A is an external view of the image pickup unit, as viewed from the rear side, from which a rear wall reinforcing sheet metal member for unit shown in FIG. 6 is removed.

On the rear part 2b of the housing 2A, positioning raised sections 2g, 2g are formed on the side of the left side surface 2c, as shown in FIGS. 6, 9, and 10A. Also, on the rear part 2b of the housing 2A, as shown in FIG. 10A, not only an engaging protrusion guiding groove 2s, a rectangular recess 2h, and paired cylindrical sections 2i are formed, but also screw holes 2j are formed at appropriate positions.

On the side of the right side surface 2f of the housing 2A, a plate spring 2k having an inclined elastic plate section as a biasing spring which constitutes a part of the biasing section is placed. The plate spring 2k has the screw holes 2m, 2m formed. A detailed structure of the plate spring 2k will be described later.

Figure 11A:
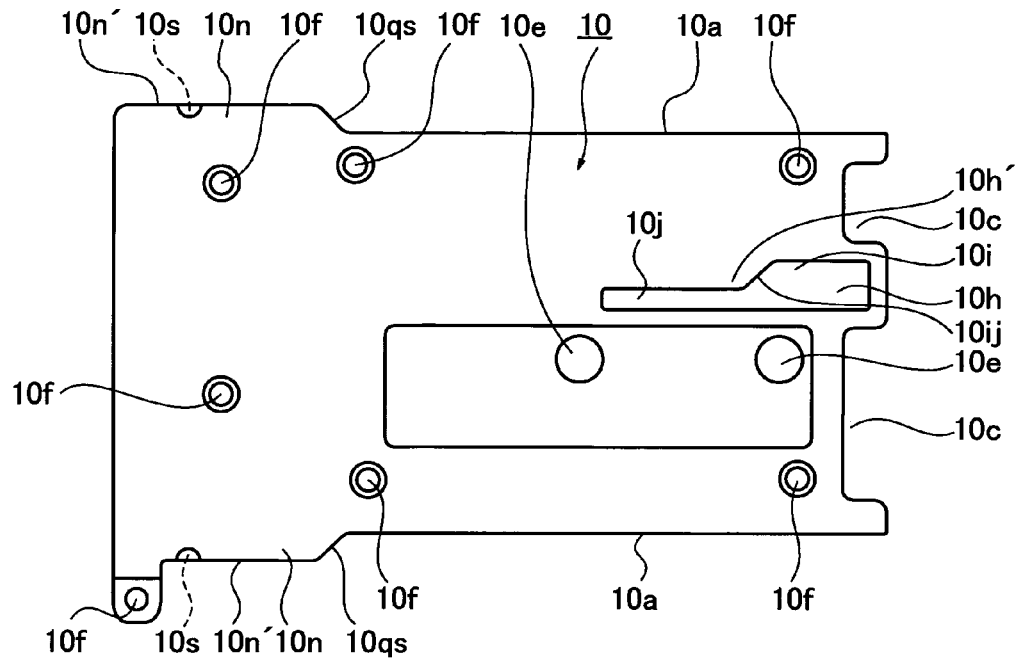
FIG. 11A is a plan view of the rear wall reinforcing sheet metal member for unit shown in FIG. 6 as viewed from the front face side.
Figure 11B:
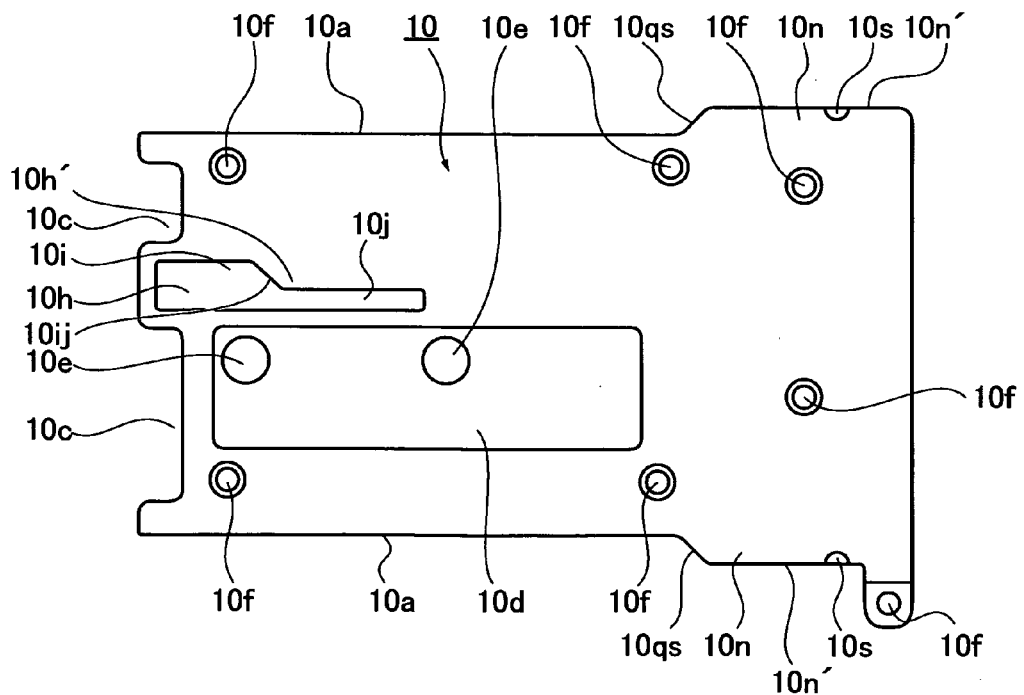
FIG. 11B is a rear view of the rear wall reinforcing sheet metal member for unit shown in FIG. 11A.
Figure 11C:
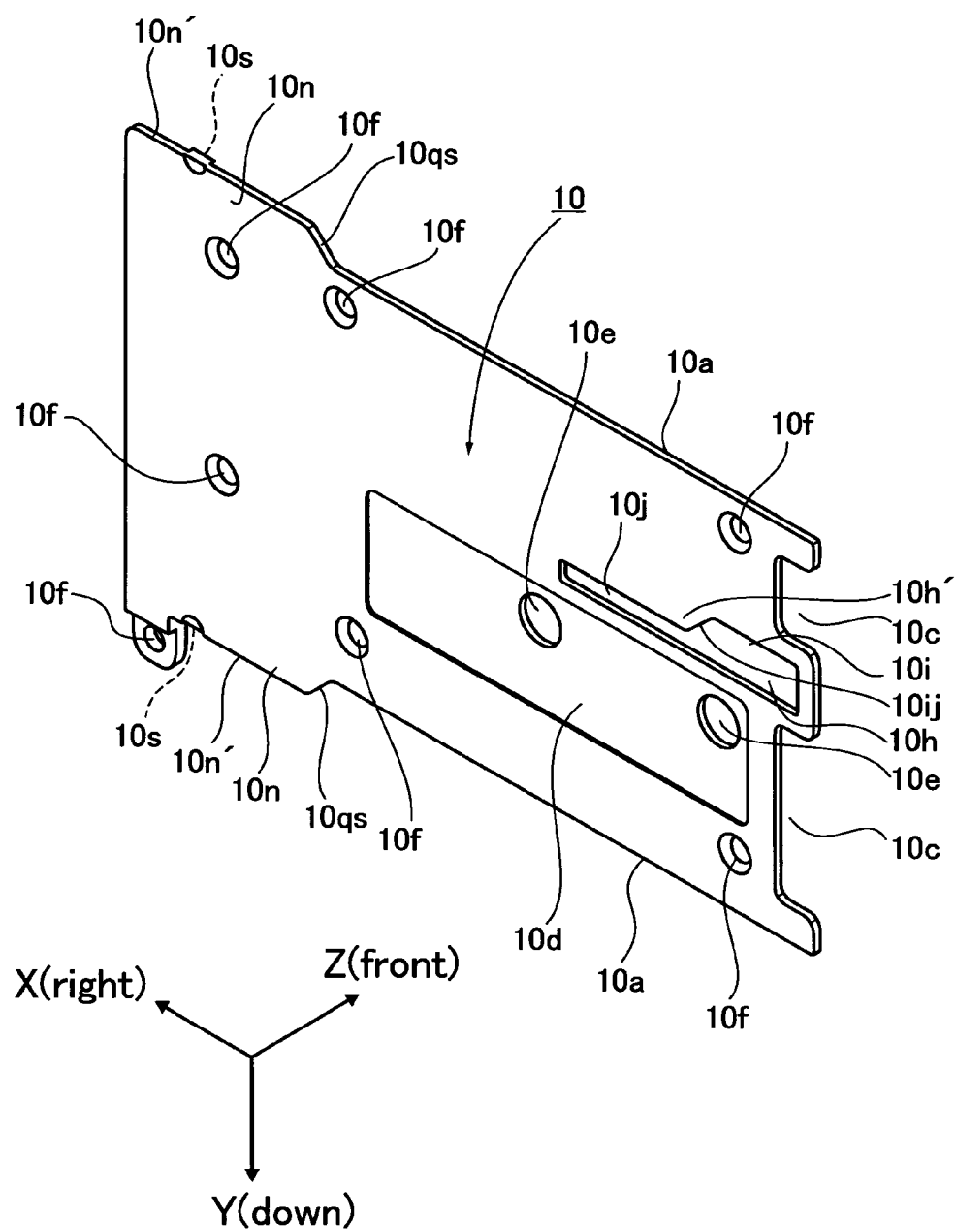
FIG. 11C is a perspective view of the rear wall reinforcing sheet metal member for unit shown in FIG. 11A.

A rear wall reinforcing sheet metal member for unit 10 has an almost rectangular shape, as shown in FIG. 11A to 11C. On the rear wall reinforcing sheet metal member for unit 10, positioning notches 10c, 10c are formed corresponding to positioning raised sections 2g, 2g.

(Structure of Rear Wall Reinforcing Sheet Metal Member for Unit 10)

Figure 10B:
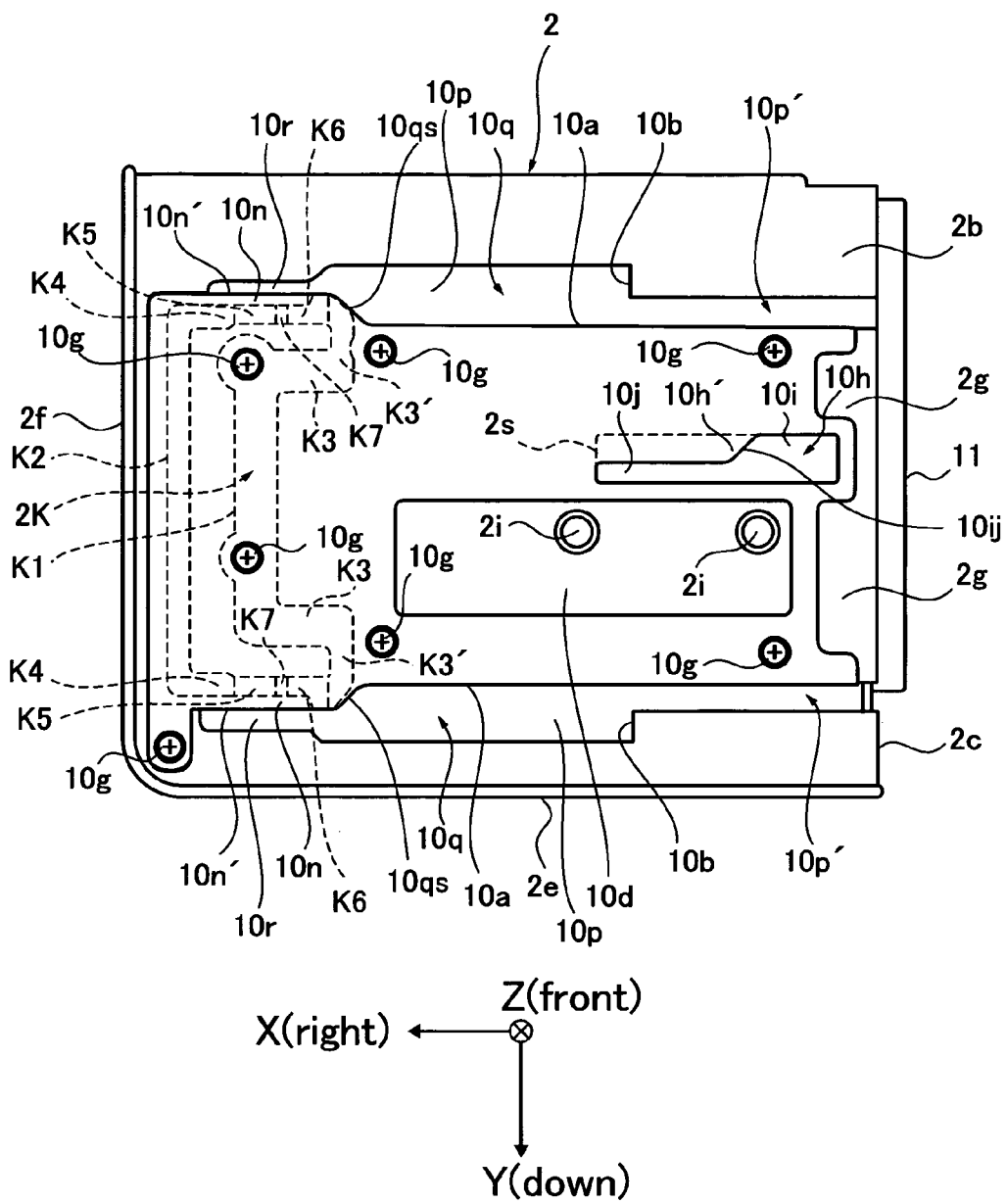
FIG. 10B is a plan view showing a positional relationship of a plate spring and the rear wall reinforcing sheet metal member for unit shown in FIG. 10A.

The rear wall reinforcing sheet metal member for unit 10 has a tabular raised section 10d having a shape corresponding to the rectangular recess 2h. On the tabular raised section 10d formed are fitting holes 10e into which the paired cylindrical sections 2i fit. In a periphery of the rear wall reinforcing sheet metal member for unit 10, screw holes 10f are formed at positions corresponding to the screw holes 2j. The rear wall reinforcing sheet metal member for unit 10 is fixed to the rear part 2b by locking screws 10g. The plate spring 2k is fixed when the rear wall reinforcing sheet metal member for unit 10 is fixed by the locking screws 10g to the rear part 2b of the housing 2b. FIG. 10B shows a state where the plate spring 2k is fixed to the rear part 2b integrally with the rear wall reinforcing sheet metal member for unit 10 of the housing 2A.

In the rear wall reinforcing sheet metal member for unit 10 formed is an engaging protrusion guiding hole 10h which extends in the left-right direction on the right side when the rear wall reinforcing sheet metal member for unit 10 is viewed from the rear side of the housing 2A with the rear wall reinforcing sheet metal member for unit 10 attached to the housing 2A. In addition, in the rear wall reinforcing sheet metal member for unit 10 formed are engaging plate sections 10n, 10n which also serve as a part of the biasing section, on the left side and on the peripheral edges 10a, 10a when the rear wall reinforcing sheet metal member for unit 10 is viewed from the rear side of the housing 2A with the rear wall reinforcing sheet metal member for unit 10 attached to the housing 2A.

Between the rear part 2b and the rear wall reinforcing sheet metal member for unit 10 formed are paired guiding grooves 10p', a guiding groove 10q, and guiding holes for engaging claw cut and bent section 10r, as shown in FIGS. 6 and 9. The paired guiding grooves 10p' extend in a left-right direction and allow the guiding protrusion 4j to enter. The guiding groove 10q allows the rectangular protrusion 4m and the engaging claw 4b to enter. The guiding holes for engaging claw cut and bent section 10r guide the cut and bent section 4e of the engaging claw 4b. In the engaging plate sections 10n, 10n, semicircular convex sections 10s, 10s, facing the end of the guiding holes for engaging claw cut and bent section 10r, formed are in the peripheral edges 10n', 10n', as shown in FIGS. 11A to 11C. The semicircular convex sections 10s, 10s are located at the ends of the guiding holes for an engaging claw cut and bent section 10r and projected to a direction in which the plate spring 2k exists. The action of the semicircular convex sections 10s, 10s will be explained together with that of the plate spring 2k. In addition, the sign 10p designates a bottom wall of the guiding grooves 10p', 10q.

In addition, the paired guiding grooves 10p' constitute an image-pickup-unit guiding mechanism, and any one of the paired guiding grooves 10p' is referred to as a first guiding groove which is provided on the rear part 2b of the image pickup unit 2 and extends in a direction corresponding to a first direction. Any other one of the paired guiding grooves 10p' is referred to as a second guiding groove which is provided on the rear part 2b of the image pickup unit 2 and extends in a direction corresponding to the first direction.

The paired engaging claws 4b is provided on the far side of the camera-body connector section 12. Therefore, if there were no engaging protrusion 4g, the cut and bent section 4e of the engaging claw 4b would not be guided to the guiding hole for engaging claw cut and bent section 10r, and the inflected section 4f of the paired engaging claws 4b would abut on the engaging plate section 10n. Thus, even though the rear part 2b of the image pickup unit 2 were obliquely inclined to the rear wall of the back wall section 1B, the camera-body connector section 12 and the image-pickup-unit connector section 11 might be fitted and connected to each other.

If the camera-body connector section 12 and the image-pickup-unit connector section 11 were forcibly fitted to each other with the rear part 2b of the image pickup unit 2 obliquely inclined to the rear wall of the back wall section 1B, the camera-body connector section 12 and the image-pickup-unit connector section 11 might be destroyed.

The engaging protrusion 4g has a role to prevent the camera-body connector section 12 and the image-pickup-unit connector section 11 from being destroyed, in cooperation with the engaging protrusion guiding hole 10h. As shown in FIGS. 6, 9, and FIGS. 11A to 11C, the engaging protrusion guiding hole 10h includes an insertion opening 10i which allows entry of the inflected section 4h of the engaging protrusion 4g and a guiding hole for engaging protrusion cut and bent section 10j which guides the cut and bent section 41 in a left-right direction.

Width of the guiding hole for engaging protrusion cut and bent section 10j is designed to be smaller than that of the inflected section 4h, and a constituting wall section (angle controlling abutting section) 10h' which includes the guiding hole for engaging protrusion cut and bent section 10j and the insertion opening 10i is such structured that a connection of the camera-body connector section 12 and the image-pickup-unit connector section 11 is prevented by the inflected section 4h abutting on the constituting wall section 10h'.

That is to say, the insertion opening 10i is formed so that whenever the right edges 4b', 4b' of the paired engaging claws 4b, 4b shown in FIGS. 5A, 5C, and FIGS. 7A to 7C abut on the constituting wall section which constitutes an inclined wall 10qs shown in FIGS. 6, 9, and FIGS. 11A to 11C, an edge 4gs of the engaging protrusion 4g shown in FIGS. 4, 5A, 5C and FIGS. 7A to 7C abuts on the constituting wall section 10h' of an inclined wall 10ij.

Because of this, when the inflected section 4f of the engaging claw 4b abuts and rests on the engaging plate section 10n from the outside, the inflected section 4h of the engaging protrusion 4g abuts and rests on the constituting wall section 10h' and the image pickup unit 2 floats parallel to the rear wall of the back wall section 1B. Thus, positions of the auxiliary fitting protrusions 14 and the auxiliary fitting holes 22 are out of alignment, thus preventing a connection of the camera-body connector section 12 and the image-pickup-unit connector section 11.

In addition, if the inflected section 4f is located inside the image pickup unit 2 relative to the engaging plate section 10n, both connector sections 11, 12 are connected in parallel.
(Description of Upper Surface Wall Reinforcing Sheet Metal Member for Unit 20)

Figure 12:
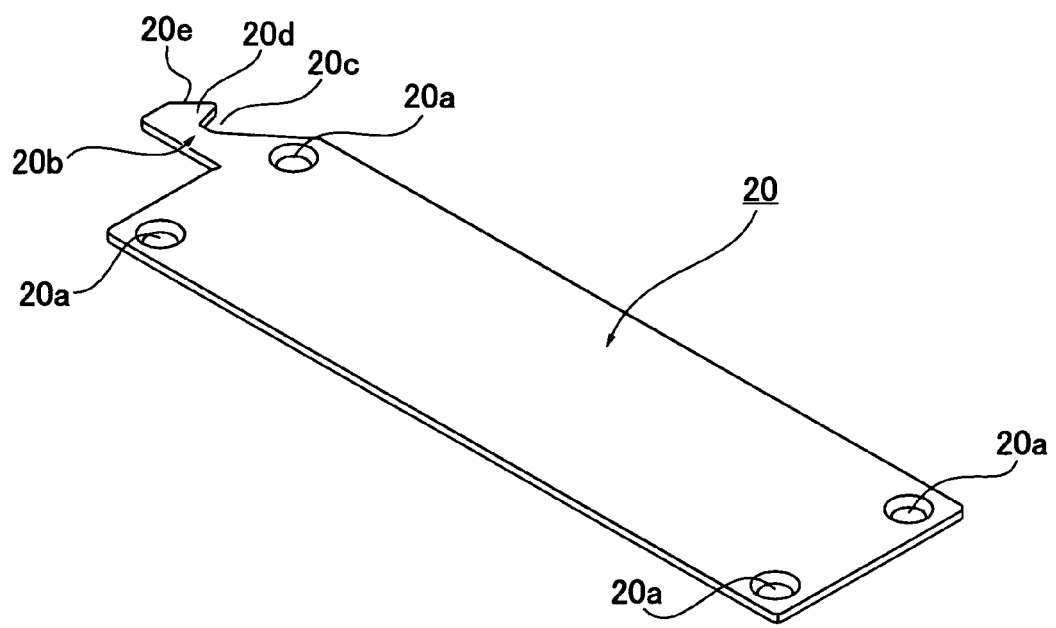
FIG. 12 is a perspective view of the upper wall reinforcing sheet metal member for unit shown in FIG. 6.

On the upper surface 2d of the housing 2A, an upper surface wall reinforcing sheet metal member for unit 20 shown in FIGS. 4, 6, 8 and 12 is placed. As shown in FIG. 12, the upper surface wall reinforcing sheet metal member for unit 20 has screw holes 20a at appropriate positions. The upper surface wall reinforcing sheet metal member for unit 20 has an extended plate section 20b which is extended more outward than the left side surface 2c of the housing 2A.

As shown in FIG. 9, on the upper surface 2d of the housing 2A, a place of placement 2t of the upper surface wall reinforcing sheet metal member for unit 20 is defined by a surrounding wall 2x which surrounds a circumference of the upper surface wall reinforcing sheet metal member for unit 20. In the placement place 2t, screw holes 2y are formed at positions corresponding to the screw holes 20a of the upper surface wall reinforcing sheet metal member for unit 20. The upper surface wall reinforcing sheet metal member for unit 20 is placed at the placement place 2t and fixed by locking screws 20z to the upper surface 2d, as shown in FIGS. 4, 6, and 8.

In this way, the extended plate section 20b extends along the upper surface of the image-pickup-unit connector section 11. In the extended plate section 20b, a notch section 20c and a to-be-locked claw 20d as a to-be-locked member are formed, as shown in FIG. 12. A locking claw, to be described later, as a locking member enters the notch section 20c. The to-be-locked claw 20d enters the notch section of the locking member to be described later. The to-be-locked claw 20d has an inclined wall 20e. The image pickup unit 2 is fixed to the camera body 1 by engagement of the locking member and the to-be-locked member.

In a state that the image pickup unit 2 is fixed to the camera body 1, as shown in FIGS. 1 and 2, as the upper surface wall reinforcing sheet metal member for unit 20 is surrounded by the surrounding wall 2x, it is not visible even when the image pickup unit 2 is viewed from the front face. This makes appearance of the imaging apparatus look better and prevents entry of any dust between the upper surface 2d of the image pickup unit 2 and the upper wall section 1D of the camera body 1.
(Description of Locking Mechanism and Unlocking Mechanism)

Figure 13:
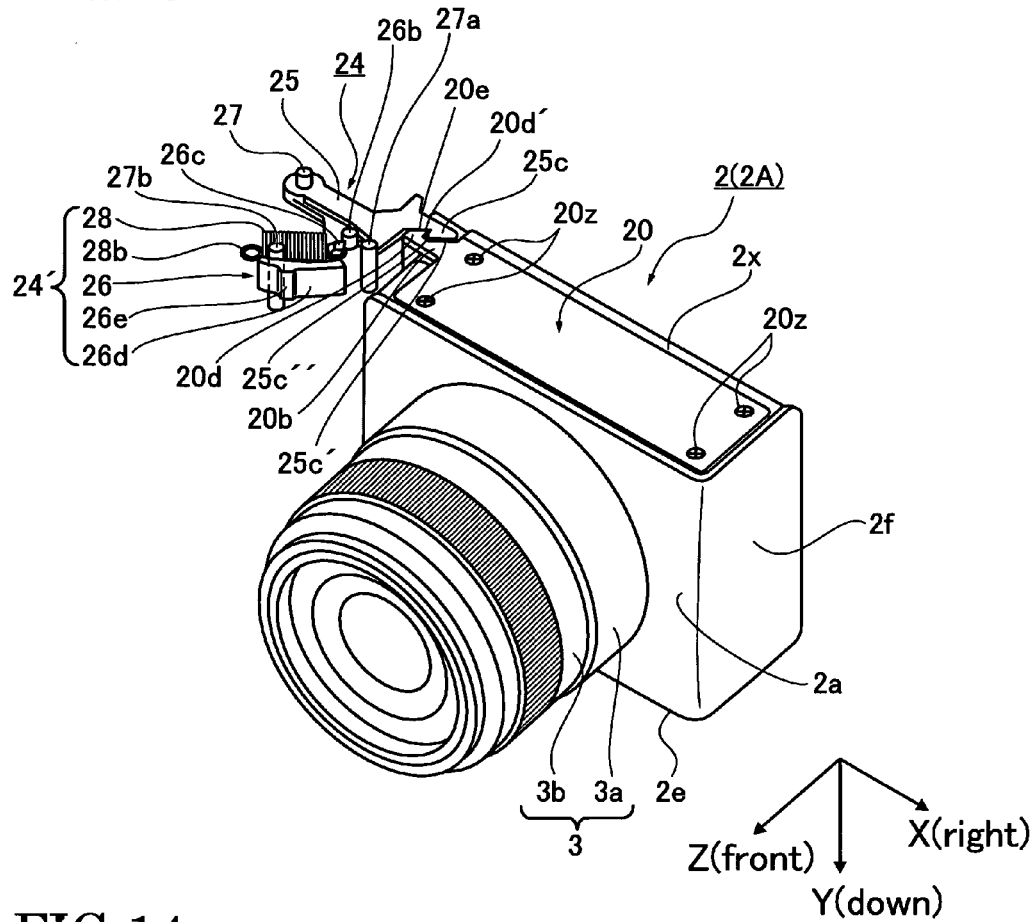
FIG. 13 is a perspective view showing an engagement relationship of the image pickup unit, a locking member, and an unlocking member shown in FIG. 1.
Figure 14:
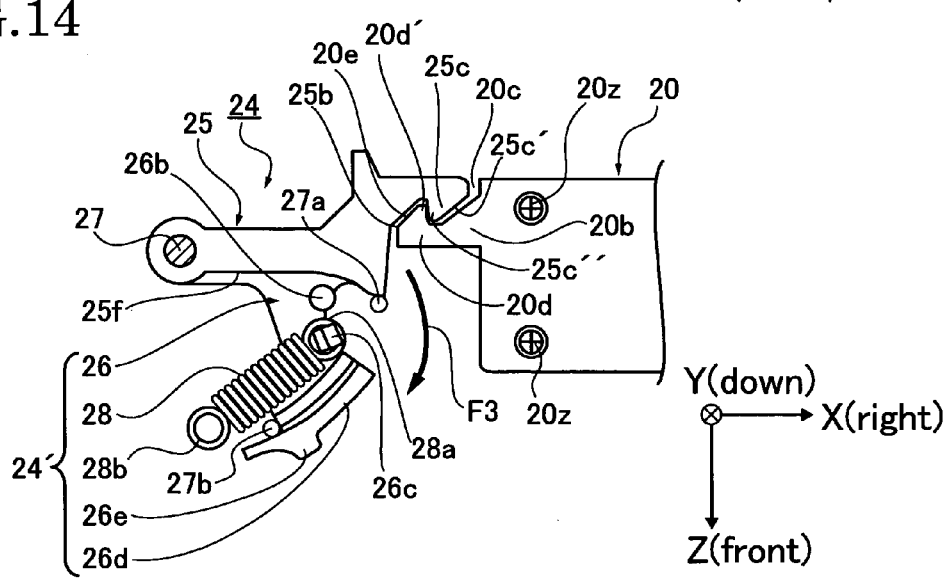
FIG. 14 is a partial enlarged view showing an engagement relationship of the locking member, the unlocking member, and a to-be-locked member shown in FIG. 13.

In the camera body 1, a locking mechanism 24 shown in FIGS. 13 and 14 is provided. The locking mechanism 24 is located at a crossing section (corner) where the side wall section 1C and the upper wall section 1D meet. The locking mechanism 24 has a capability of locking the image pickup unit 2. As shown in FIG. 5C, the locking mechanism 24 is located in the proximity of the upper left corner with respect to the housing 2A, when the housing 2A is viewed from an oblique direction with the housing 2A placed in the recess 1A.

The locking mechanism 24 roughly includes a locking plate 25 (see FIGS. 15 and 16) as a locking member, a spindle 27, and a stopper 27a. The stopper 27a is fixed to the camera body 1. The locking plate 25 serves a function to lock the image pickup unit 2 in cooperation with the to-be-locked claw 20d as a to-be-locked member. The unlocking mechanism 24' roughly includes an unlocking manipulating member (unlocking plate) 26 (see FIGS. 17 and 18), a spindle 27, and a stopper 27b. The stopper 27b is fixed to the camera body 1. The unlocking manipulating member 26 serves a function to unlock the image pickup unit 2 locked to the camera body 1 by the locking plate 25.

The unlocking manipulating member 26 is provided at a position similar to that of a remove button of an interchangeable lens barrel unit of a conventional single lens reflex camera, when the camera body 1 is viewed from the front face. Thus, even a user who is accustomed to a conventional single-lens reflex camera of interchangeable lens barrel type can easily perform removal operation of the image pickup unit 2, and erroneous operation is less likely to occur. Hence, it is possible to provide a camera body 1 from which an image pickup unit can be easily removed, while reducing risk due to erroneous operation.

Figure 15:
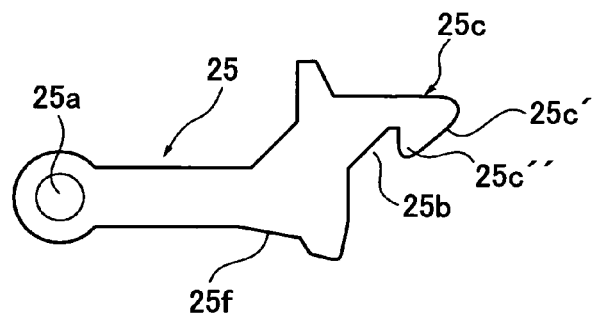
FIG. 15 is a plan view of the locking member shown in FIG. 14.
Figure 16:
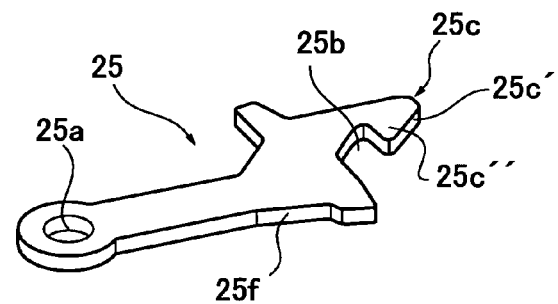
FIG. 16 is a perspective view of the locking member shown in FIG. 15.

As shown in FIGS. 15 and 16, the locking plate 25 has a shaft hole 25a, a notch section 25b, and a locking claw 25c.

The spindle 27 (see FIGS. 13 and 14) is passed through the shaft hole 25a. A claw tip 25c' of the locking claw 25c is directed forward, when a direction from the rear side to the front face side of the camera body 1 is defined to be forward. In addition, a claw tip 20d' (see FIG. 14) of a to-be-locked claw 20d is directed to a direction facing the back wall section 1B with the image pickup unit 2 placed in the recess 1A. That is to say, the claw tip 20d' of the to-be-locked claw 20d is directed backward when a direction from the front face side to the rear side of the camera body is defined as backward.

The locking plate 25 is turned around the spindle 27 and biased to a forward direction (arrow F3 direction in FIG. 14) by biasing means (not shown). The stopper 27a serves a function to control a turning stop position of the locking plate 25 by the biasing means. When the locking claw 25c and the to-be-locked claw 20d are not engaged with each other, the locking plate 25 is held in a state to abut on the stopper 27a, by turning and biasing of the biasing means.

The unlocking manipulating member 26 is disconnected from the stopper 27a. An inclined wall 25c' is formed in the locking claw 25c. The inclined wall 25c' is engaged with an inclined wall 20e, producing component force that turns the locking plate 25 backward with the spindle 27 as a supporting point, when the image pickup unit 2 is attached to the camera body 1 by moving the image pickup unit 2 from right to left relative to the camera body 1.

Figure 17:
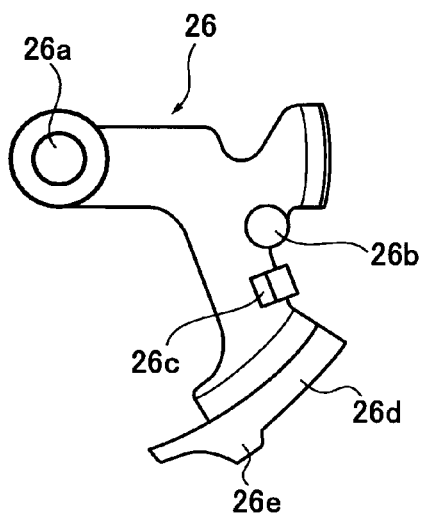
FIG. 17 is a plan view of the unlocking member shown in FIG. 14.
Figure 18:
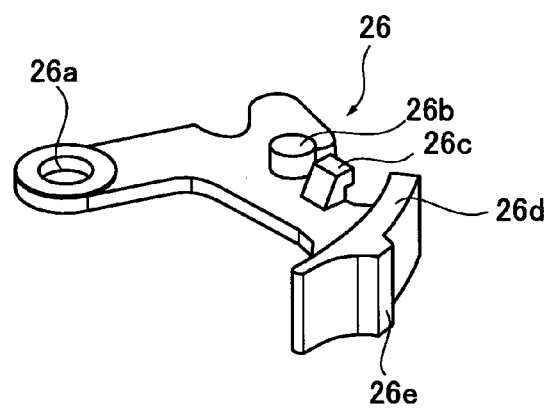
FIG. 18 is a perspective view of the unlocking member shown in FIG. 14.

As shown in FIGS. 17 and 18, the unlocking manipulating member 26 has a shaft hole 26a, a releasing protrusion 26b, a latching protrusion 26c and an unlock button 26d. The spindle 27 which rotatably supports the locking plate 25 passes through the shaft hole 26a. The spindle 27 is inserted into the shaft hole 25a and the shaft hole 26a and fixed to the camera body 1.

The releasing protrusion 26b serves a function to abut the side surface 25f of the locking plate 25 and turn the locking plate 25 in an unlocking direction (opposite direction to F3). One end 28a of an unlocking spring 28 is latched to the latching protrusion 26c. The other end 28b of the unlocking spring 28 is latched to a latching protrusion (not shown) provided at an appropriate part in the side wall section 1C. The unlocking spring 28 serves a function to turn and bias the unlocking manipulating member 26 forward with the spindle 27 as a center.

The stopper 27b serves a function to control a turning stop position of the unlocking manipulating member 26 by turning and biasing force of the unlocking spring 28. The unlocking manipulating member 26 abuts on the stopper 27b when it is not manipulated. When the unlocking manipulating member 26 is manipulated, the unlocking manipulating member 26 moves away from the stopper 27b, and is turned in a direction toward the stopper 27a. The turning of the unlocking manipulating member 26 to the manipulation direction is controlled by the stopper 27a.

As shown in FIGS. 1 and 2, the unlock button 26d is located above the finger rest recess 1c" when the side on which the upper wall section 1D exists is up. That is to say, the finger rest recess 1c" is located below the unlocking manipulating member 26. The unlock button 26d has a finger receiving section 26e which protrudes outward from the grip section 1c.

The upper part of the grip 1c is usually a position which does not hinder a user from gripping the grip section while shooting. Since the position does not easily allow inadvertent manipulation, it is possible to provide a camera body from which an image pickup unit can be easily removed, while further reducing risk of erroneous operation. Furthermore, since the unlocking manipulating member 26 is provided at a position above the grip recess where the user's finger is less likely to reach when gripping a grip convex section, a concern of erroneous operation can further be reduced.

In this embodiment, the unlock button 26d is turned along the appearance configuration of the grip section 1c. The locking plate 25 and the unlocking manipulating member 26 overlap each other, and are turned with the spindle 27 as a supporting point. The locking plate 25 is turned on almost the same plane as a turning plane of the unlock button 26d.

(Detailed Structure of Camera-Body Connector Section 12 and Image-Pickup-Unit Connector Section 11)

Figure 19:
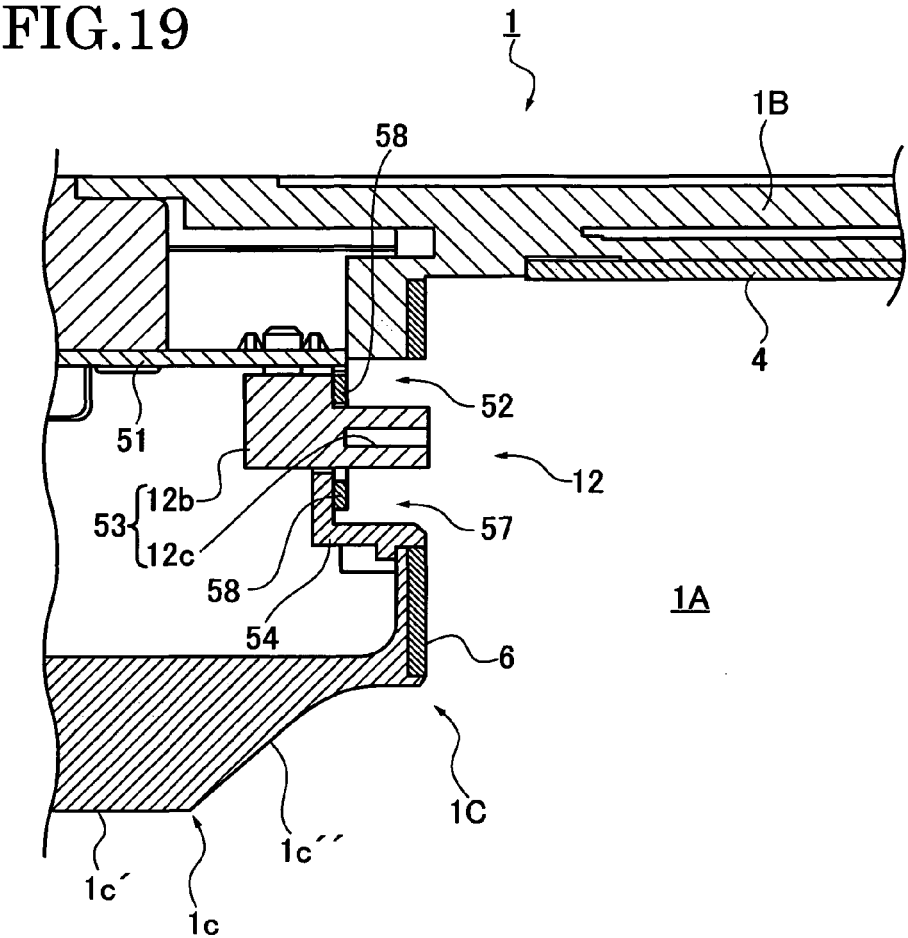
FIG. 19 is a cross sectional view showing a detailed structure of a camera-body connector section shown in FIGS. 4 and 5C.
Figure 20:
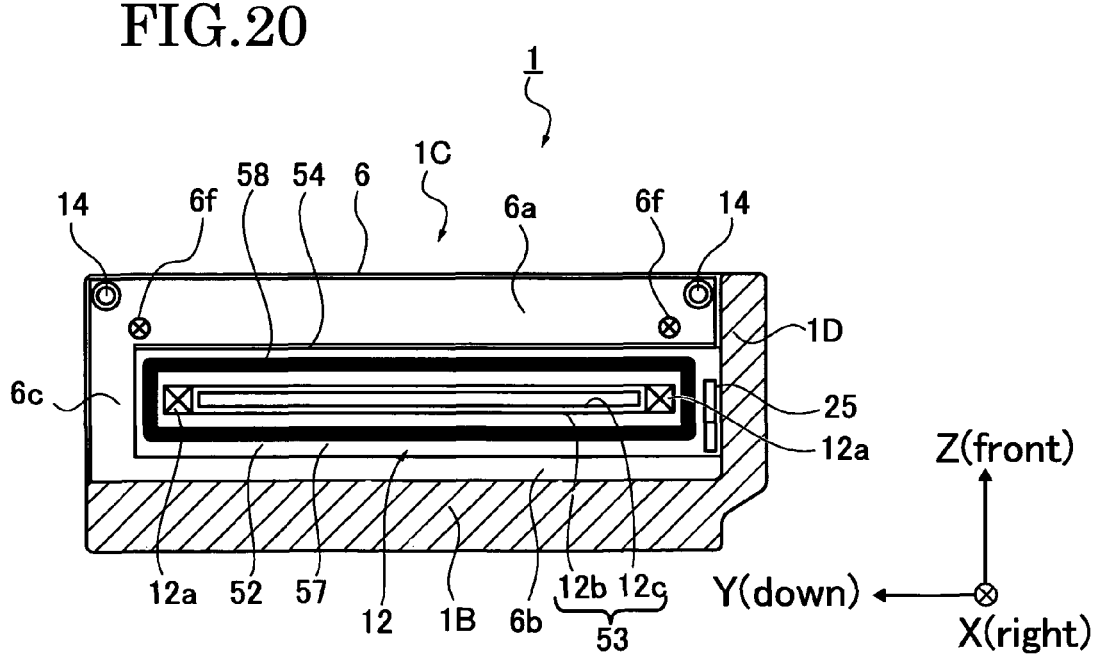
FIG. 20 is a cross sectional view showing a state where the camera-body connector section shown in FIG. 19 is viewed straight with the back wall section on the downside.

As shown in FIGS. 19 and 20, in the side wall section 1C, an opening for fitting 52 which opens to the recess 1A is formed corresponding to the image-pickup-unit connector section 11. A connector main body 53 is placed in the opening 52. The camera-body connector section 12 is formed by placing the connector main body 53 in the opening 52. The side surface wall reinforcing sheet metal member for body 6 is placed so as to avoid the opening 52.

Here, as shown in FIG. 20, the side surface wall reinforcing sheet metal member for body 6 includes an upper marginal plate section 6a, a lower marginal plate section 6b and a connecting plate section 6c which connects the plate sections 6a and 6b, when the side wall section 1C is viewed from the front face, with the back wall section 1B on the downside and the upper wall section 1D on the right side. The connecting plate section 6c is located on the left side and the right side of the side surface wall reinforcing sheet metal member for body 6 is open.

An outline configuration of the opening 52 is defined by a connector cover member 54 provided in the side wall section 1C and the back wall section 1B. The connector main body 53 is formed of the connector terminal 12c covered with the covering member 12b.

Figure 21:
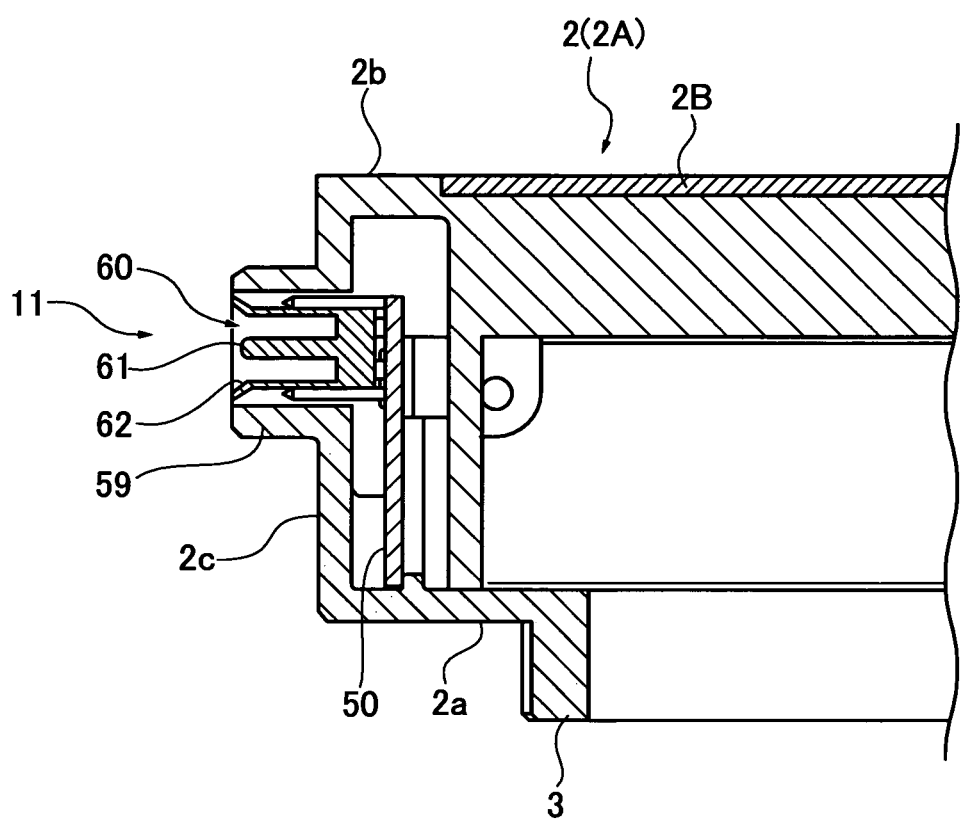
FIG. 21 is a cross sectional view showing a detailed structure of the image-pickup-unit connector section shown in FIG. 8.

To enable data transfer (communications) between the camera body 1 and the image pickup unit 2, the connector main body 53 is connected to a connector main body 60 of the image-pickup-unit connector section 11 shown in FIG. 21.

The connector terminal 12c can be electrically connected with a connector terminal 61, as a result of horizontal movement of the connector main body 60 of the image-pickup-unit connector section 11 relative to the connector terminal 61. Here, the connector terminal 12c is of female type. In addition, the connector terminal 61 is of male type. Additionally, the connector terminal 61 is surrounded by a surrounding member 62. As shown in FIG. 8, positioning holes 63 into which positioning protrusion 12a, 12a are fitted are formed between the surrounding member 62 and the connector terminal 61.

The connector terminal 12c is connected to a connector board 51 which is fixed to the camera body 1. On the connector board 51, electric circuits such as a circuit to control the image pickup unit 2 by manipulating the manipulating section, a processing circuit to process images captured by the image pickup unit 2, or the like are wired.

The covering member 12b is formed of an elongated shape so as to cover the connector terminal 12c. The covering member 12b serves a function to prevent the electric circuit, an electric element or the like from being damaged by discharge, caused by a touch of a human hand, of static electricity accumulated on human body, when the image pickup unit 2 is attached to the camera body 1

In the camera-body connector section 12, an annular groove 57 surrounding the connector main body 53 is formed due to a difference in dimensions of the opening 52 and the connector main body 53. The annular groove 57 is such dimensioned that a connector cover section 59 as a fitting protrusion of the image-pickup-unit connector section 11 can enter medially, while surrounding the connector main body 53 and the connector main body 60 which are mutually connected. A rectangular sealing member 58 which surrounds the connector main body 53 is provided in the annular groove 57. As shown in FIG. 20, in the annular groove 57, the locking plate 25 is placed more closely to the upper wall section 1D than to the sealing member 58.

The connector cover section 59 protrudes from the left side surface 2c of the housing 2A. The connector main body 60 is placed within the connector cover 59.

The sealing member 58 is shaped like a sheet formed of elastically deformable materials such as rubber (elastic resin material) or sponge (spongy resin material). The sealing member 58 is bonded to an annular wall forming the annular groove 57 using an adhesive or the like.

Figure 22:
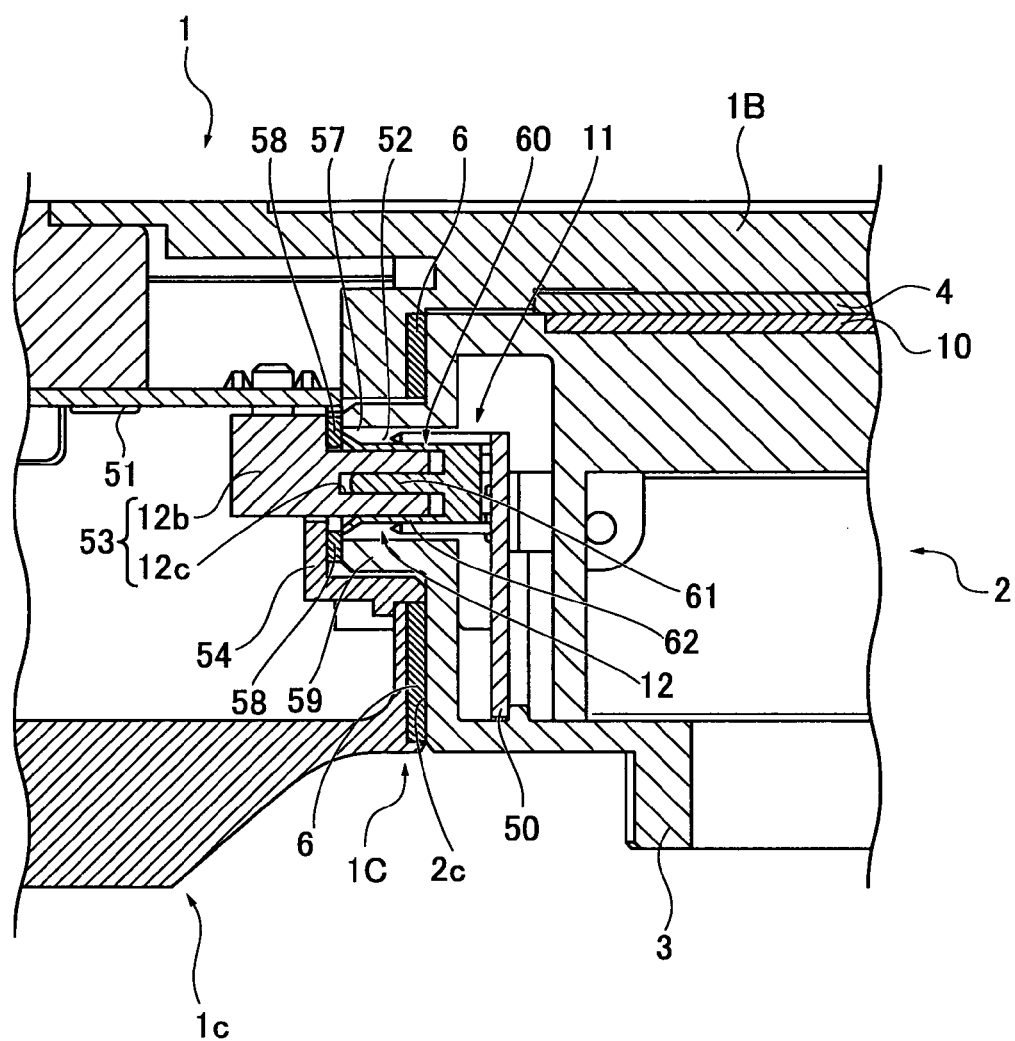
FIG. 22 is a cross sectional view showing how the camera-body connector section shown in FIG. 19 and the image-pickup-unit connector section shown in FIG. 21 are connected to each other.

The sealing member 58 has a dust-proof or water-proof function which prevents dust or liquid or the like from adhering to the connector main body 53 (connector terminal 12c) and the connector main body 60 (connector terminal 61) which are mutually connected as shown in FIG. 22.

As shown in FIG. 22, when the image pickup unit 2 is attached to the recess 1A of the camera body 1 in an appropriate manner, the left side surface 2c of the housing 2A abuts on the side wall section 1C, that is to say, the side surface wall reinforcing metal sheet member for body 6, thereby performing positioning of the image pickup unit 2 in the left-right direction in the recess 1A.

In addition, with the image pickup unit 2 attached to the recess 1A of the camera body 1, the connector cover section 59 (see FIG. 21) of the image-pickup-unit connector section 11 is loosely fitted into the annular groove 57 of the camera-body connector section 12, the connector main body 60 of the image-pickup-unit connector section 11 is appropriately connected to the connector main body 53 of the camera-body connector section 12 by the paired positioning holes 63 and the paired positioning protrusions 12a, and thus the camera body 1 and the image pickup unit 2 are connected so that they can electrically communicate.

Then, a tip of the connector cover section 59 of the image-pickup-unit connector section 11 is brought into contact with the sealing member 58, by applying pressure, provided in the annular groove of the camera-body connector section 12.

Reliable sealing between the tip of the connector cover section 59 and the sealing member 58 is possible by the tip of the connector cover section 59 coming into contact with the sealing member 58 through application of pressure. Thus, it is possible to prevent entry of dust or liquid or the like from the recess 1A of the camera body 1 into the connector cover section 59 of the connector main body 60 of the connector section 11.

(Description of Shape of Plate Spring 2k)

Figure 23:
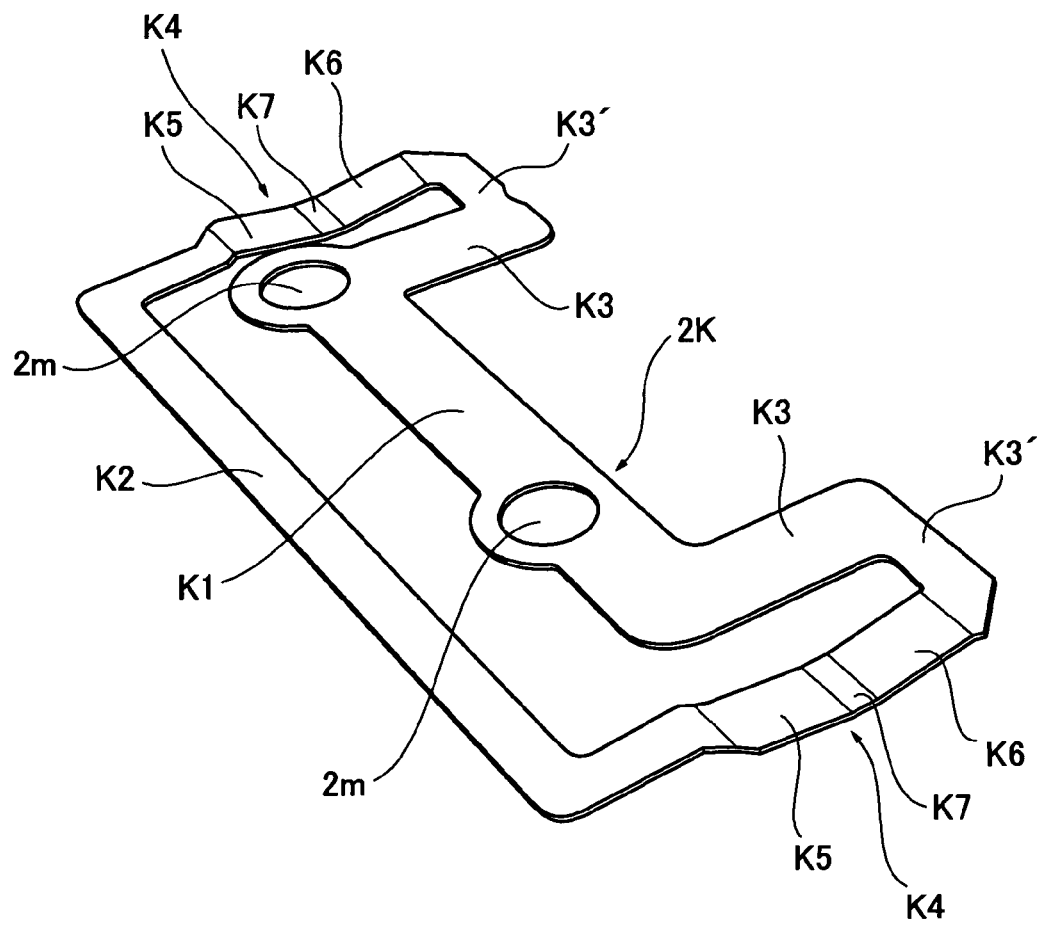
FIG. 23 is an enlarged perspective view showing an appearance configuration of the plate spring shown in FIG. 10A.
Figure 24:
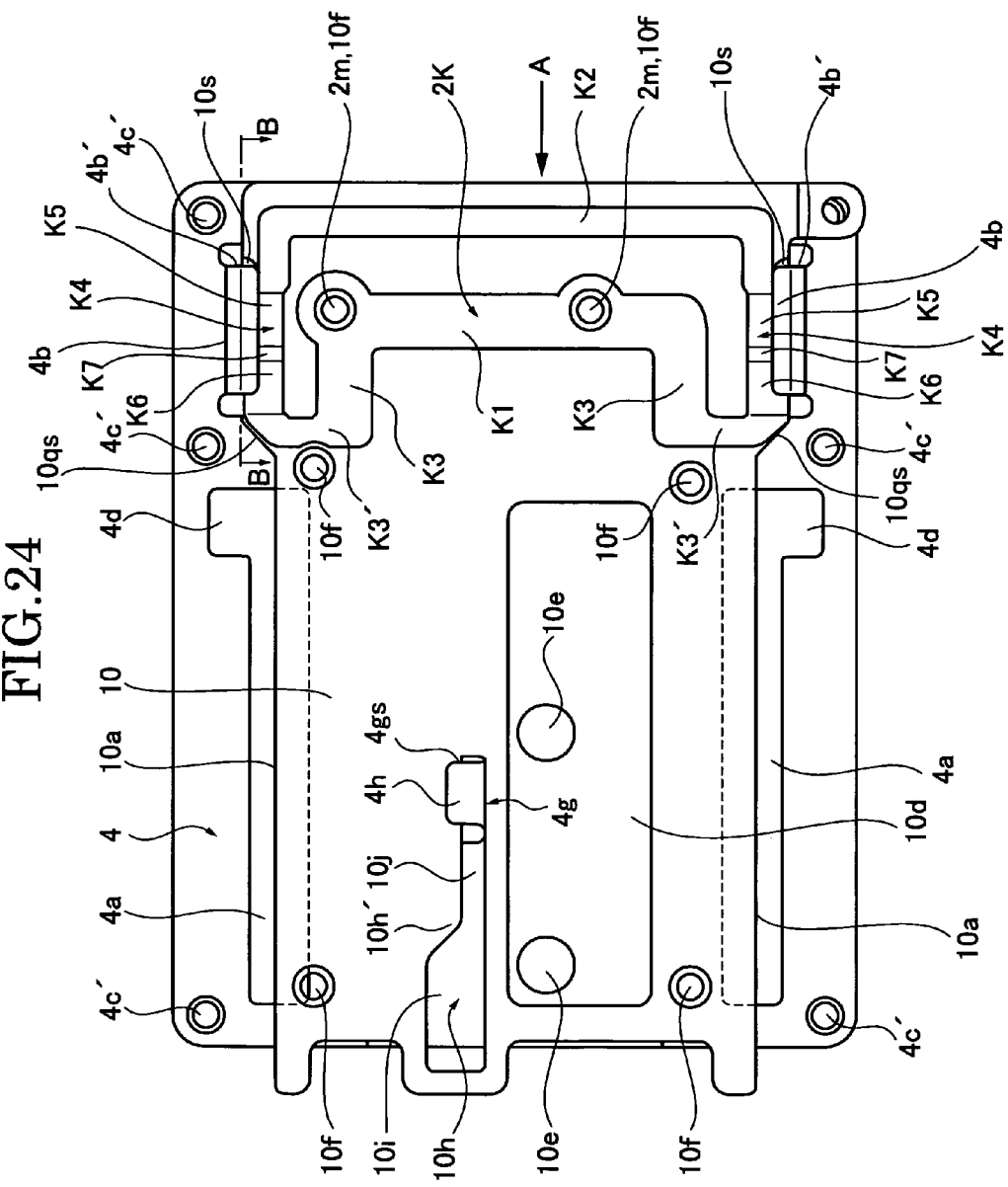
FIG. 24 is a plan view showing a relative positional relationship of the rear wall reinforcing sheet metal member for body shown in FIG. 5A, the rear wall reinforcing sheet metal member for unit shown in FIGS. 6 and 9, and the plate spring shown in FIGS. 10A and 23.

FIG. 23 is an enlarged perspective view showing an appearance configuration of the plate spring 2k. FIG. 24 is a view showing a positional relationship of the plate spring 2k, the rear wall reinforcing sheet metal member for unit 10 and the rear wall reinforcing sheet metal member for body 4 when their engagement is in a complete state.

As shown in FIGS. 10B, 23 and 24, the plate spring 2k has a mounting plate section k1 and a free plate section k2. The mounting plate section k1 and the free plate section k2 are almost parallel to each other and extend in a direction orthogonal to the paired guiding holes for engaging claw cut and bent section 10r of the image pickup unit 2 shown in FIGS. 6 and 10.

The paired screw holes 2m, 2m are formed at an interval in the paired the mounting plate sections k1. The mounting plate sections k1 have paired parallel plate sections k3, k3 which extend in parallel with the guiding holes for engaging claw cut and bent section 10r from the parts where the screw holes 2m, 2m are formed. The paired parallel plate sections k3, k3 have orthogonal plate sections k3', k3' which orthogonally extend in a direction to the guiding groove 10q on the same plane in the proximity to the border between the guiding holes for engaging claw cut and bent section 10r and the guiding groove 10q. The paired orthogonal plate sections k3', k3' are connected to each other at both ends in a direction in which the free plate section k2 extends.

In FIGS. 23 and 24, signs k4, k4 designate connecting plate sections which connect the paired orthogonal plate sections k3', k3' and the free plate section k2. As shown in FIG. 23, the paired connecting plate sections k4, k4 includes inclined elastic plate sections k5, k6 and abutting plate sections k7. The paired connecting plate sections k4, k4 extends along the guiding holes for engaging claw cut and bent section 10r.

The inflected sections 4f, 4f of the paired engaging claws 4b, 4b are configured so that with reference to the rear wall reinforcing sheet metal member for unit 10, they face the connecting plate sections k4, k4 from the inside of the image pickup unit 2 rather than from the rear wall reinforcing sheet metal member for unit 10. That is to say, the inflected sections 4f, 4f of the paired engaging claws 4b, 4b are configured so that they face the connecting plate sections k4, k4.

The inclined elastic plate section (biasing spring) k5, k6 are located on the engaging plate sections 10n, 10n facing the engaging claws 4b, 4b and bias the image pickup unit 2 to the back wall section 1B.

If there was no engaging protrusion 4g when the inflected section 4f abuts on the engaging plate section 10n from the outside of the image pickup unit 2, both connector sections 11, 12 might be connected to each other with the image pickup unit 2 inclined to the rear wall reinforcing sheet metal member for body 4 of the camera body 1. However, according to the embodiment of the present invention, no such problem occurs because of the following reasons.

Figure 26:
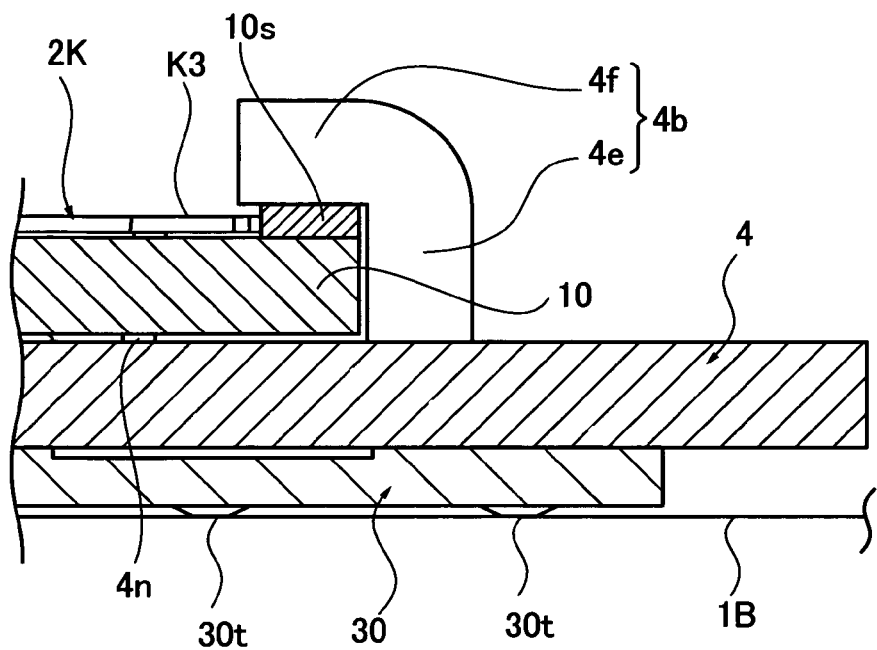
FIG. 26 is a cross sectional view showing an engagement relationship between the rear wall reinforcing sheet metal member for unit shown in FIG. 25 in a partially enlarged manner.
Figure 27:
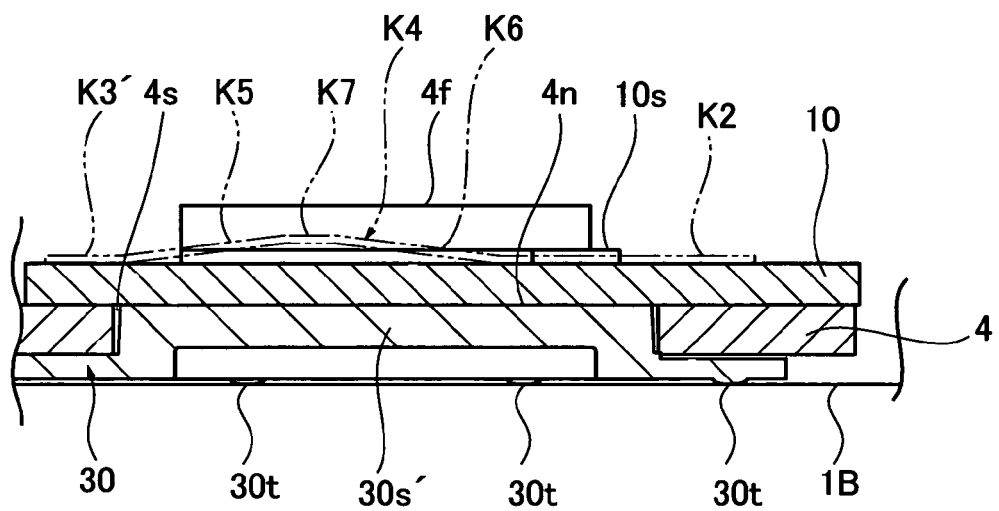
FIG. 27 is a cross sectional view along an arrow B-B line shown in FIG. 24.

In addition, as shown in FIGS. 26 and 27, when the inflected section 4f is located within the image pickup unit 2 with respect to the engaging plate section 10n, irrespective of presence of engaging protrusion 4g, there is no possibility that both connector sections 11, 12 are connected to each other with the image pickup unit 2 inclined to the rear wall reinforcing sheet metal member for body 4 of the camera body 1.

Paired engaging claws 4b, 4b can abut on the abutting plate section k7 with the image pickup unit 2 appropriately attached to the camera body 1, that is to say, with the image-pickup-unit connector section 11 and the camera-body connector section 12 connected to each other.

Figure 25:
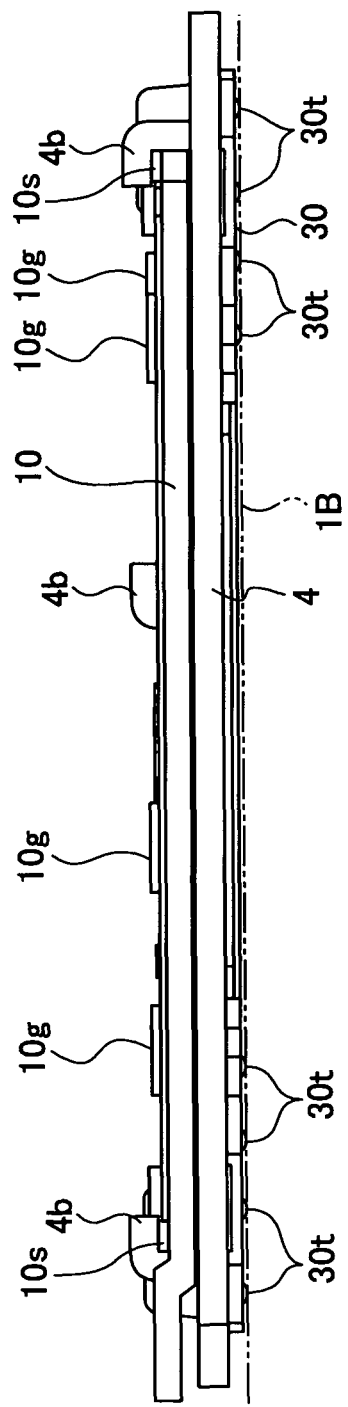
FIG. 25 is an explanatory view of an engagement relationship of the rear wall reinforcing sheet metal member for unit and the rear wall reinforcing sheet metal member for body shown in FIG. 24, as viewed from a direction of an arrow A shown in FIG. 24.

As shown in FIGS. 24 to 26, pressing force in a direction to the rear wall reinforcing sheet metal member for body 4 by biasing force due to elastic deformation of the inclined elastic plate sections k5, k6 is applied to the rear wall reinforcing sheet metal member for unit 10, with engagement of the engaging claw 4b with engaging plate sections 10n, 10n of the rear wall reinforcing sheet metal member for unit 10 being completed. As a result of this, the image pickup unit 2 is pressed against the camera body 1. In addition, the semicircular convex section 10s abuts on the inflected section 4f, and even if there is any gap attributed to a dimension error between the inflected section 4f and the rear wall reinforcing sheet metal member for unit 10, play due to this dimension error will be absorbed by elastic deformation of the plate spring 2k and the semicircular convex section 10s, as shown in FIG. 27. In addition, FIG. 27 shows a state of the plate spring 2k before the elastic formation in a two-dot chain line.

(Description of Sliding Contact Ribs 4k, 4n of Resin Plate 30 and Supplementary Description of Configuration of Resin Plate 30)

The function of the sliding contact rib 4k is identical to that of the sliding contact rib 4n. Thus, here, the function of the sliding lib 4n will be described with reference to FIGS. 28 and 29.

Figure 28:
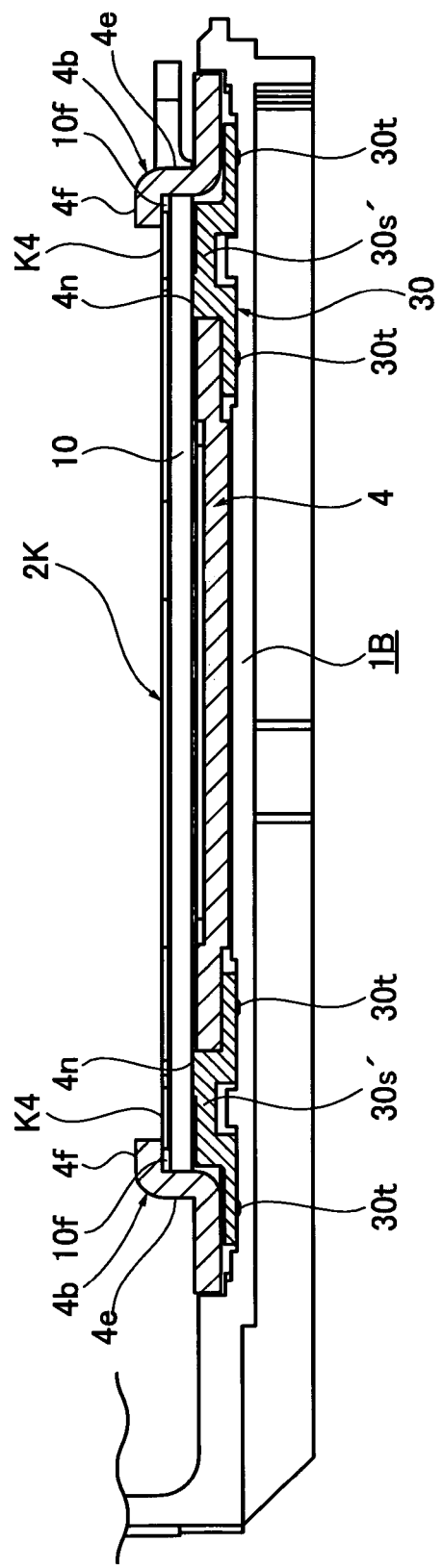
FIG. 28 is a view cross-sectionally showing in detail the engagement relationship of the rear wall reinforcing sheet metal member for unit and the rear wall reinforcing sheet metal member for body shown in FIG. 25.
Figure 29:
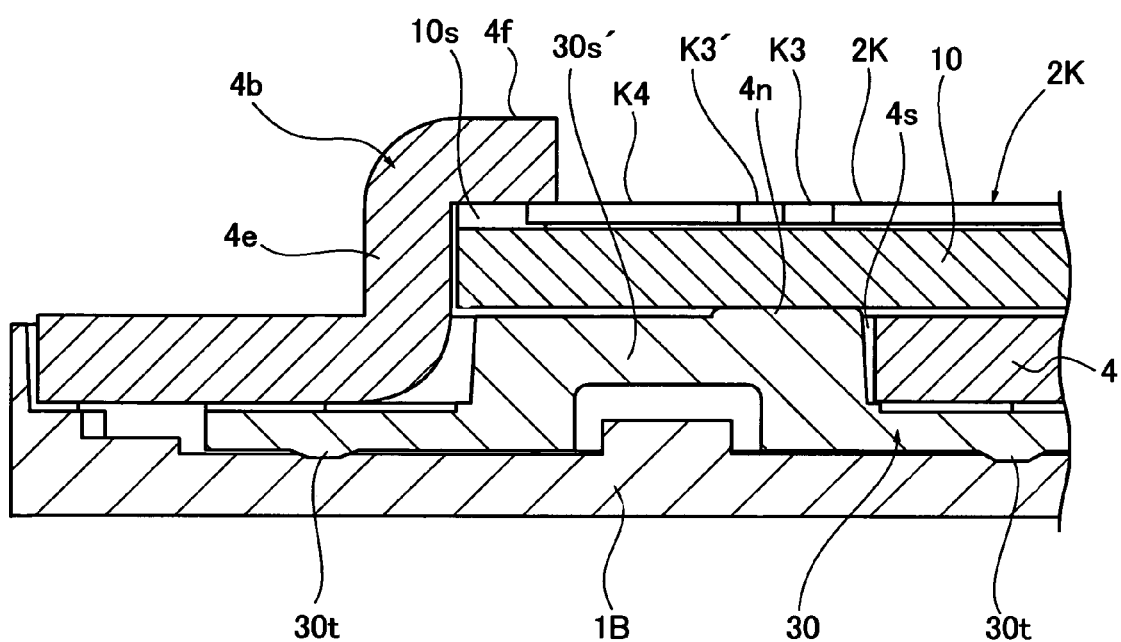
FIG. 29 is a partial enlarged cross-sectional view showing the engagement relationship of the rear wall reinforcing sheet metal member for unit and the rear wall reinforcing sheet metal member for body shown in FIG. 28.

If a configuration is such that the rear wall reinforcing sheet metal member for unit 10 comes into direct contact with the rear wall reinforcing sheet metal member for body 4 when the image pickup unit 2 is attached to or detached from the camera body 1 by sliding the image pickup unit 2 in a left-right direction, metallic sound is produced due to metal scraping of the rear wall reinforcing sheet metal member for body 4 and the rear wall reinforcing sheet metal member for unit 10. However, according to the embodiment, it is possible to prevent production of metallic sound due to metal scraping because the configuration is such that when the image pickup unit 2 slides in a left-right direction with respect to the camera body 1, the rear wall reinforcing sheet metal member for unit 10 slides in the left-right direction while being in sliding contact with the resin-made sliding contact rib 4n, as shown in FIGS. 28 and 29.

Alternatively, as a configuration of placing the resin plate 30 in the recess of the back wall section 1B, if the image pickup unit 2 is pressed against the back wall section 1B, the resin plate 30 elastically deforms and rolls back due to a dimensional tolerance between the back wall section 1B and the resin plate 30, and so-called "clip-clop sound" is produced due to the roll-back of the resin plate 30. In the embodiment, however, since a configuration is such that multiple semicircular protrusions 30t are formed to absorb a dimensional tolerance between the back wall section 1B and the resin plate 30 at appropriate positions on a surface of the resin plate 30 on the side facing the back wall section 1B, as shown in FIGS. 25 to 29, the configuration avoids "clip-clop sound" due to the roll-back by preventing the roll-back and elastic deformation due to the dimensional tolerance.

(Circuit Configuration of Electrical Parts Incorporated in Camera Body 1 and Image Pickup Unit 2)

Now, electrical parts incorporated in the camera body 1 and image pickup unit 2 will be described with reference to FIG. 30.

Figure 30:
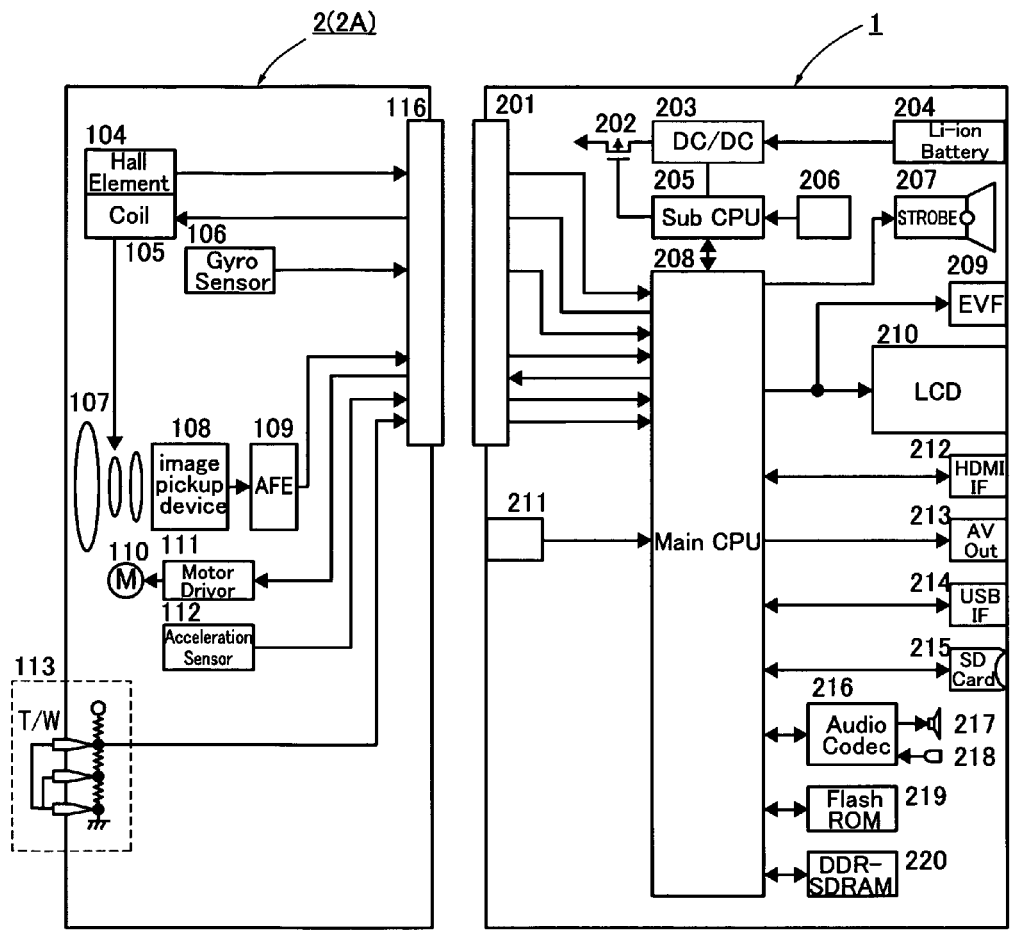
FIG. 30 is a circuit diagram showing one example of an electrical part built in the imaging apparatus shown in FIGS. 1 and 2.

As shown in FIG. 30, for example, in the camera body 1 provided are a lithium ion battery 204, a strobe light emitting section 207 (5a), an electronic viewfinder device 209, a liquid crystal display device (LCD) 210 having a display surface 1b as a display section, a high-vision television connector interface (HDMIIF) 212, an audio-video (AVOUT) output terminal 213, an USB interface (USBIF) 214, an SD card interface (SD card) 215, an audio-codec circuit (Audio codec) 216, a speaker 217, a microphone 218, a flash ROM (Flash ROM) 219 as a recording medium which stores image data, a DDR-SDRAM 220, a main CPU 208 also functioning as a receiving section which receives image data, manipulation switches 206, 211 which give an imaging instruction, a sub-CPU (Sub CPU) 205 as an imaging instruction receiving section which receives an imaging instruction from the manipulation switch 206, a DC/DC power circuit 203, a switching element 202, and a connector terminal 201 (12c) of the camera-body connector section 12.

They constitute a part of electrical parts having publicly known functions which a digital camera is required to have as an imaging apparatus. The manipulating switch 206 is the release button 5y, for example, and the manipulating switch 211 is a manipulation key for manipulating the liquid crystal display (LCD) 210, for example, or the like. The liquid crystal display (LCD) 210 is provided on the back wall section 1B, for example. The manipulating switch 211 is provided at an appropriate position on the back wall section 1B.

In the housing 2A of the image pickup unit 2 are provided an imaging lens unit 107 as an optical system, an image pickup device 108, an AFE circuit 109, a hall element (Hall element) 104, a driving coil (Coil) 105, a gyro sensor (Gyro sensor) 106, a motor driver (Motor Driver) 111, a drive motor (M) 110, an acceleration detection sensor 112, a Tele/Wide detection switch 113, and a connector terminal 116 (61) of the image pickup unit connector section 11 which transmits image data.

These also constitute a part of included parts having the publicly known functions which a digital camera is required to have as an imaging apparatus. The imaging lens unit 107 includes multiple lenses, and a part of the multiple lens system is provided in the movable barrel 3b. In addition, in this embodiment, although the configuration is described as having the drive motor (M) 110 and the motor driver 111 provided in the image pickup unit 2, a configuration may alternatively be such that they are provided in the camera body 1.

Here, power is supplied to the image pickup unit 2 from the camera body 1. The hall element 104, the driving coil 105, and the gyro sensor 106, for example, constitute a part of the image stabilization mechanism. Signals of the image stabilization mechanism are inputted into the main CPU 208 by way of the connector terminals 116, 201, and the main CPU 208 performs image stabilization operation on the basis of these signals. The image stabilization operation is an operation to correct blurring of images projected on a light receiving surface of an image pickup device caused by hand movement.

For example, the operation may be to drive an image pickup device in a direction opposite to a direction of blurring detected by the gyro sensor 106 or to drive some optical devices of the image pickup lens unit 107 in a direction identical to the direction of blurring detected by the gyro sensor 106. A video signal of the image pickup device 108 is inputted into the main CPU 208 by way of the AFE circuit 109, subjected to predetermined image processing, and displayed on the liquid crystal display (LCD) 210 or the like.

Signals of the Tele/Wide detection switch 113 is inputted to the main CPU 208 by way of the connector terminals 106, 201, and the main CPU 208 controls the motor driver 111 and the drive motor 110 on the basis of the switch signals of the Tele/Wide detection switch 113 and the manipulating switch 211, and thereby drive controls the image pickup lens unit 107. Detection output of the acceleration detection sensor 112 is inputted to the main CPU 208 by way of the connector terminals 116, 202, and the main CPU 208 controls inclination of images to be displayed on the liquid crystal display (LCD) 210 based on detection output of the acceleration detection sensor 112. Based on the detection output of the acceleration detection sensor 112, a degree of inclination of the image pickup unit 2 to horizontality is displayed on the liquid crystal display (LCD) 210. The degree of inclination of the image pickup unit 2 to horizontality may be expressed by a numeric value or an image.

When the manipulating switch 206 is manipulated, the image pickup unit 2 captures a subject on the basis of an imaging instruction thereof and converts the subject image into image data. The connector terminal 116 transmits the image data to the main CPU 208.

Figure 31:
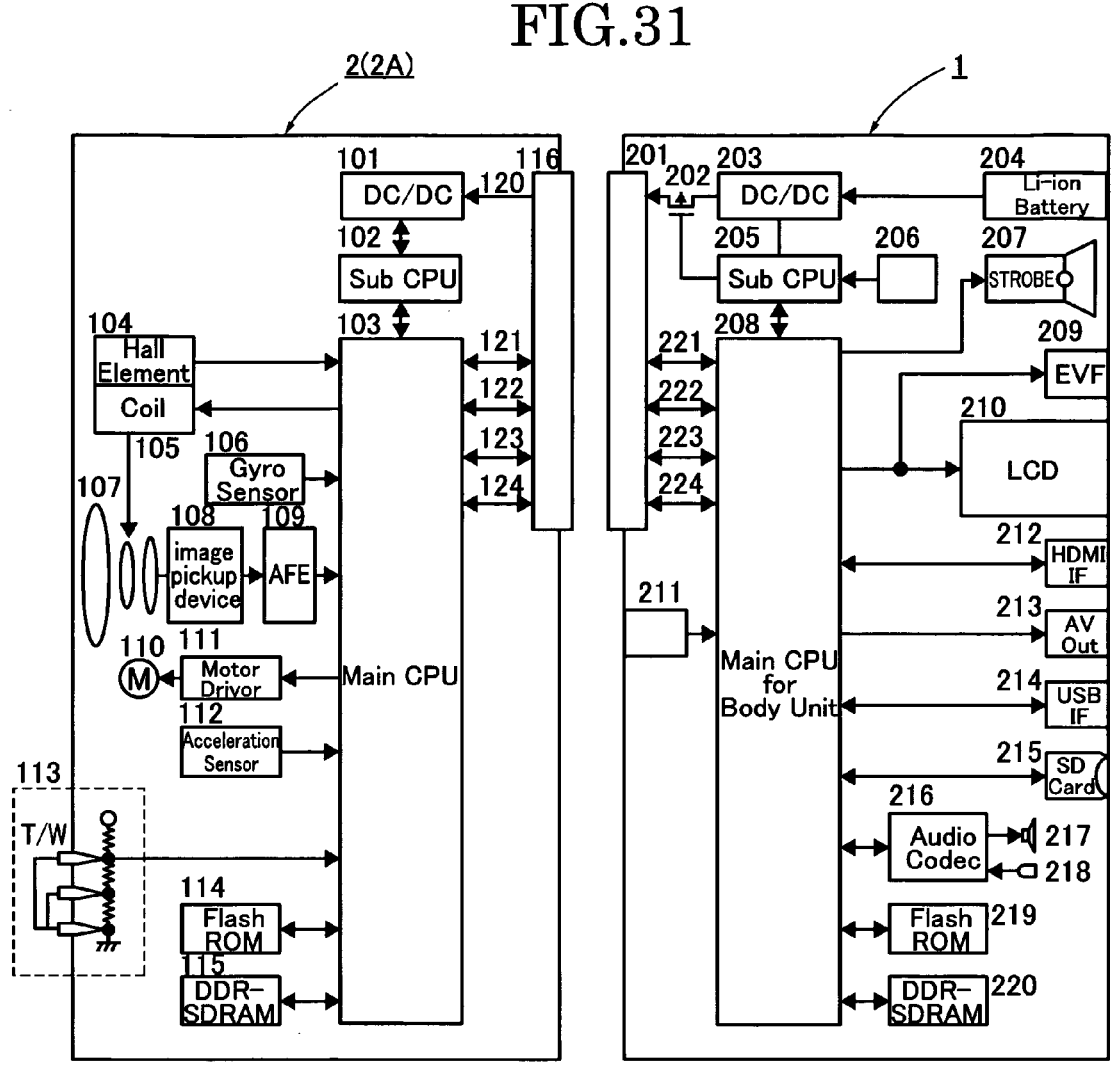
FIG. 31 is a circuit diagram showing another example of an electrical part built in the imaging apparatus shown in FIGS. 1 and 2.

As shown in FIG. 31, such a configuration can be adopted that a DC/DC power circuit 101, a sub CPU 102, a main CPU 103, a flash ROM 114, and a DDRSDRAM 115 are provided in the image pickup unit 2, and after the main CPU 103 performs image processing, an image processing signal is transmitted to the main CPU 208 by way of the connector terminals 116, 201. Alternatively, such a configuration can be adopted that the main CPU 103 performs compression processing into a format such as JPEG or the like, and transmits compressed image data to the main CPU 208 by way of the connector terminals 116, 201. Thus, the configuration in which the image pickup unit 2 performs image processing or compression processing enables stable images with less noise to be transmitted to the main CPU 208 of the camera body 1. These electrical parts are arranged on an electrical base to be described later.

Thus, according to the embodiment of the present invention, as shown in FIGS. 1 and 2, image pickup units 2 of different sizes can be attached to or detached from the same camera body 1. If a camera body 1 and an image pickup unit 2 are configured so that when the image pickup unit 2 is attached to the camera body 1, a lower surface of the housing 2A of the image pickup unit 2 is flush with that of the camera body 1, handling of the camera body 1 to which the image pickup unit 2 is attached will be easier. Furthermore, if a configuration is such that whenever an image pickup unit 2 of a different size is attached to the camera body 1, a lower surface of the image pickup unit 2 is flush with that of the camera body 1, handling of the camera body 1 will be easier irrespective of whatever size of the image pickup unit is attached.

Since the recess 1A of the camera body 1 is open to three directions (right, down, forward) and the restriction on the size of an image pickup unit 2 to the camera body 1 is eased, a large-size high-sensitive image pickup device or a small-size image pickup device can be placed in the image pickup unit 2 according to a customer's need, and an image pickup unit 2 whose size differs in the right, left, up, down, forward and backward directions can be attached to or detached from a common camera body 1. In addition, as freedom in size of the lens barrel 3 of the image pickup unit 2 has been increased, the image pickup unit can be offered as an interchangeable lens group unit of a variety of lenses from a single-focus lens to a high-power zoom lens. Therefore, customers purchase only an image pickup lens 2 and will upgrade it as the image pickup device 108 progresses.

Since the recess 1A of the camera body 1 is opened to the two directions of the right and down directions, an image pickup unit 2 having different sizes in a left-right direction and an up-down direction can be attached. Thus, as the restriction on the size of the image pickup unit 2 to the camera body 1 has been eased, a large-size high-sensitive image pickup device or a small-size image pickup device can be placed in the image pickup unit 2 according to a customer's need, and image pickup units 2 of different sizes having different lens barrels 3 or image pickup devices can be attached to or detached from a common camera body 1. In addition, as freedom in size of the lens barrel 3 of the image pickup unit 2 has been increased, the image pickup unit 2 can be offered as an interchangeable lens group unit of a variety of lenses from a single-focus lens to a high-power zoom lens. Therefore, customers purchase only an image pickup lens 2 and will upgrade it as the image pickup device 108 progresses.

According to the embodiment of the present invention, as stated above, it is possible to attach to or detach from the same camera body multiple image pickup units 2 which have lens barrels 3 or image pickup devices of different sizes and which have different sizes of housings placed in the recess. The lens barrel 3 of the image pickup unit 2 shown in FIG. 2 is longer and has larger optical system than the lens barrel 3 of the image pickup unit 2 shown in FIG. 1. It is also desirable to configure the camera body 1 and the image pickup unit 2 so that the lower surface 2e of the housing 2A of the image pickup unit 2 is flush with that of the camera body 1 when the image pickup unit 2 is attached to the camera body 1.

That is to say, here, as the recess 1A of the camera body 1 is opened to three directions, and as the restriction on the size of the image pickup unit 2 to the camera body 1 has been eased, a large-size high-sensitive image pickup device or a small-size image pickup device can be placed in the image pickup unit 2 according to a customer's need, and image pickup units 2 with different lens barrels 3 or image pickup devices can be attached to or detached from a common camera body 1. In addition, as freedom in size of the lens barrel 3 of the image pickup unit 2 has been increased, the image pickup unit can be offered as an interchangeable lens group unit of a variety of lenses from a single-focus lens to a high-power zoom lens. Therefore, customers purchase only an image pickup lens 2 and will upgrade it as the image pickup device 108 progresses. In addition, when a bay connector is used for both connector sections 11, 12, image data can be transferred in a short time.

In addition, there were restrictions on the size of an image pickup device, the distance between a lens mount and an image pickup device in an optical axis direction (flange back), a diameter of a lens mount or the like in a conventional standard for a lens mount for an interchangeable lens (Four Thirds System or the like, for example). Due to the restrictions, there was a limit on slimming/downsizing as an entire camera.

In contrast, in the present invention, the size of an image pickup device, the distance between an optical system and the image pickup device in an optical axis direction, a diameter of a lens barrel or the like can be freely set for each image pickup unit. Depending on an application of each image pickup unit, a variety of optical systems and various types/sizes of image pickup devices (types: CMOS, CCD or the like. Sizes: ASP-C, ⅔-inch type, 1/2.33 type or the like) can be freely combined.

In addition, when slimming/downsizing of an entire camera is performed, an entire size of an image pickup unit can be reduced since length of an optical axis direction of the image pickup unit 2 can be shortened and a diameter of a lens barrel can be reduced.

On the other hand, a larger-size image pickup device and a larger optical system can be combined to improve imaging performance of a camera, thereby being able to improve various imaging capabilities. Also in this case, since a degree of freedom in a combination of an optical system and an image pickup device is high and optimum designing is possible by combining an optical system and an image pickup device, an entire size of the image pickup unit can be reduced while improving the imaging performance. It is also possible to combine a large optical system with a small image pickup device or a small optical system with a large image pickup device, depending on applications.

Furthermore, since an image pickup unit which has been slimmed and downsized as an entire camera and an image pickup unit which has improved imaging performance of the camera can be attached to or detached from the same camera body, the entire imaging system including a camera having various characteristics can be slimmed and downsized. That is to say, according to the present invention, a digital camera (imaging device) itself and an entire imaging system can be downsized, thereby improving portability.

In addition, since a 68-pin bay connector is used for both connector sections 11, 12 which perform communications between the camera body 1 and the image pickup unit 2, transfer of large volume image data can be performed in a short time. Alternatively, in order to perform communications between a camera body 1 and an image pickup unit 2, other methods including a wireless communication system, an optical communication system, a contact communication system which performs communications by abutting instead of fitting may be used.

In addition, both connector sections 11, 12 supply power to the image pickup unit 2 from the camera body 1 (see FIG. 31). In the embodiment, since both connector sections 11, 12 perform communications as well as power supply, failures are less likely to occur when pulling out or inserting the connectors. However, a configuration may be such that a connector for communications and a connector for power supply are separately provided.

(Procedure for Attaching Image Pickup Unit 2 to Camera Body 1)

Figure 32:
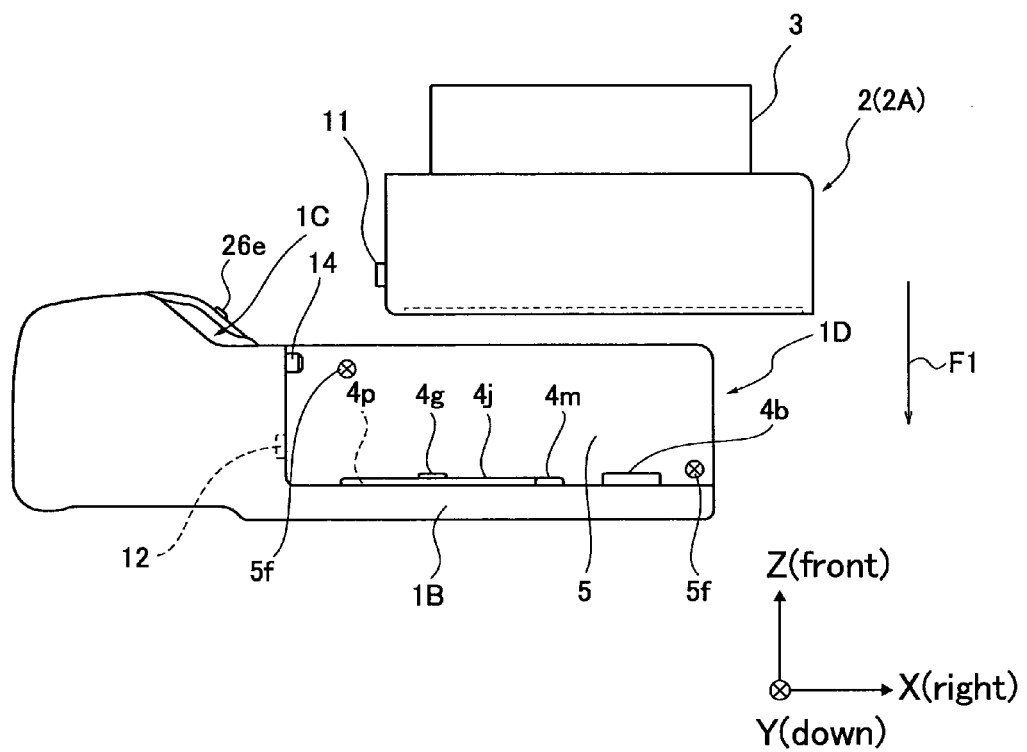
FIG. 32 is a view for explaining how the image pickup unit is attached to the camera body shown in FIG. 4.

Procedure for attaching an image pickup unit 2 to a camera body 1 is generally described. In FIG. 32, the image pickup unit 2 is set to a rear part 1B of the camera body 1 by being moved to a negative side direction of the Z direction. Then, a camera-body connector section 12 and an image-pickup-unit connector section 11 are fitted by the image pickup unit 2 being moved to a negative direction (left direction) of the X direction.

An engaging protrusion (angle controlling member) 4g is positioned between the side wall section 1C and a biasing section when it is viewed in a left-right direction (XY direction) in this state.

In addition, in the image pickup unit 2, in a state where the camera-body connector section 12 and the image-pickup-unit connector section 11 are engaged with each other, when the image pickup unit 2 is moved to a positive direction (right direction) in the X direction with respect to the camera body 1, the camera-body connector section 12 and the image-pickup-unit connector section 11 are disengaged.

Therefore, a direction in which the image pickup unit 2 is attached to or detached from the side surface wall of the side wall section 1C of the camera body 1 is the X direction (left-right direction).

Procedure for setting the image pickup unit 2 to the camera body 1 will be described in detail in the following.

Figure 33:
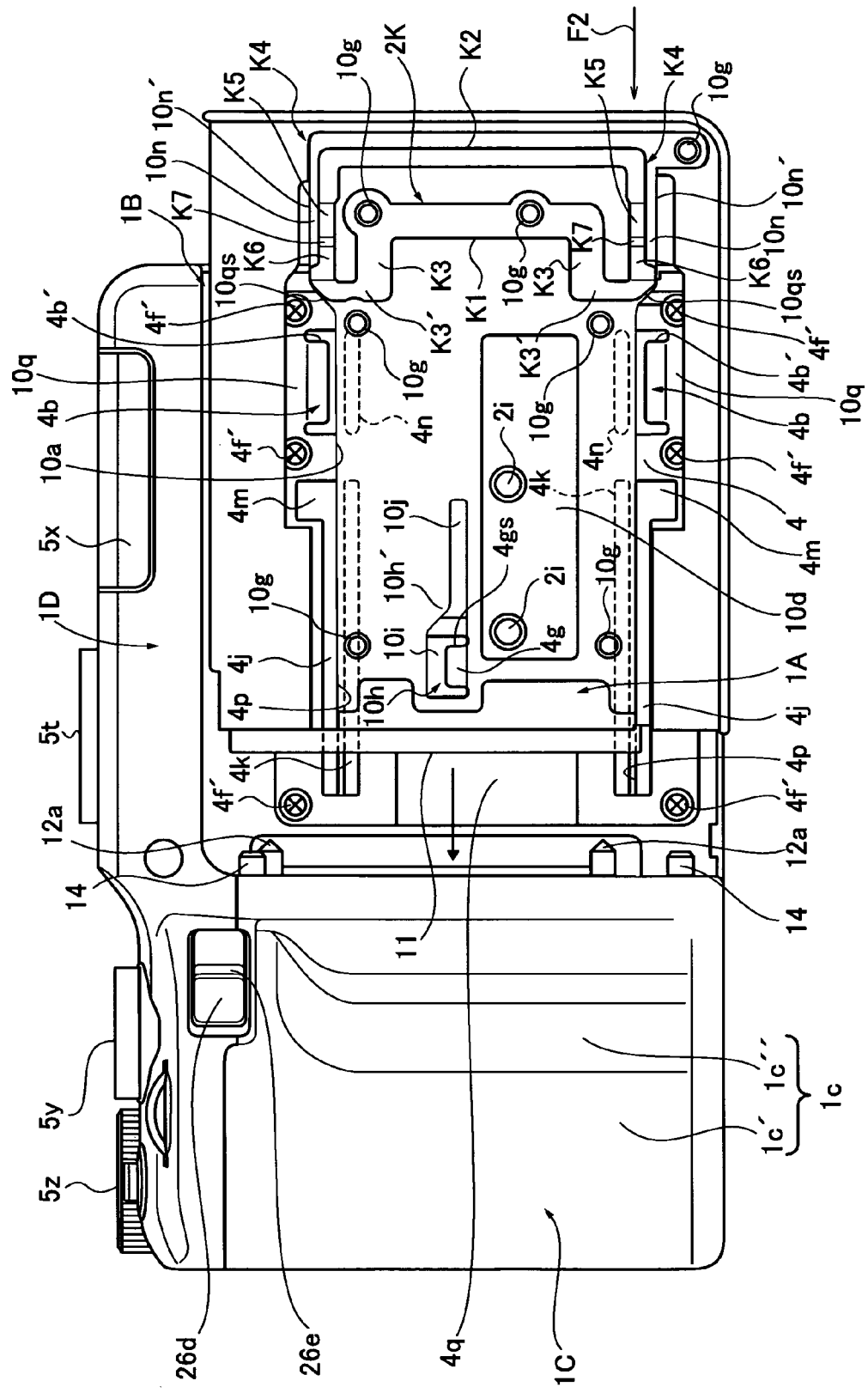
FIG. 33 is an explanatory diagram showing a state where the image pickup unit shown in FIG. 1 is placed on the camera body shown in FIG. 1, and an explanatory diagram showing a correspondence between engaging protrusions of the rear wall reinforcing sheet metal member for body and engaging protrusion guiding holes of the rear wall reinforcing sheet metal member for unit.

The camera body 1 is put into a horizontal state with a back wall section 1B of the camera body 1 on the downside. For example, the camera body 1 is put into a horizontal state by putting it on a left hand. The image pickup unit 2 is moved close to the camera body 1 from an arrow Fl direction shown in FIG. 32 (front-back direction or up- down direction in FIG. 32), to have an engaging protrusion 4g face an insertion opening 10i, an engaging claw 4b and a rectangular protrusion 4m face a guiding groove 10q, the engaging claw 4b and the rectangular protrusion 4m enter the guiding groove 10q, and the engaging protrusion 4g enter the insertion opening 10i, as shown in FIG. 33. Simultaneously, marginal edges 10a, 10a of a rear wall reinforcing sheet metal member for unit 10 are caused to be in sliding contact with guiding surfaces 4p, 4p of a rear wall reinforcing sheet metal member for unit 10.

Then, as shown in FIG. 33, a part of the marginal edge 10a of the rear wall reinforcing sheet metal member for unit 10 is in contact with sliding contact ribs 4k, 4n. If the image pickup unit 2 is moved in this state to an arrow F2 direction shown in FIG. 33, a cut and bent section 4e of the engaging claw 4b is guided along a guiding hole for engaging claw cut and bent section 10r, and a part of an engaging plate section 10n of the rear wall reinforcing sheet metal member for unit 10 comes into contact with the sliding contact rib 4n. In addition, simultaneously, a cut and bent section 4i of the engaging protrusion 4g is guided along a guiding hole for engaging protrusion cut and bent section 10j.

When the engaging claw 4b is guided along an inclined wall 10qs of the engaging plate section 10n, the engaging claw 4b elastically deforms a plate spring 2k, and the rear wall reinforcing sheet metal member for unit 10 is pressed against the back wall section 1B due to the elastic deformation force applied to the plate spring 2k. This absorbs rattling due to a dimensional error between the image pickup unit 2 and the camera body 1.

In addition, as the image pickup unit 2 is guided to the side wall section 1C, while a plate surface of the rear wall reinforcing sheet metal member for unit 10 slides the resin-made sliding contact ribs 4k, 4n, and while the marginal edges 10a, 10a of the rear wall reinforcing sheet metal member for unit 10 are in sliding contact with the guiding surfaces 4p, 4p, metallic scraping sound caused by scraping of the rear wall reinforcing sheet metal member for unit 10 and the rear wall reinforcing sheet metal member for body 4 is also avoided.

Fitting of an auxiliary fitting protrusion 14 and an auxiliary fitting hole 22 is started almost at the same time when the engaging claw 4b comes into contact with the plate spring 2k, and the auxiliary fitting protrusion 14 and the auxiliary fitting hole 22 roughly perform control of a position of the image-pickup-unit connector section 11 with respect to the camera-body connector section 12.

Then, the camera-body connector section 12 and the image-pickup-unit connector section 11 are fitted into each other, as shown in FIG. 22, and the camera body 1 and the image pickup unit 2 are electrically connected so that they can communicate.

A Main CPU 208 of the camera body 1 monitors whether a predetermined pin of the camera-body connector section 12 (camera-body connection detection pin) is connected or not. When it detects that the camera-body connection detection pin is connected with an image-pickup-unit connection detection pin, communications and power transmission between the camera-body connector section 12 and the image pickup side connector section 11 start.

Alternatively, a configuration can be such that when the main CPU detects that the connection detection pin is connected, it immediately starts communications and power transmission between the camera-body connector section 12 and the image-pickup-unit connector section 11.

Alternatively, a configuration can be such that when the main CPU detects that the connection detection pin is connected, it starts communications and power transmission between the camera-body connector section 12 and the image-pickup-unit connector section 11 after predetermined time elapses. That is to say, a connection of the image-pickup-unit connector section 11 and the camera-body connector section 12 only has to establish a condition in which communication is possible, and it is not necessary to perform communications upon connection.

In addition, since a shock absorbing member 22a is provided on the bottom of the auxiliary fitting hole 22, shock due to collision of the camera body 1 and the image pickup unit 2 is alleviated when the auxiliary fitting protrusion 14 and the auxiliary fitting hole 22 are fitted. In addition, the auxiliary fitting protrusion 14 and the auxiliary fitting hole 22 can further mitigate rattling of the image pickup unit 2 to the camera body 1 in a front-back direction.

When a connection of the camera-body connector section 12 and the image-pickup-unit connector section 11 is completed, as shown in FIGS. 24 to 29, the engaging claw 4b abuts on semicircular convex sections 10s, 10s while being subjected to elastic biasing force of the plate spring 2k.

In addition, component force generated in an inclined wall 25c' by an inclined wall 20e of a to-be-locked claw 20d abuts on the inclined wall 25c' of a locking claw 25c almost at the same time as when the auxiliary fitting protrusion 14 and the auxiliary fitting hole 22 are fitted and immediately before a positioning protrusion and a positioning hole 63 are fitted exceeds turning and biasing force of the locking plate 25 by a biasing member (not shown), the locking plate 25 is turned with a spindle 27 as a supporting point in a direction opposite to a direction in which the turning and biasing force acts (an arrow F3 direction in FIG. 14).

Then, when the to-be-locked claw 20d climbs over the locking claw 25c, the locking plate 25 returns to its original position by turning and biasing force. As a result, the locking claw 25c enters a notch 20c and the to-be-locked claw 20d enters a notch 25b. Accordingly, the locking claw 25c and the to-be-locked claw 20d are engaged with each other, and the image pickup unit 2 is locked to the camera body 1 in a left-right direction. By the locking claw 25c as a locking member and the to-be-locked claw 20d as a to-be-locked member, rattling of the camera body 1 and the image pickup unit 2 in the left-right direction is restricted.

In the embodiment, the paired engaging claws 4b, 4b reliably engages the engaging plate section 10n, 10n with the image pickup unit 2 locked to the camera body 1. Since the pickup engaging plate sections 10n, 10n are formed in a left-right direction at positions far from the paired auxiliary fitting protrusions 14, 14 formed on the side wall section 1C, force resulting from pullout when the image pickup unit 2 is pulled out to the front side from the camera body 1 is dispersed, and the pullout is reliably inhibited. In addition, application to both connector sections 11, 12 of unreasonable force involved in the pull-out can be inhibited.

In addition, even when a user tries to hold a right lower marginal section by hand and to forcibly pull it out to a lower right direction, the auxiliary fitting protrusions 14, 14, the auxiliary engaging claws 4b, 4b, and the locking mechanism 24 prevents the pull-out and prevents application of unreasonable force involved in the pull-out to both connector sections 11, 12.

Furthermore, as one action of moving the image pickup unit 2 to the side wall section 1C almost simultaneously completes mechanical fixing of the camera body 1 and the image pickup unit 2 by the locking mechanism 24 and electrical connection of both connector sections 11, 12, an operation of attaching the image pickup unit 2 to the camera body 1 can be performed easily in a short time.

Additionally, timing to fit both connector sections 11, 12 may differ from timing to start communications and power transmission/receipt of both connector sections 11, 12, independently of the camera-body connection detection pin of the camera body 1.

For example, a configuration may be such that a manipulating section (not shown) which instructs start/end of communications and power transmission/receipt by both connectors 11, 12 may be provided in the camera body 1, and both connectors 11, 12 starts/ends the communications and power transmission/receipt depending on manipulation of the manipulating section.

Alternatively, a configuration may be such that a lock state detection section which detects a position of the locking plate 25 is provided, and after the lock state detection section detects that the image pickup unit 2 is locked in a predetermined position of the locking plate 25, both connectors 11, 12 start/end communications and power transmission and receipt.

Figure 34:
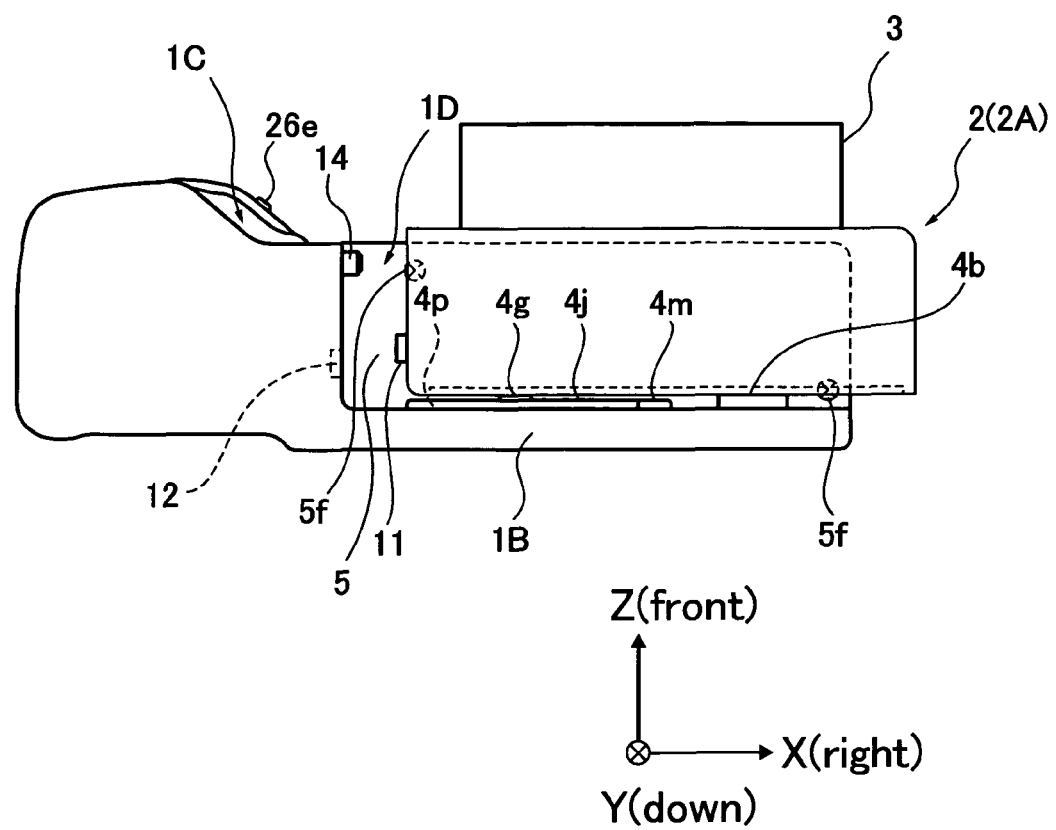
FIG. 34 is an explanatory diagram showing a state where a connection of the image-pickup-unit connector section and the camera-body connector section is prevented by the engaging protrusions shown in FIG. 33 abutting on a constituting wall section shown in FIG. 33 and by an engaging member abutting on an engaging plate section.

Furthermore, since inflected sections 4h abut on a constituting wall section 10h' from the outside of the image pickup unit 2 when inflected sections 4f of the paired engaging claws 4b abut on the engaging plate sections 10n from the outside (the inflected sections 4f rest on the engaging plate sections 10n), as shown in FIG. 34, image pickup unit 2 floats parallel to the rear wall reinforcing sheet metal member for body 4 of the back wall section 1B, for example, and prevents the image pickup unit 2 from tilting to the camera body 1, thereby preventing a connection of the camera-body connector section 12 and the image-pickup-unit connector section 11 with the image pickup unit 2 at a tilt.

In addition, in the embodiment, as a positional relationship of the auxiliary fitting protrusion 14 and the auxiliary fitting holes 22 is offset, prevention of a mutual connection of both connector sections 11, 12 can be secured. Consequently, destruction of both connector sections 11, 12 is securely prevented.

That is to say, the engaging protrusion 4g functions as an unnatural posture and angle avoidance member (angle controlling member) to prevent the image pickup unit 2 from being connected to the camera body 1 at an unnatural posture and angle, when the image pickup unit 2 is placed in the recess 1A and attached to or detached from the camera body 1, and a connection of the image-pickup-unit connector section 11 and the camera-body connector section 12 is made.

The engaging protrusion 4g also serves a function to prevent an opening section 52 formed on the side wall section 1C of the camera body 1 and a connector cover section as a fitting protrusion of the image pickup unit 2 from being obliquely fitted.

In short, the angle controlling member (controlling member) prevents the image-pickup-unit connector section 11 and the camera-body connector section 12 from being connected at an unnatural posture and angle. When the controlling member is inserted into an insertion opening, the rear of the image pickup unit 2 and the back wall section 1B of the camera body 1 abut on each other in parallel, and the image-pickup-unit connector section 11 and the camera-body connector section 12 are connected as the image pickup unit 2 moves in a direction to the side wall section 1C.

In addition, when the controlling member abuts on a controlling member abutting section, the rear of the image pickup unit 2 and the back wall section 1B of the camera body 1 do not abut on each other in parallel, and the image-pickup-unit connector section 11 and the camera-body connector section 12 are not connected.

In addition, the angle controlling member can prevent the image-pickup-unit connector section 11 and the camera-body connector section 12 from being connected at an unnatural posture and angle, irrespective of presence of a biasing section.

In addition, in the embodiment, since in the camera body 1, a biasing section which biases the image pickup unit 2 to the back wall section 1B of the camera body 1 is provided with the image pickup unit 2 attached to the camera body 1, a trouble that the image pickup body 2 is attached to the camera body 1 at an unnatural angle may occur. In the embodiment, as the angle controlling member is provided, it can securely prevent inconvenience of the image pickup unit 2 being attached to the camera body 1 at unnatural angle and posture.

When the height from a back wall surface of the back wall section 1B to the inflected section 4h of the engaging protrusion (angle controlling member) is the same as or greater than that from the back wall surface of the back wall section 1B to the inflected section 4f of the engaging claw 4b, a connection of the image pickup unit 2 to the camera body 1 at an unnatural posture and angle can be prevented.

On the other hand, when the height from the back wall surface of the back wall section 1B to the inflected section 4h of the engaging protrusion 4g (angle controlling member) is lowered, the engaging protrusion guiding hole 10h corresponding to the engaging protrusion 4g can be formed shallow, and thus the image pickup unit 2 can be downsized.

Thus, the engaging protrusion (angle controlling member) 4g is placed closer to the camera-body connector section 12, namely, closer to the side wall section 1C than to the biasing section. If the engaging protrusion 4g (angle controlling member) is thus placed closer to the camera-body connector section 12, even when the height of the engaging protrusion 4g is lower than that of the engaging claw 4b, not only the inflected sections 4f of the paired engaging claws 4b abut on the engaging plate section 10n, but also a tilt angle of the image pickup unit 2 to the camera body 1 when the inflected section 4h abuts on the constituting wall section 10h' can be reduced. That is to say, since the image pickup unit 2 can be made closer in parallel to the rear wall reinforcing sheet metal member for body 4 of the back wall section 1B, a connection of the image pickup unit 2 to the camera body 1 at an unnatural posture and angle can be prevented even when height of the engaging protrusion (angle controlling member) 4g is lowered.

(Procedure for Removing Image Pickup Unit 2 from Camera Body 1)

Now, a procedure for removing the image pickup unit 2 from the camera body 1 will be described.

The unlock button 26d is manipulated to the right direction (F4 direction in FIG. 4) when the image pickup unit 2 is viewed from the front face with the image pickup unit 2 placed in the recess 1A. This turns the unlocking manipulating member 26 to an opposite direction (opposite direction to F3 in FIG. 14) to turning and biasing force of the unlocking spring 28 with the spindle 27 as a supporting point.

Then, the releasing protrusion 26b abuts on the side surface 25f of the locking plate 25. By turning the releasing protrusion 26b to an opposite direction (opposite direction to F3 in FIG. 14) to the turning and biasing force of the unlocking spring 28, the locking plate 25 is turned in a direction (backward) in which it retreats from the notch 20c with the spindle 27 as a supporting point. This releases engagement of the locking claw 25c and the to-be-locked claw 20d.

That is to say, locking of the image pickup unit 2 to the camera body 1 is released. In this state, the image pickup unit 2 is moved to the camera body 1 from the left to right direction (arrow F5 direction in FIGS. 1 and 2). Then, not only engagement of the both connector sections 11, 12 is released but also fitting of the auxiliary fitting protrusion 14 and the auxiliary fitting hole 22 is released.

The image pickup unit 2 is moved from the left to right direction (arrow F5 direction in FIGS. 1 and 2 and opposite direction to arrow F2 in FIG. 33) until the notch wall 10b of the image pickup unit 2 abuts on the rectangular protrusion 4m. Then, the image pickup unit 2 is moved in a direction away from the back wall section 1B (opposite direction to F1 in FIG. 32). This completes removal of the image pickup unit 2 from the camera body 1. In addition, the unlocking manipulating member 26 returns to its original position by biasing force of the unlocking spring 28 when a user takes his/her finger off from the unlock button 26d. The locking plate 25 also returns to its original position by the turning and biasing force (not shown).

Thus, in the embodiment, a state where a photographer uses the camera with the lens system facing a subject ahead while holding the grip section 1c by right hand when the upper wall section 1D is located topside is referred to as a normal use state. In this normal use state, as the right direction in which the user finds it difficult to manipulate is an unlocking manipulation direction, a concern can be reduced that the image pickup unit 2 drops off from the camera body 1 due to erroneous operation during use while the user normally grips the grip section 1c.

(Configuration of the Imaging Apparatus in Which the Engaging Protrusion Guiding Hole 10h is Formed in the Rear Wall Reinforcing Sheet Metal Member for Body 4 and the Engaging Protrusion 4g is Provided in the Rear Wall Reinforcing Sheet Metal Member for Unit 10)

Figure 35:
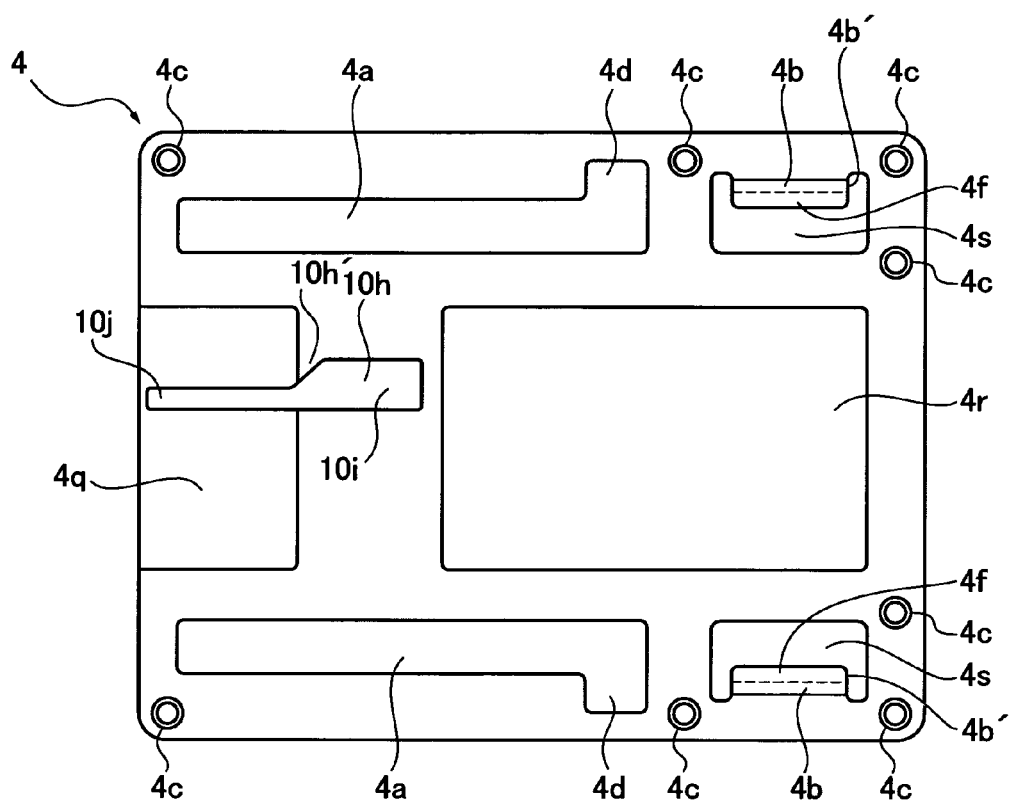
FIG. 35 is a plan view in which an engaging protrusion guiding hole is formed on the rear wall reinforcing sheet metal member for body shown in FIG. 7A.
Figure 36:
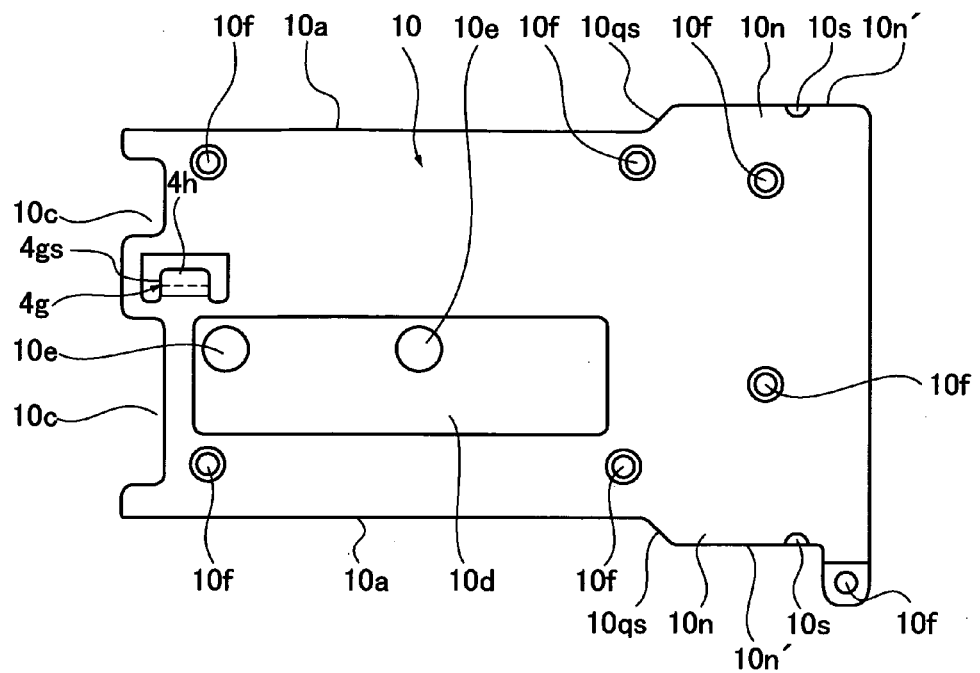
FIG. 36 is a plan view in which an engaging protrusion is formed on the rear wall reinforcing sheet metal member for unit shown in FIG. 11B.

In the embodiment described above, as enlarged and shown in FIG. 7C, the engaging protrusion 4g is provided in the rear wall reinforcing sheet metal member for body 4 of the camera body 1, and the engaging protrusion guiding hole 10h which guides the engaging protrusion 4g is formed in the rear wall reinforcing sheet metal member for unit 10 of the image pickup unit 2, as shown in FIG. 11C. However, a configuration in which the engaging protrusion guiding hole 10h is formed in the rear wall reinforcing sheet metal member for body 4 of the camera body 1 as shown in FIG. 35, and in which the engaging protrusion 4g is formed in the rear wall reinforcing sheet metal member for unit 10 of the image pickup unit 2 as shown in FIG. 36 achieves a similar effect.

(Embodiment 2)

Figure 37A:
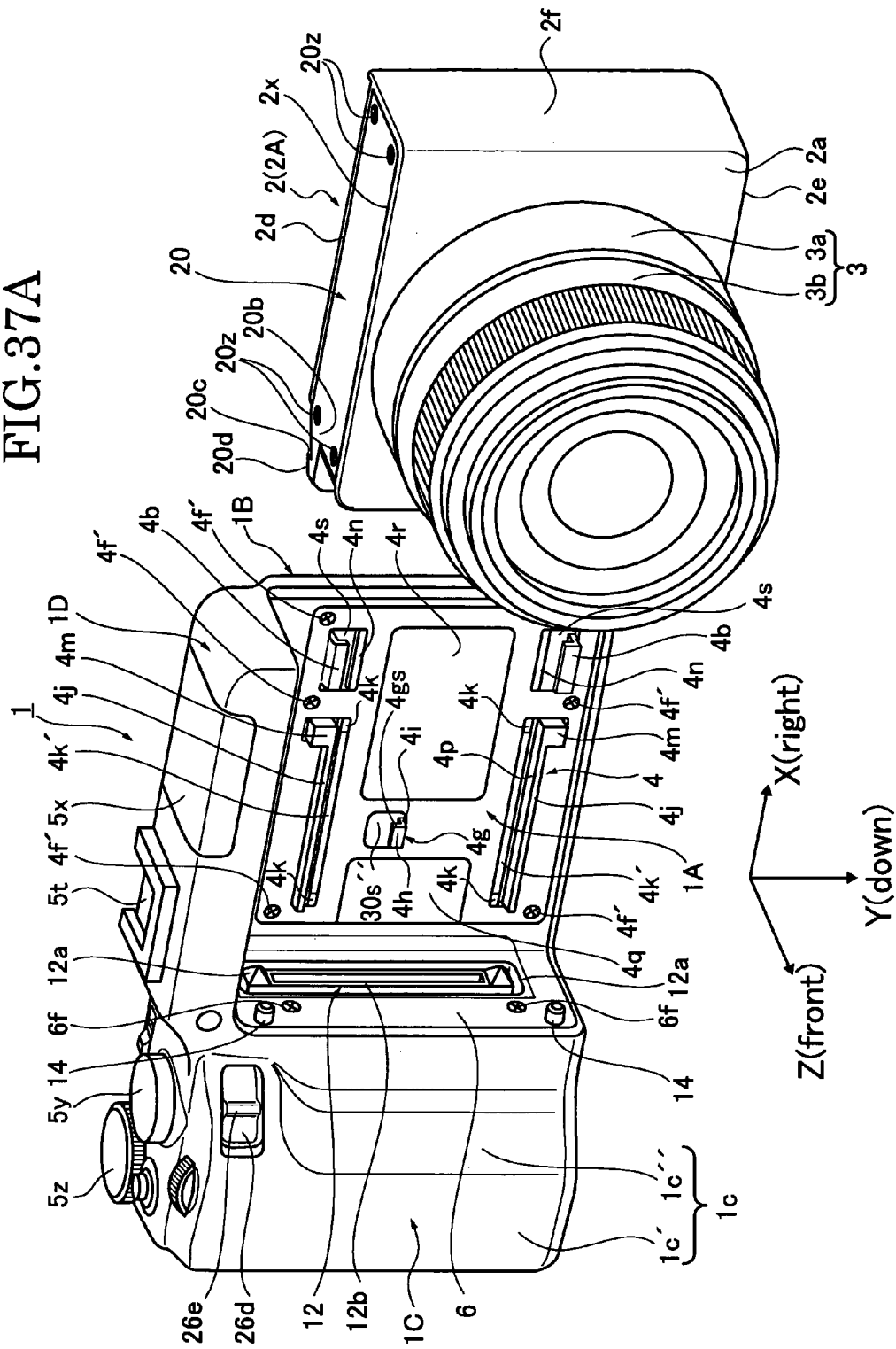
FIG. 37A is an explanatory diagram showing a state before an image pickup unit is attached to the camera body shown in FIG. 1 or a state after the image pickup unit is pulled out of the camera body, and a view of the camera body and the image pickup unit according to an embodiment 2 of the present invention, as viewed from the front side and from a right oblique direction.

FIG. 37A is an explanatory diagram showing a state before an image pickup unit is attached to the camera body shown in FIG. 1 or a state after the image pickup unit is pulled out of the camera body, and a view of the camera body and the image pickup unit according to an embodiment 2 of the present invention when they are viewed from the front side and from a right oblique direction. A resin plate 30 having a shape shown in FIG. 37B is placed on the back wall section of the camera body 1.

(Description of Resin Plate 30, Image Pickup Unit 2, and Rear Wall Reinforcing Sheet Metal Member for Unit 10)

Figure 37B:
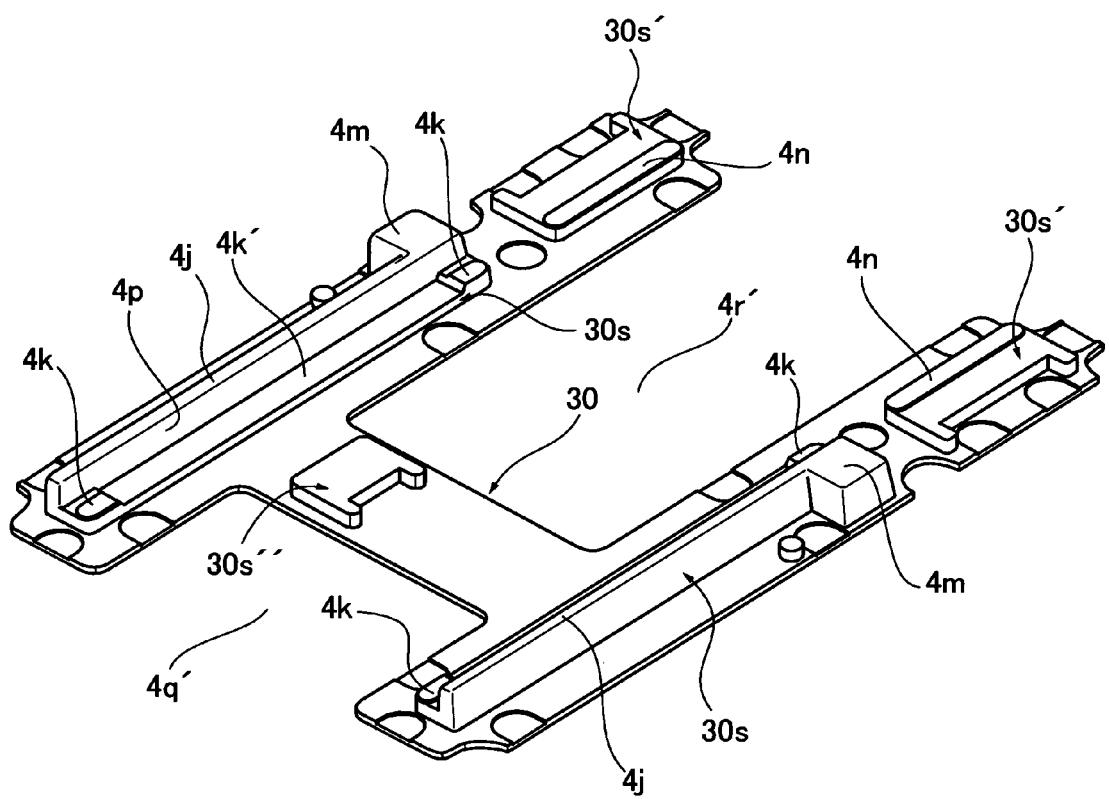
FIG. 37B is a perspective view showing a shape of a resin plate shown in FIG. 37A.

Here, as shown in detail in FIG. 37B, paired resin-made sliding contact ribs 4k, 4k are formed at an interval on each raised section 30s in proximity or adjacent to a resin-made guiding protrusion 4j in a direction in which they extend.

A band-like protrusion escape recess 4k' extending long in a direction in which the guide protrusion 4j extend is formed between the paired sliding contact ribs 4k, 4k. The band-like protrusion escape recess 4k' serves a function to evacuate a protrusion section for preventing degradation in manipulation quality, to be described later, formed on the rear wall reinforcing sheet metal member for unit 10.

Figure 37C:
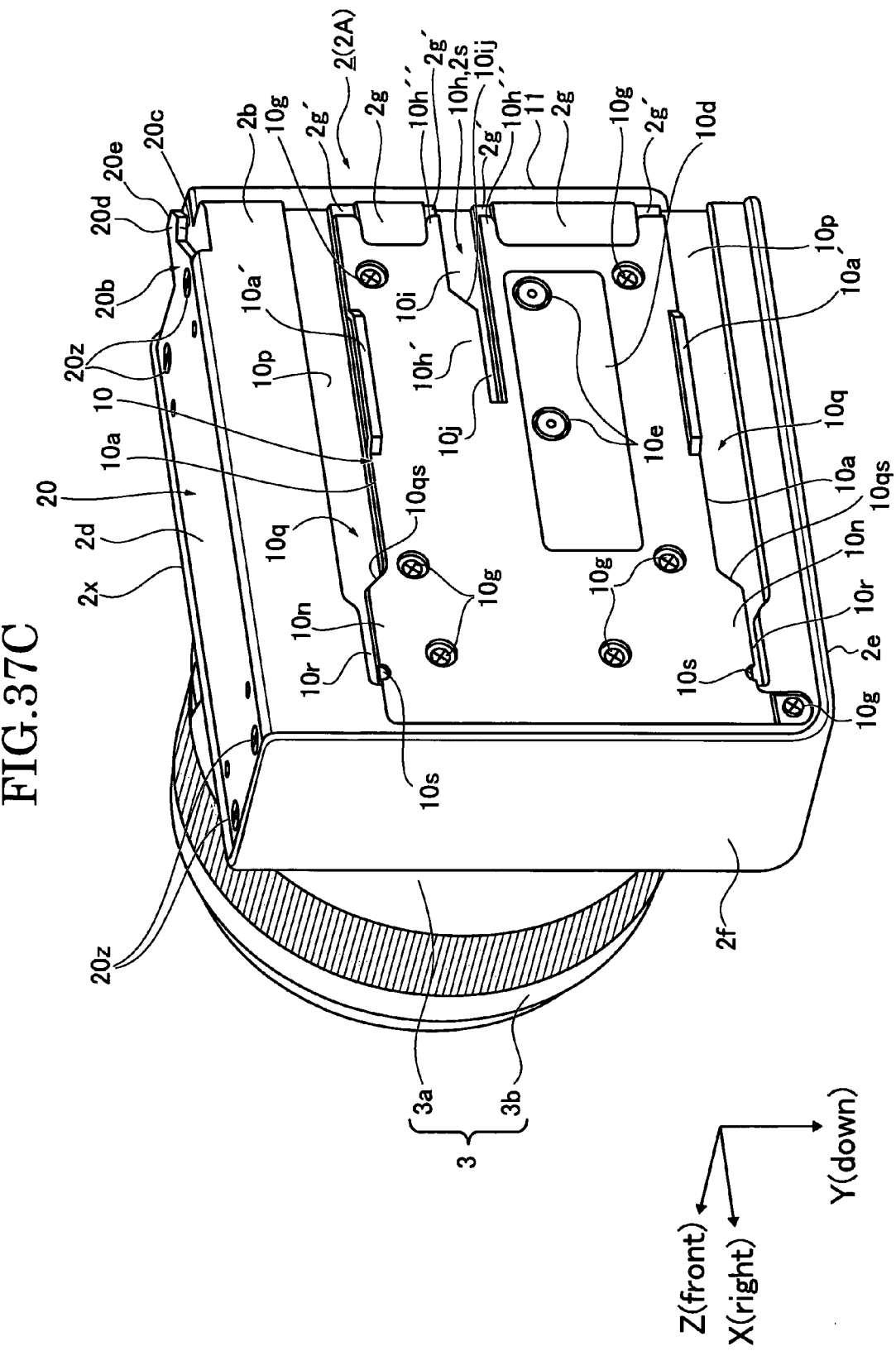
FIG. 37C is a perspective view of the image pickup unit shown in FIG. 37A as viewed from the rear side.
Figure 37D:
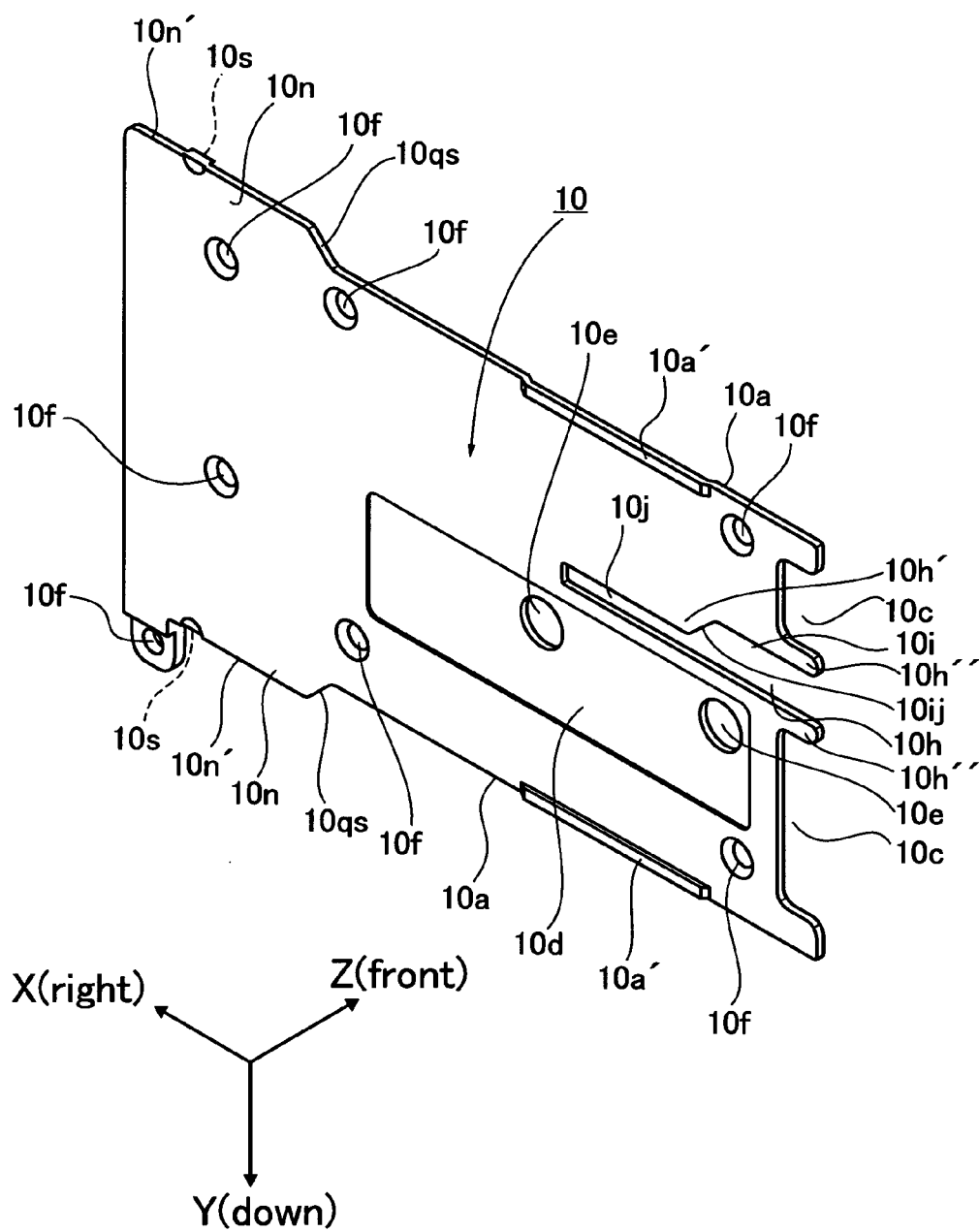
FIG. 37D is a perspective view showing a shape of the rear wall reinforcing sheet metal member for unit shown in FIG. 37C.
Figure 37E:
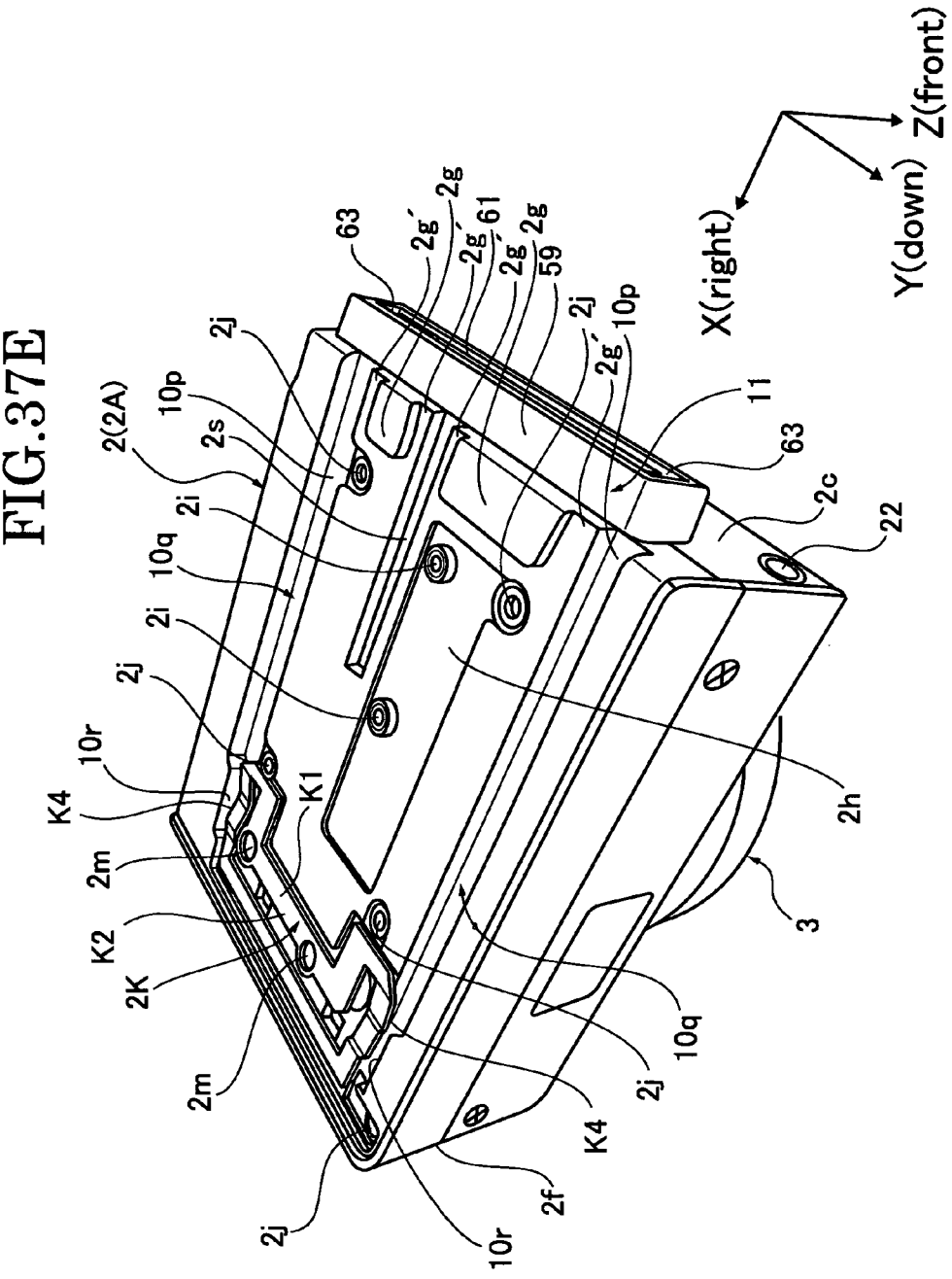
FIG. 37E is an external view of the image pickup unit, viewed from the rear, from which the rear wall reinforcing sheet metal member for unit shown in FIG. 37C is removed.
Figure 37F:
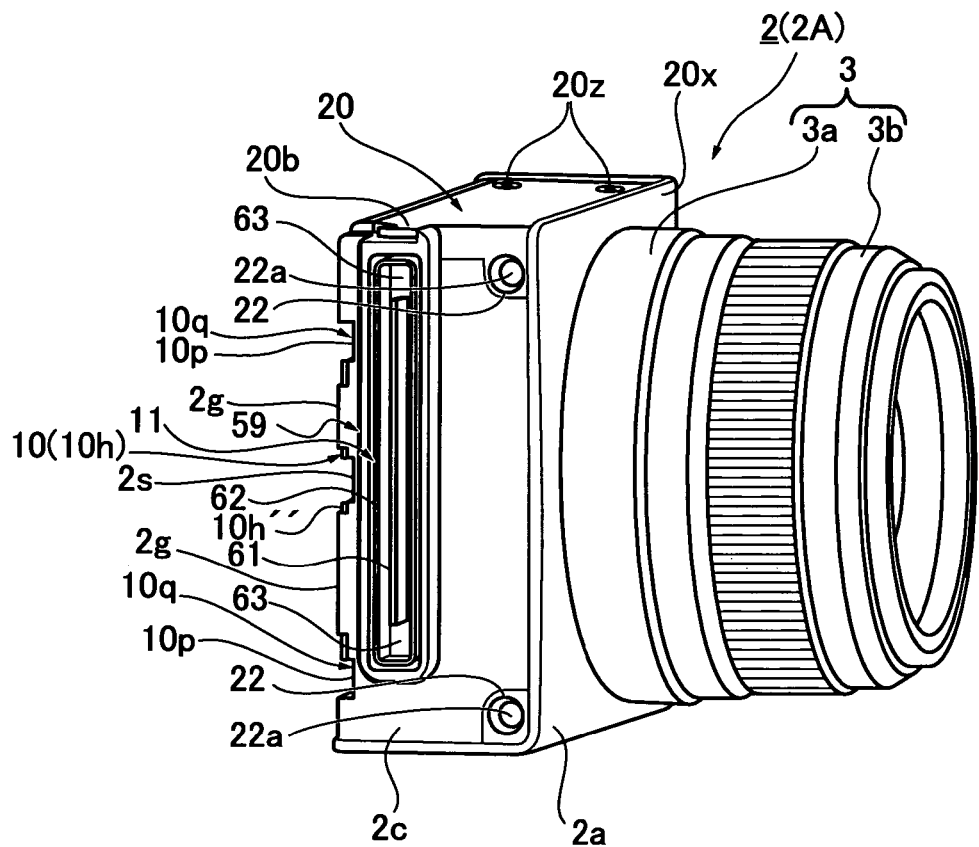
FIG. 37F is a perspective view of the image pickup unit shown in FIG. 37C as viewed from the left side.
Figure 37F:
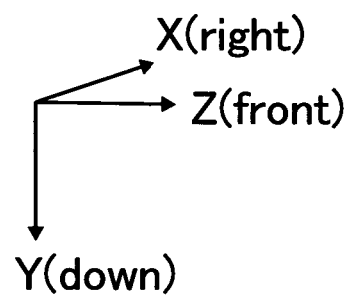

As shown in FIGS. 37C and 37E, in each of positioning raised sections 2g, 2g on a rear part 2b of a housing 2A, provided are step sections 2g' to which an open end constituting wall section which constitutes an engaging protrusion guiding hole 10h of the rear wall reinforcing sheet metal member for unit 10 is installed.

As enlarged and shown in FIG. 37D, the engaging protrusion guiding hole 10h of the rear wall reinforcing sheet metal member for unit 10 has the open end constituting wall section 10h" which opens to a left side surface 2c (right margin) of the rear wall reinforcing sheet metal member for unit 10. The open end constituting wall section 10h" is placed on its corresponding step sections 2g', 2g'.

As shown in FIGS. 37C and 37D, band-like protrusion sections 10a', 10a' are formed on the marginal edges 10a, 10a of the rear wall reinforcing sheet metal member for unit 10.

The band-like protrusion sections 10*a*', 10*a*' protrude from the inside (inner surface) of the housing 2A to the outside (outer surface).

Between the rear part 2*b* and the rear wall reinforcing sheet metal member for unit 10, a guiding groove 10*q* which allows entry of a guiding protrusion 4*j* extending in a left-right direction, a rectangular protrusion 4*m* and an engaging claw 4*b*, and a guiding hole for engaging claw cut and bend section 10*r* which guides a cut and bent section 4*e* of the engaging claw 4*b* are formed as shown in FIGS. 37C and 37E. The engaging protrusion guiding hole 10*h* is placed corresponding to an engaging protrusion guiding groove 2*s*. Here, the engaging protrusion guiding hole 10*h* and the engaging protrusion guiding groove 2*s* are opened to the left side surface (end face) 2*c* of the housing 2A.

In addition, the sign 10*p* represents a bottom wall of the guiding groove 10*q* which constitutes a part of the rear part 2*b*. Semicircular convex sections 10*s*, 10*s* protrude from the outside to the inside of the housing 2A, and a direction in which the semicircular convex sections 10*s*, 10*s* protrude and a direction in which the band-like protrusion sections 10*a*', 10*a*' protrude are mutually opposite.

(Reasons Why the Engaging Protrusion 4*g*, the Engaging Protrusion Guiding Hole 10*h*, Protrusion Section 10*a*', and Protrusion Escape Recess 4*k* Are Provided)

When the image pickup unit 2 is attached to the camera body 1 from a horizontal direction with a procedure to be described later, since paired engaging claws 4*b* protrude from a recess 1A, an inflected section 4*f* of the engaging claw 4*b* may abut on the bottom wall 10*p* of the guiding groove 10*q* and damage the bottom wall 10*p* if the paired engaging claws 4*b* are inserted into the guiding groove 10*q*.

In particular, if depth of the guiding groove 10*q* of the rear part 2*b* is made shallow to increase a space within the housing 2A without thickening entire thickness (thickness in the Z direction) of the housing 2A, it is more likely that the bottom wall 10*p* will be further damaged.

(Relation of Protrusion Sections 10*a*', 10*a*' and Protrusion Escape Recess 4*k*')

Figure 37H:
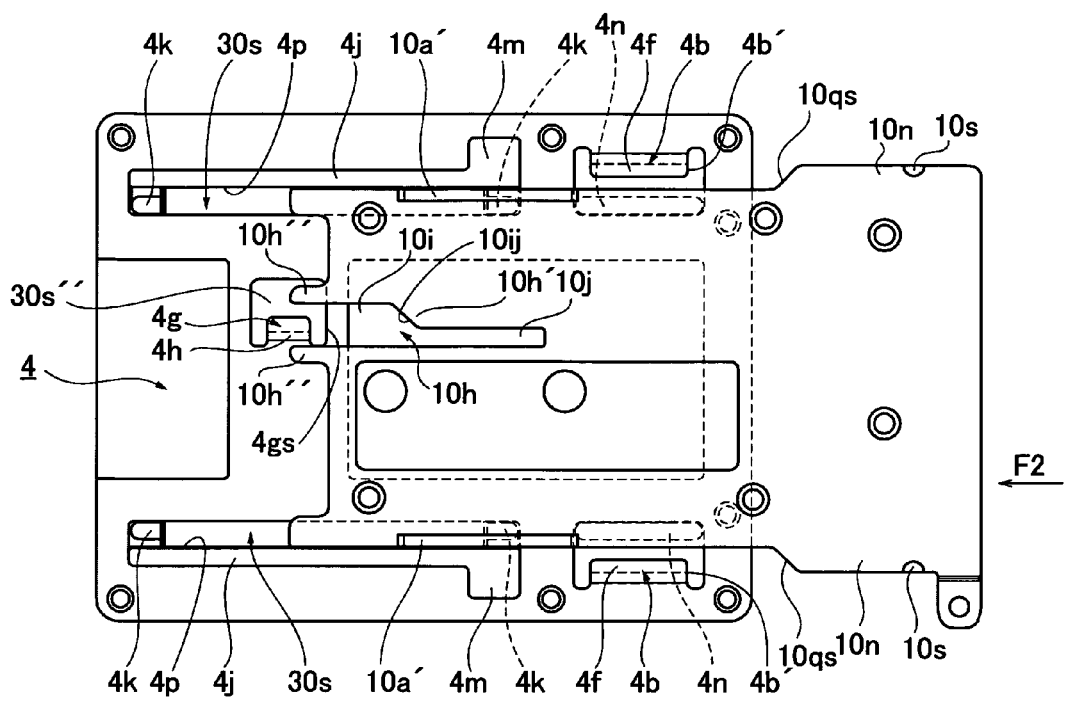
FIG. 37H is an explanatory diagram showing a relative positional relationship of the rear wall reinforcing sheet metal member for unit to the rear wall reinforcing sheet metal member for body in the process of setting the image pickup unit in the camera body with a normal operating procedure, and a perspective view in which the rear wall reinforcing sheet metal member for unit and the rear wall reinforcing sheet metal member for body are shown from the front face side of the image pickup unit.
Figure 37I:
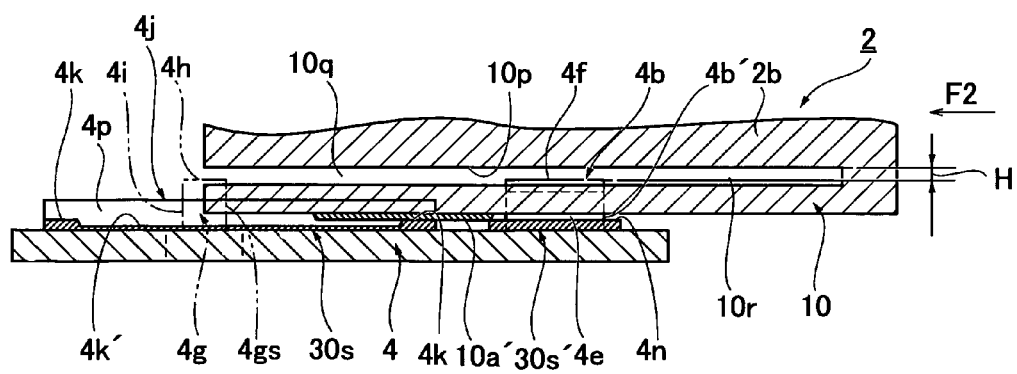
FIG. 37I is a cross sectional view of the rear wall reinforcing sheet metal member for body and a rear part of the image pickup unit, which are in a positional relationship shown in FIG. 37H.
Figure 37J:
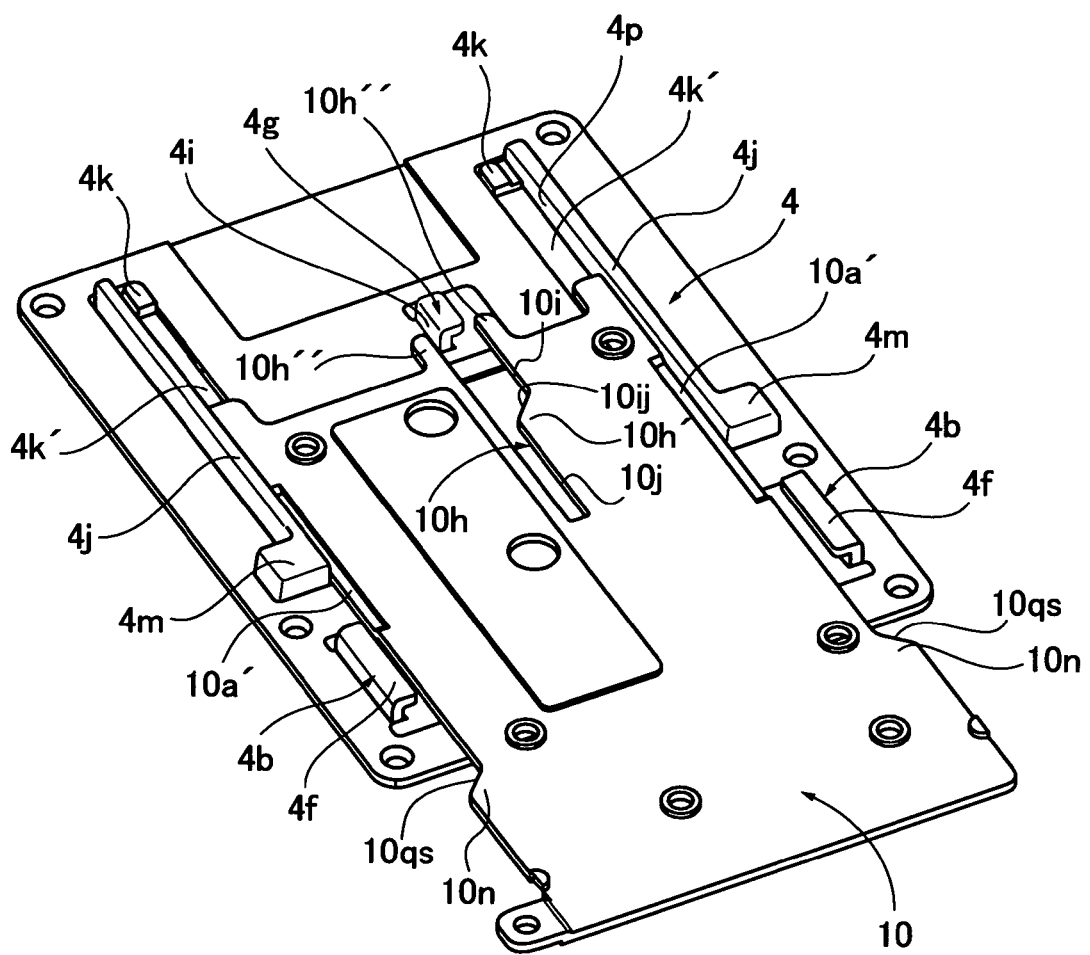
FIG. 37J is a perspective view showing a relative positional relationship of the rear wall reinforcing sheet metal member for unit to the rear wall reinforcing sheet metal member for body at the time when the image pickup unit is set to the camera body.
Figure 37K:
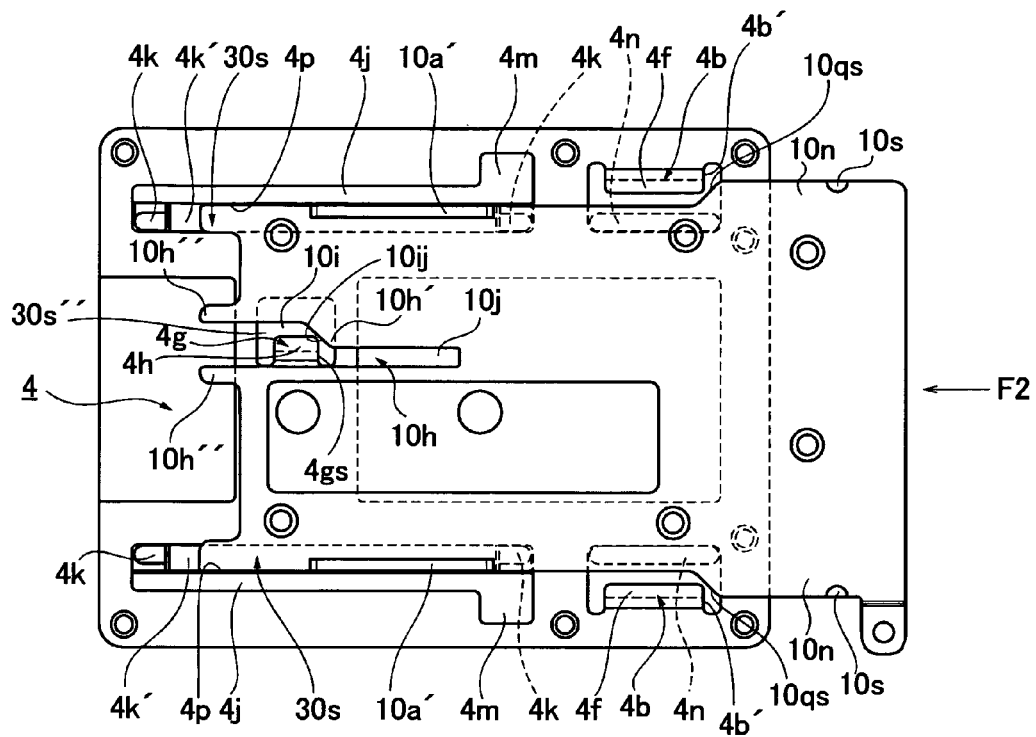
FIG. 37K is an explanatory diagram showing a relative positional relationship of the rear wall reinforcing sheet metal member for unit to the rear wall reinforcing sheet metal member for body at the time when an engaging protrusion is close to an inclined wall and an engaging claw is close to the inclined wall.
Figure 37L:
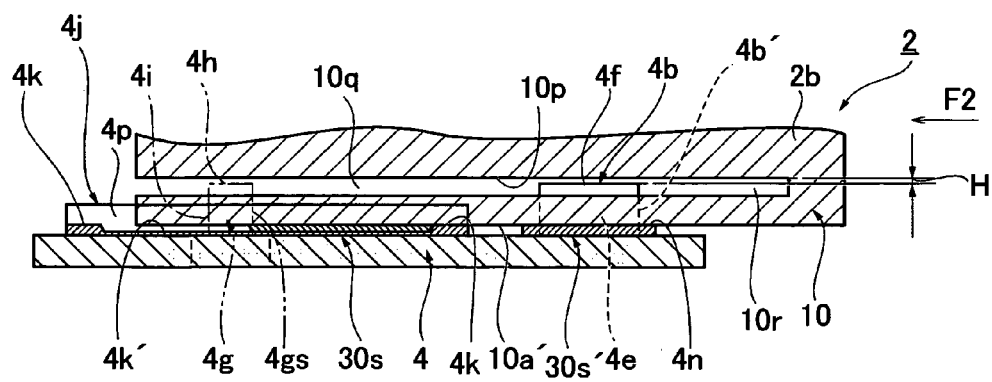
FIG. 37L is a cross sectional view at the time when the rear wall reinforcing sheet metal member for body and the rear wall reinforcing sheet metal for unit are in a positional relationship shown in FIG. 37K.
Figure 37M:
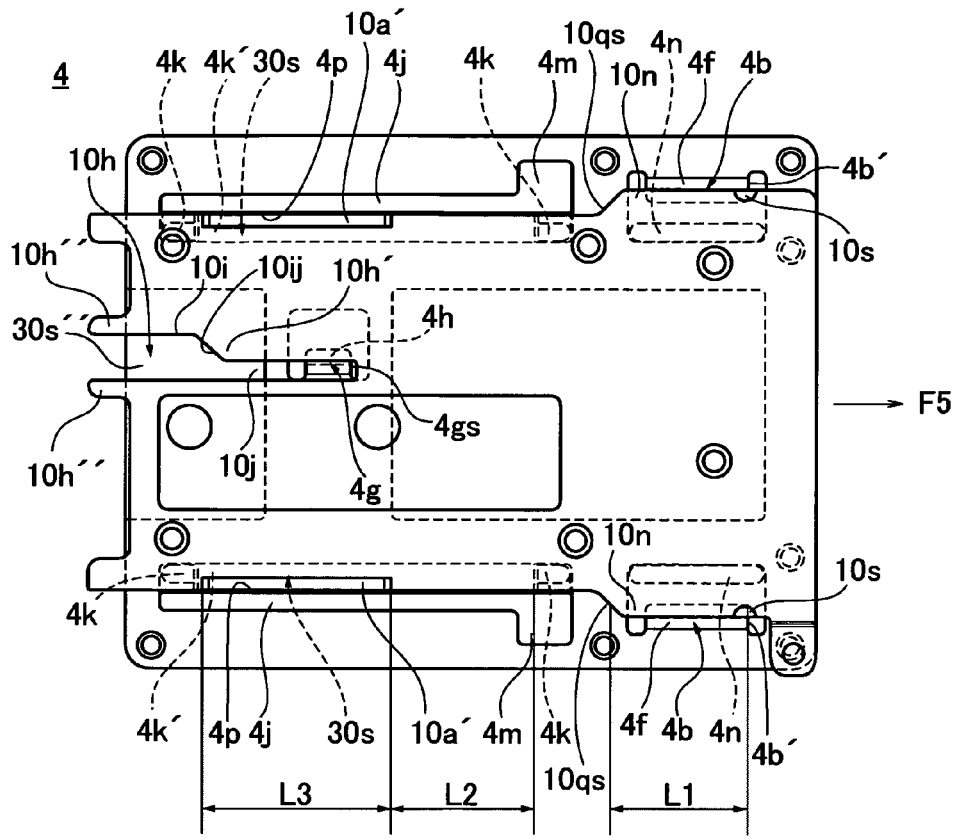
FIG. 37M is an explanatory diagram showing a relative positional relationship of the rear wall reinforcing sheet metal member for unit to the rear wall reinforcing sheet metal member for the camera body with a connection of the camera-body connector section and the image-pickup-unit connector section completed, and a perspective view in which the rear wall reinforcing sheet metal member for unit and the rear wall reinforcing sheet metal member for body are shown from the front face side of the image pickup unit.
Figure 37N:
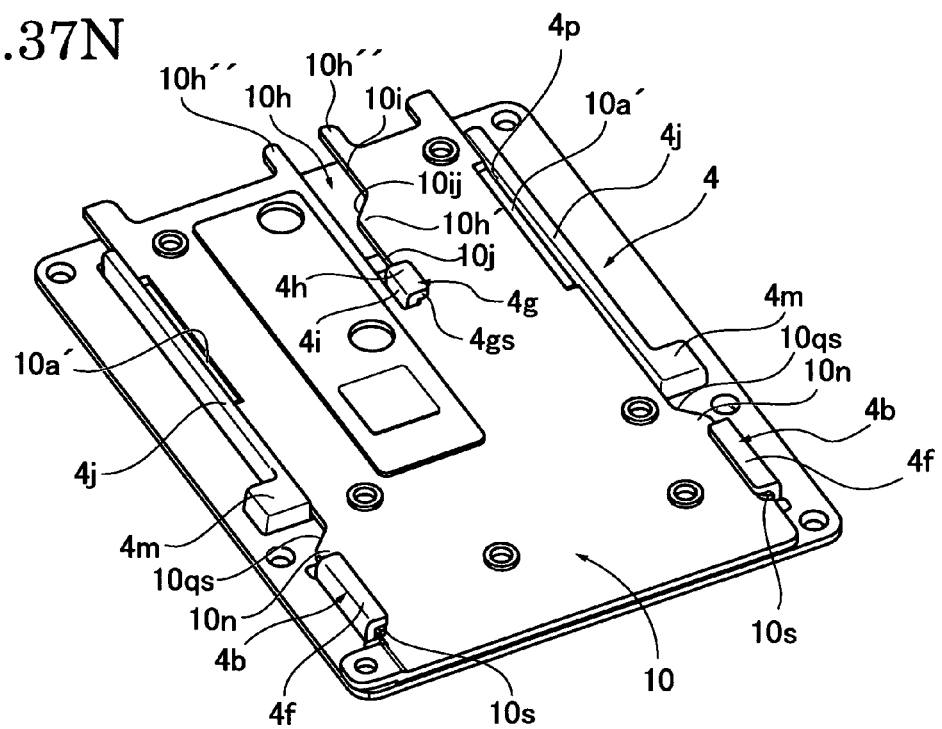
FIG. 37N is a perspective view showing a relative positional relationship of the rear wall reinforcing sheet metal member for unit to the rear wall reinforcing sheet metal member for the camera body with a connection of the camera-body connector section and the image-pickup-unit connector section completed.

Now, with reference to FIG. 37M, length L3 of each of the band-like protrusion sections 10*a*', 10*a*' in a direction which it extends along the guiding protrusion 4*j*, length L2 from the right edge section of each of the band-like protrusion sections 10*a*', 10*a*' to the sliding contact rib 4*k* closer to the sliding rib contact 4*n* with a connection of an image-pickup-unit connector section and a body connector section 12 completed, and length L1 from a position where a right edge 4*b*' of the engaging claw 4*b* traverses an inclined wall 10*qs* to a position where the right edge 4*b*' of the engaging claw 4*b* abuts on the semicircular convex section 10*s* will be described.

In addition, FIG. 37M is an explanatory diagram showing a relative positional relationship of the rear wall reinforcing sheet metal member for unit 10 to a rear wall reinforcing sheet metal member for the body 4 with a connection of the camera-body connector section 12 and the image-pickup-unit connector section 11 completed, and a view in which the rear wall reinforcing sheet metal member for unit 10 to the rear wall reinforcing sheet metal member for body 4 is viewed in phantom from the front face side of the image pickup unit 2.

The band-like protrusion sections 10*a*', 10*a*' are provided to secure a gap H from the inflected section 4*f* of the engaging claw 4*b* to the bottom wall 10*p* by abutting on the sliding contact rib 4*n* and the sliding contact rib 4*k* which is closer to the sliding contact rib 4*n* shown in FIG. 37I, when the image pickup unit 2 is set to the camera body 1 with an operating procedure to be described in detail later, that is to say, when the image pickup unit 2 is set to the camera body 1 so that the inflected section 4*h* of the engaging protrusion 4*g* does not abut on the constituting wall section 10*h*' of the guiding hole for engaging protrusion cut and bent section 10*j*.

On the one hand, the band-like protrusion escape recess 4*k*' is provided to bring an outer surface of the rear wall reinforcing sheet metal member for unit 10 into contact with the sliding rib 4*k* closer to the sliding contact rib 4*n*, while a cut and bent section 4*i* of the engaging protrusion 4*g* moves from an entry starting position of the guiding hole for engaging protrusion cut and bent section 10*j* to its end position and while the right edge 4*b*' of the engaging claw 4*b* moves from a position where it traverses the inclined wall 10*qs* to a position where the right edge 4*b*' of the engaging claw 4*b* abuts on the semicircular convex section 10*s*.

Therefore, the length L2 from the right edge sections of each of the band-like protrusion sections 10*a*', 10*a*' to the sliding contact rib 4*k* closer to the sliding contact rib 4*n* with a connection of the image-pickup-unit connector section 11 to the body connector section 12 completed must be equivalent to or greater than the length L1 from the position where the right edge 4*b*' of the engaging claw 4*b* traverses the inclined wall 10*qs* to a position where the right edge 4*b*' of the engaging claw 4*b* abuts on the semicircular convex section 10*s*, as shown in FIG. 37.

When the length L2 is shorter than the length L1, the right edge sections of the band-like protrusion sections 10*a*', 10*a*' each climb over the sliding contact rib 4*k* closer to the sliding contact rib 4*n*, before engagement of the engaging claw 4*b* and the engaging plate 10*n* is released when the image pickup unit 2 is pulled out of the camera body 1, and before the engaging protrusion 4*g* moves away from the guiding hole for engaging protrusion cut and bent section 10*j*. Thus, at least any of the rear wall reinforcing sheet metal member for unit 10, the engaging claw 4*b*, and the engaging protrusion 4*g* is deformed.

In order to secure as a wide range as possible in which the image pickup unit 2 abuts on the sliding contact rib 4*k* closer to the sliding contact rib 4*n* shown in FIG. 37B when the image pickup unit 2 is set to the camera body 1, it is desirable that length L3 of each of the band-like protrusion sections 10*a*', 10*a*' is the longest possible provided that the length L2 is the same as or greater than the length L1.

(Procedure for Attaching the Image Pickup Unit 2 to the Camera Body 1)

Now, a procedure for setting the image pickup unit 2 to the camera body 1 will be described in detail.

In the embodiment 2, a camera user holds the image pickup unit 2 by hand, and sets a relative positional relationship of the image pickup unit 2 to the camera body 1 so that the rear wall reinforcing sheet metal member for unit 10 is almost parallel to the rear wall reinforcing sheet metal member for body 4 provided on the back wall section 1B of the camera body 1.

Then, with marginal edges 10*a*, 10*a* of the rear wall reinforcing sheet metal member for unit 10 positioned along guiding surfaces 4*p*, 4*p* of the guiding protrusions 4*j*, 4*j* so that the rear wall reinforcing sheet metal member for body 4 faces the rear wall reinforcing sheet metal member for unit 10 in parallel, the camera user attaches the image pickup unit 2 to the camera body 1 by sliding the image pickup unit 2 to the camera body 1, facing a side wall section 1C of the camera body 1.

That is to say, the camera body 1 is put into a horizontal state with the back wall section 1B of the camera body 1 on the downside. For example, the camera body 1 is put into a horizontal state by putting it on a left hand. The image pickup unit 2 is moved closer to the camera body 1 from the arrow F1' direction shown in FIG. 37G to have the engaging protrusion 4g face an insertion opening 10i and the engaging protrusion guiding groove 2s adjacent to the open end constituting wall section 10h", and to have the guiding protrusion 4j, the rectangular protrusion 4m, and the engaging claw 4b face the guiding groove 10q.

Then, the image pickup unit 2 is slid to the side wall section 1C. As shown in FIGS. 37H, 37I, and 37J, during the sliding operation, the marginal edges 10a, 10a of the rear wall reinforcing sheet metal member for unit 10 are in sliding contact with the guiding surfaces 4p, 4p of the guiding protrusion 4j.

Then, as the band-like protrusion sections 10a', 10a' formed on the marginal edges 10a, 10a of the rear wall reinforcing sheet metal member for unit 10 each abut on the sliding contact rib 4k which is closer to the sliding contact rib 4n, as shown in FIG. 37I, the gap H from the inflected section 4f of the engaging claw 4b to the bottom wall 10p is secured.

Suppose the band-like protrusion sections 10a', 10a' are not provided on the marginal edges 10a, 10a of the rear wall reinforcing sheet metal member for unit 10, the gap H from the inflected section 4f of the engaging claw 4b to the bottom wall 10p is smaller than the gap H in the case where the band-like protrusion sections 10a', 10a' are provided. Then, if the image pickup unit 2 tilts to the camera body 1 due to some way of the camera user's handling and the inflected section 4f of the guiding claw 4b swiftly hits on the bottom wall, the gap H cannot be secured, the bottom wall 10p is damaged by the engaging claw 4b, and the manipulation quality at the time when the image pickup unit 2 is attached to or detached from the camera body 1 may be degraded.

However, in the embodiment 2, since the band-like protrusion sections 10a', 10a' are provided on the marginal edges 10a, 10a of the rear wall reinforcing sheet metal member for unit 10, the gap H from the inflected section 4f of the engaging claw 4b to the bottom wall 10p can be secured, and the bottom wall 10p can be prevented from being damaged as securely as possible even when the image pickup unit 2 is tilted to the camera body 1 due to some way of the camera user's handling.

In particular, if depth of the guiding groove 10q of the rear part 2b is made shallow to increase a space within the housing 2A without thickening entire thickness (thickness in the Z direction) of the housing 2A, the bottom wall 10p can be prevented from being damaged when the image pickup unit 2 is attached to or detached from the camera body 1.

When the image pickup unit 2 is further moved to the arrow F2 direction shown in FIGS. 37H and 37I, the engaging protrusion 4g is guided from the insertion opening 10i in vicinity of the open end constituting wall section 10h" to the guiding hole for the engaging protrusion cut and bent section 10j which reside in the back, with the band-like protrusion sections 10a', 10a' each abutting on the sliding contact rib 4k closer to the sliding contact rib 4n, and with the marginal edges 10a, 10a of the rear wall reinforcing sheet metal member for unit 10 being in sliding contact with the guiding surfaces 4p, 4p of the guiding protrusions 4j.

As shown in FIG. 37K, when the edge 4gs of the engaging protrusion 4g reaches neighborhood of the position of an inclined wall 10ij, the right edge 4b' of the engaging claw 4b reaches neighborhood of the position of the inclined wall 10qs of the rear wall reinforcing sheet metal member for unit 10. Then, as shown in FIGS. 37K and 37L, the band-like protrusion sections 10a', 10a' enter the band-like respective protrusion escape recesses 4k'. Accordingly, an outer surface of the rear wall reinforcing sheet metal member for unit 10 comes into sliding contact with sliding contact rib 4k closer to the sliding contact rib 4n and the sliding contact rib 4n.

In addition, the inflected section 4f of each of the engaging claws 4b, 4b comes close to the bottom wall 10p of the guiding groove 10p, and the inflected section 4h of the engaging protrusion 4g comes closer to the bottom wall of the engaging protrusion guiding groove 2s, thus allowing the rear wall reinforcing sheet metal member for unit 10 to enter between the inflected section 4f, the inflected section 4h, and the rear wall reinforcing sheet metal member for body 4.

In addition, as the left and right edge sections of the band-like protrusion sections 10a', 10a' in directions in which they extend are inclined, and a portion between the sliding contact ribs 4k, 4k and the band-like protrusion escape recess 4k' is inclined correspondingly, the band-like protrusion sections 10a', 10a' smoothly enter into or retreat from the band-like protrusion escape recess 4k'.

As shown in FIG. 37K, after the edge 4gs of the engaging protrusion 4g reaches the neighborhood of the position of the inclined wall 10ij and the right edge 4b' of the engaging claw 4b reaches the neighborhood of the position of the inclined wall 10qs of the rear wall reinforcing sheet metal member for unit 10, the image pickup unit 2 is further moved to the arrow F2 direction shown in FIGS. 37K and 37L. Then, with the outer surface of the rear wall reinforcing sheet metal member for unit 10 being in sliding contact with the sliding contact rib 4k closer to the sliding contact rib 4n and the sliding contact rib 4n, the cut and bent section 4e of the engaging claw 4b is guided along the guiding hole for engaging claw cut and bent section 10r. Also, simultaneously, the cut and bent section 4i of the engaging protrusion 4g is guided along the guiding hole for engaging protrusion cut and bent section 10j. Furthermore, the inflected section 4f of the engaging claw 4b faces the inner surface of the engaging plate 10n, and the inflected section 4h of the engaging protrusion 4g faces the inner surface of the constituting wall section of the guiding hole for engaging protrusion cut and bent section 10j of the rear wall reinforcing sheet metal member for unit 10.

Figure 37O:
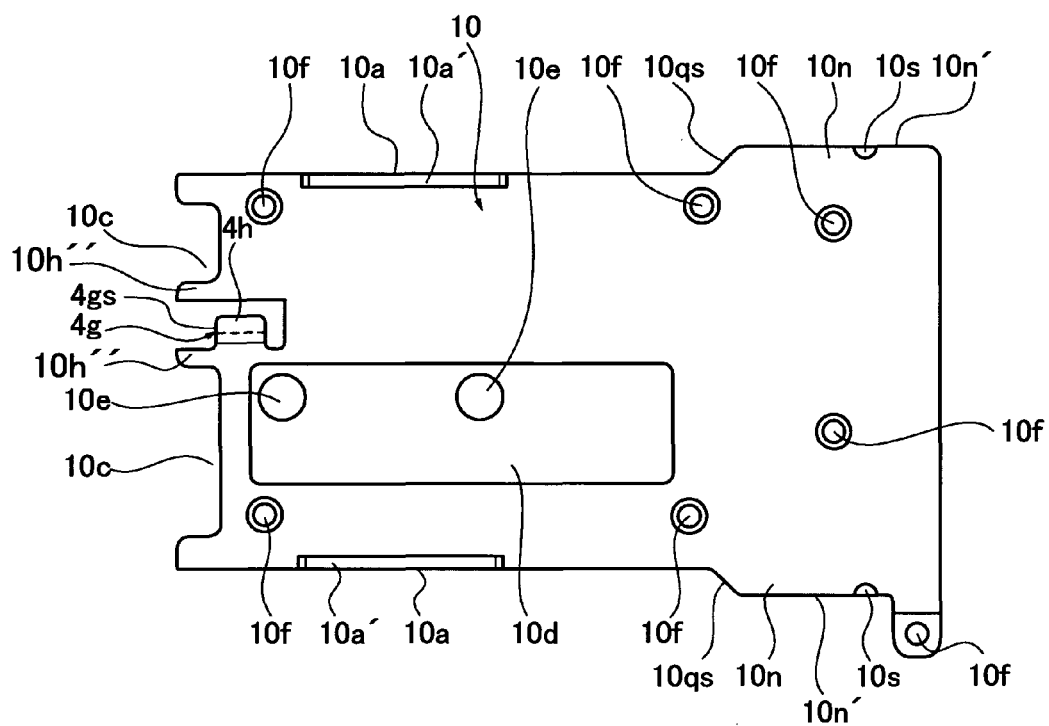
FIG. 37O is a plan view in which an engaging protrusion is formed on the rear wall reinforcing sheet metal member for unit shown in FIG. 37D.
Figure 38:
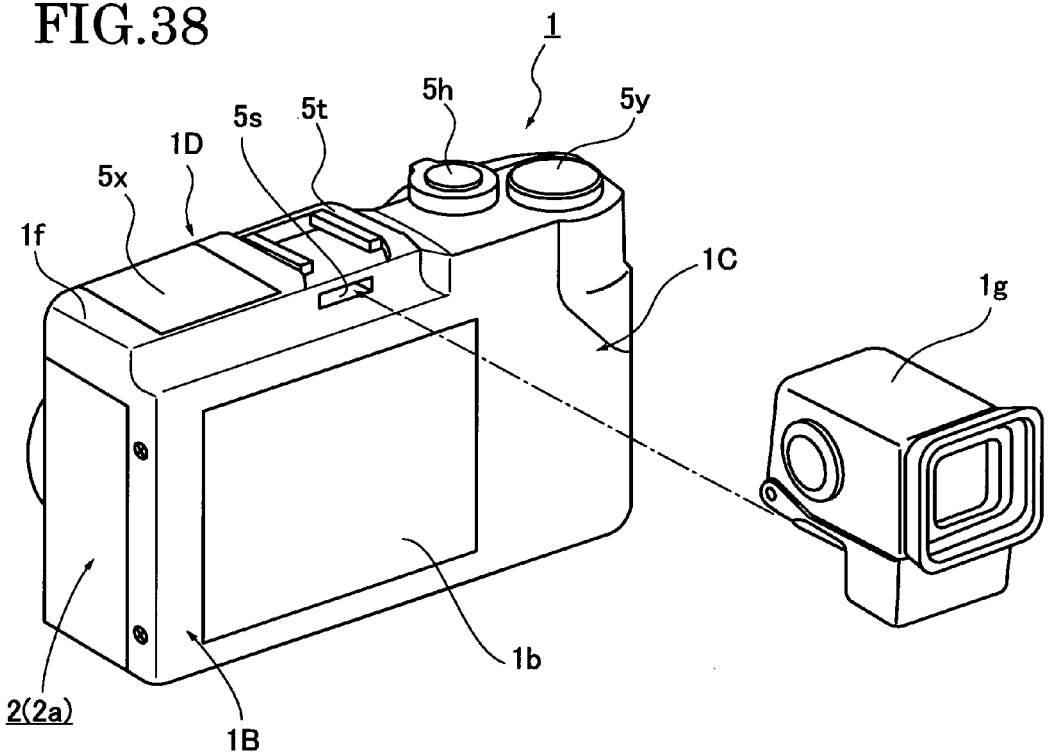
FIG. 38 is an external view showing a state before an electronic viewfinder is attached to the camera body, as viewed from the rear side.

Subsequently, through the operating procedure similar to that of the embodiment 1, the inflected section 4f of the engaging claw 4b abuts on each of the semicircular convex sections 10s, 10s under elastic biasing force of the plate spring 2k. In addition, with the inflected section 4f of the engaging claw 4b abutting on each of the semicircular convex sections 10s, 10s, as shown in FIGS. 37M and 37O, the engaging protrusion 4g is located at the end of the guiding hole for engaging protrusion cut and bent section 10j.

Thus, with the imaging apparatus having the configuration of the embodiment 2, since the guiding groove 10q and the engaging protrusion guiding hole 10h of the image pickup unit 2 are opened to the side of the image-pickup-unit connector section 11, the image pickup unit 2 can be attached to the camera body 1 by sliding the image pickup unit 2 in a horizontal direction to the camera body 1 and the attachment operation can be further facilitated.

(Procedure for Removing Image Pickup Unit 2 from Camera Body 1)

Now, a procedure for removing the image pickup unit 2 from the camera body 1 is almost similar to that of the embodiment 1. To add some explanation, when the image pickup unit 2 is moved from the left to right direction (arrow F5 direction in FIG. 37M) with respect to the camera body 1, the rear wall reinforcing sheet metal member for unit 10 moves from the left to right with respect to the camera body 1, while the outer surface of the rear wall reinforcing sheet metal member for unit 10 is in sliding contact with the resin-made sliding contact ribs 4k, 4k, 4n and while the band-like protrusion sections 10a', 10a' are guided to the band-like protrusion escape recesses 4k', 4k'. Accordingly, as shown in FIG. 37K, the right edge sections of the band-like protrusion sections 10a', 10a' reach positions immediately before the sliding contact rib 4k on the right side.

Then, as shown in FIG. 37K, the edge 4gs of the engaging protrusion 4g has reached a position at the time when it separates from the inclined wall 10ij or a position immediately before it separates. In addition, the right edge 4b' of the engaging claw 4b has reached a position at the time when it separates from the inclined wall 10qs of the rear wall reinforcing sheet metal member for unit 10 or a position immediately before it separates.

That is to say, the engaging claw 4g has moved away from the guiding hole for engaging protrusion cut and bent section 10j, and the engaging claw 4b has moved away from the guiding hole for engaging claw cut and bent section 10r.

After that, when the image pickup unit 2 is moved to the camera body 1 from the left to right direction, the band-like protrusion sections 10a', 10a' each climb over the sliding contact rib 4k closer to the sliding contact rib 4n, as shown in FIGS. 37H and 37I.

Thus, when the band-like protrusion sections 10a', 10a' of the rear wall reinforcing sheet metal member for unit 10 each climb over the sliding contact rib 4k closer to the sliding contact rib 4n, the gap H between the inflected section 4f of the engaging claw 4b and the bottom wall 10p of the rear part 2b increases. As a result, when the image pickup unit 2 is removed from the camera body 1, the bottom wall 10p of the rear part 2b is prevented as securely as possible from being somehow damaged by the inflected section 4f of the engaging claw 4b.

In the case of the embodiment 2, since the guiding groove 10q and the engaging protrusion guiding hole 10h of the image pickup unit 2 are opened to the side of the image-pickup-unit connector section 11, the image pickup unit 2 can be removed from the camera body 1 by sliding the image pickup unit 2 directly from the left to right direction in parallel to the camera body 1.

Therefore, according to the embodiment 2, the removal operation as well as the attachment operation can be further facilitated.

(Configuration of the Imaging Apparatus in which an Engaging Protrusion Guiding Hole is Formed in the Rear Wall Reinforcing Sheet Metal Member for Body 4 and the Engaging Protrusion 4g is Provided in the Rear Wall Reinforcing Sheet Metal Member for Unit 10)

In the embodiment described above, as shown in FIG. 37A, the engaging protrusion 4g is formed in the rear wall reinforcing sheet metal member for body 4 of the camera body 1 and the guiding hole for engaging protrusion 10h which guides the engaging protrusion 4g is formed in the rear wall reinforcing sheet metal member for unit 10 of the image pickup unit 2. However, as shown in FIG. 37O, even a configuration in which the engaging protrusion 4g is formed in the rear wall reinforcing sheet metal member for 10 of the image pickup unit 2 also achieves a similar effect.

Furthermore, in the embodiment, although the band-like protrusion section 10a' and the band-like protrusion escape recess 4k' are provided, they are not essential. If the band-like protrusion sections 10a', 10a' and the band-like protrusion escape recess 4k' are provided, a configuration may be such that the band-like protrusion sections 10a', 10a' are provided on the back wall section 1B of the camera body 1 and the band-like protrusion escape recess 4k' is provided in the rear part 1B Of the image pickup unit 2.

(Other Configuration 1)

In these embodiments described above, although the configuration is such that the guiding protrusion 4j is provided in the camera body and the guiding groove is provided in the image pickup unit 2, a configuration may be such that the guiding groove is provided in the camera body 1 and the guiding protrusion 4j is provided in the image pickup unit 2. Note that, in this case, the engaging claw 4b is formed in the image pickup unit 2.

In addition, in these embodiments, although the engaging plate section 10n, the plate spring 2k, and the guiding hole for engaging claw cut and bent section 10r are provided in the image pickup unit 2 and the engaging claw 4b is provided in the camera body 1, a configuration may be such that the engaging claw 4b is provided in the image pickup unit 2, the engaging plate section 10n, the plate spring 2k, and the guiding hole for engaging claw cut and bent section 10r are provided in the camera body 1.

Furthermore, in these embodiments, although the auxiliary fitting protrusions 14 are provided in the camera body 1 and the auxiliary fitting holes 22 are provided in the image pickup unit 2, a configuration may be such that the auxiliary fitting holes 22 are provided in the camera body 1 and the auxiliary fitting protrusions 14 are provided in the image pickup unit 2.

In addition, in these embodiments, each two of the guiding holes for engaging claw cut and bent sections 10r, guiding protrusions 4j, the engaging plate sections 10n, the guiding grooves, the auxiliary fitting protrusions 14, and the auxiliary fitting holes 22 are provided, and two biasing sections including the inclined elastic plate sections k5, k6 and the abutting plate section k7 are formed for one plate spring 2k. However, the number of these may be three or more.

In addition, in these embodiments, although the unlocking manipulating member 26 is configured so that the unlock button 26d (also referred to as an unlocking lever) turns with the spindle 27 as a supporting point, the unlock button 26d may be configured to be a pushbutton or sliding type.

Furthermore, in these embodiments, although the configuration is such that the image-pickup-unit connector section 11 protrudes from the left side surface 2c of the image pickup unit 2 and the camera-body connector section 12 is provided in the opening 52 formed on the side wall section 1C of the camera body 1, a configuration may be such that the opening 52 is provided on the left side surface 2c of the image pickup unit 2, the image-pickup-unit connector section 11 is placed in the opening 52, and the camera-body connector section 12 is protruded from the side wall section 1C of the camera body 1.

That is to say, the connector section may protrude from any one of the left side surface 2c of the image pickup unit 2 and the side wall section 1C of the camera body 1, and the opening may be provided in any other one of the left side surface 2c of the image pickup unit 2 and the side wall section 1C of the camera body 1.

In addition, if the engaging protrusion (angle controlling member) 4g is placed between the side wall section 1C and the biasing section with the image pickup unit 2 placed in the recess 1A of the camera body 1 and with the camera-body connector section 12 and the image-pickup-unit connector section 11 connected to each other, an angle around the direction (the Y direction) orthogonal to the first direction can be controlled even when the height of the engaging protrusion (angle controlling member) 4g is low.

In addition, even if the engaging protrusion (angle controlling member) 4g is placed at a position closer to the side wall section 1C than to the biasing section with the image pickup unit 2 placed in the recess 1A of the camera body 1 and with the camera-body connector section 12 and the image-pickupunit connector section 11 connected to each other, the engaging protrusion (angle controlling member) 4g can perform similar angle control.

If the engaging protrusion (angle controlling member) 4g is placed almost at the center of the camera-body connector section 12 when it is viewed in a direction perpendicular to the first direction (the X direction) in which the image pickup unit 2 moves toward or away from the side wall section 1C, with the image pickup unit 2 placed in the recess 1A of the camera body 1 and with the camera-body connector section 12 and the image pickup side connector section 11 connected to each other, the engaging protrusion (angle controlling member) 4g can control an angle around the first direction (the X direction) of the image pickup unit 2.

If the engaging protrusion (angle controlling member) 4g is placed almost at the center of the recess 1A when it is viewed in the direction (the Y direction) perpendicular to the first direction (the X direction) in which the image pickup unit 2 moves toward or away from the side wall section C, with the image pickup unit 2 placed in the recess 1A of the camera body 1 and with the camera-body connector section 12 and the image-pickup-unit connector section 11 connected to each other, the engaging protrusion (angle controlling member) 4g can further control an angle around the first direction (the X direction) of the image pickup unit 2.

When the biasing section includes a first biasing section and a second biasing section arranged at an interval in a direction perpendicular to the first direction (the X direction) in which the image pickup unit 2 moves toward or away from the side wall section 1C, and the engaging protrusion (angle controlling member) 4g is placed almost at the center between the first engaging claw 4b and the second engaging claw 4b when it is viewed in the direction (the Y direction) almost perpendicular to the first direction (the X direction), an angle around the first direction (the X direction) of the image pickup unit 2 can be further controlled even when a failure occurs in any one of engagement with the first engaging claw 4b and engagement with the second engaging claw 4b.

In a state where the guiding mechanism includes the camera-body guiding mechanism and the image-pickup-unit guiding mechanism, the image-pickup-unit guiding mechanism includes the guiding groove provided on the rear part 2b of the image pickup unit 2 and extending in a direction corresponding to the first direction, the camera-body guiding mechanism includes the guiding protrusion provided on the back wall section 1B of the camera body 1 and to be inserted in the guiding groove, the guide protrusion includes the first guiding protrusion and the second guiding protrusion arranged at an interval in a direction perpendicular to the first direction, the image pickup unit 2 is placed in the recess 1A of the camera body 1, and the camera-body connector section 12 and the image-pickup-unit connector section 11 are connected to each other, the engaging protrusion (angle controlling member) 4g is positioned between the first guiding protrusion and the second guiding protrusion when it is viewed in a direction perpendicular to the first direction.

(Other Configuration 2)

In the embodiments of the present invention described above, when the image pickup unit 2 is moved to the camera body 1 in the arrow F2 direction shown in FIG. 33 or in a direction opposite thereto, although the configuration is such that the rear part 2b (rear wall reinforcing sheet metal member for unit 10) of the image pickup unit 2 is caused to abut on the back wall section 1B (rear wall reinforcing sheet metal member for body 4) of the camera body 1 and to slide, a configuration may be such that the upper wall section 1D (upper wall reinforcing sheet metal member for body 5) is caused to abut on the upper surface 2d (surrounding wall 2x or upper surface wall reinforcing sheet metal member for unit 20) of the housing 2A of the image pickup unit 2 and to slide in the arrow F2 direction or in an direction opposite thereto.

With such a configuration, the upper wall section 1D (upper surface wall reinforcing sheet metal member for body 5) of the camera body 1 and the upper surface 2d (surrounding wall 2x or upper wall reinforcing sheet metal member for unit 20) of the housing 2A of the image pickup unit 2 function as a guiding mechanism which guides the image pickup unit 2 in the first direction.

Alternatively, the guiding protrusion 4j, the rectangular protrusion 4m and the engaging claw 4b may be provided on the upper wall section 1D of the camera body 1, and the guiding grove 10p', the notch wall 10b, the guiding groove 10q and the guiding hole for engaging claw cut and bent section 10r may be provided on the upper surface 2d of the housing 2A.

With such a configuration, the guiding protrusion 4j, the rectangular protrusion 4m and the engaging claw 4b which are provided on the upper wall section 1D of the camera body 1, the guiding grooves provided on the upper surface 2d of the image pickup unit 2, the notch wall 10b and the guiding hole for engaging claw cut and bent section 10r function as a guiding mechanism which guides the image pickup unit 2 in the first direction.

In addition, on the contrary, the guide protrusion 4j, the rectangular protrusion 4m and the engaging claw 4b may be provided on the upper surface 2b of the image pickup unit 2, and the guiding grooves, the notch wall 10b and the guiding hole for engaging claw cut and bent section 10r may be provided on the upper wall section 1D of the camera body 1.

With such a configuration, the guiding protrusion 4j, the rectangular protrusion 4m and the engaging claw 4b which are provided on the upper surface 2d of the image pickup unit 2, and the guiding grooves, the notch wall 10b and the guiding hole for engaging claw cut and bent section 104 which are provided on the upper wall section 1D of the camera body 1 function as a guiding mechanism which guides the image pickup unit 2 in the first direction.

Thus, rattling in the up-down direction between the image pickup unit 2 and the camera body 1 can be further controlled by arranging a part of the guiding mechanism on the upper surface section 1D of the camera body 1 and the upper surface 2d of the image pickup unit 2.

Furthermore, the guiding mechanisms may be provided on both back wall section 1B and the upper wall section 1D.

(Other Configuration 3)

Although the embodiments of the present invention have been described above, the present invention is not limited to them. As shown in FIGS. 38 to 41, for example, a configuration may be such that the hot shoe section 5t to which the strobe device and the electronic viewfinder 1g can be attached, the electronic viewfinder connection terminal 5s, the popup type strobe light emitting device 5x, and a mode dial switch 5h are provided on an upper surface if of the upper wall section 1D of the camera body 1. In addition, the electronic viewfinder connection terminal 5s shown in FIG. 38 includes a female type connector. The electronic viewfinder connection terminal 5s' as the male type connector shown in FIG. 40 is fitted into the electronic viewfinder connection terminal 5s.

Figure 39:
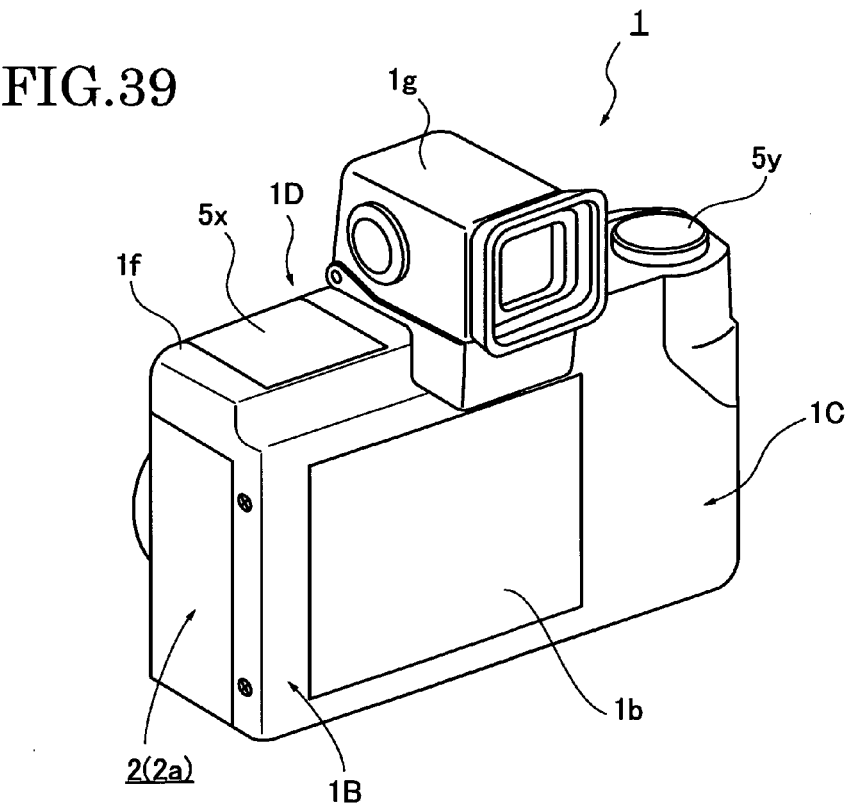
FIG. 39 is an external view showing a state where an electronic viewfinder is attached to the camera body, as viewed from the rear side.
Figure 40:
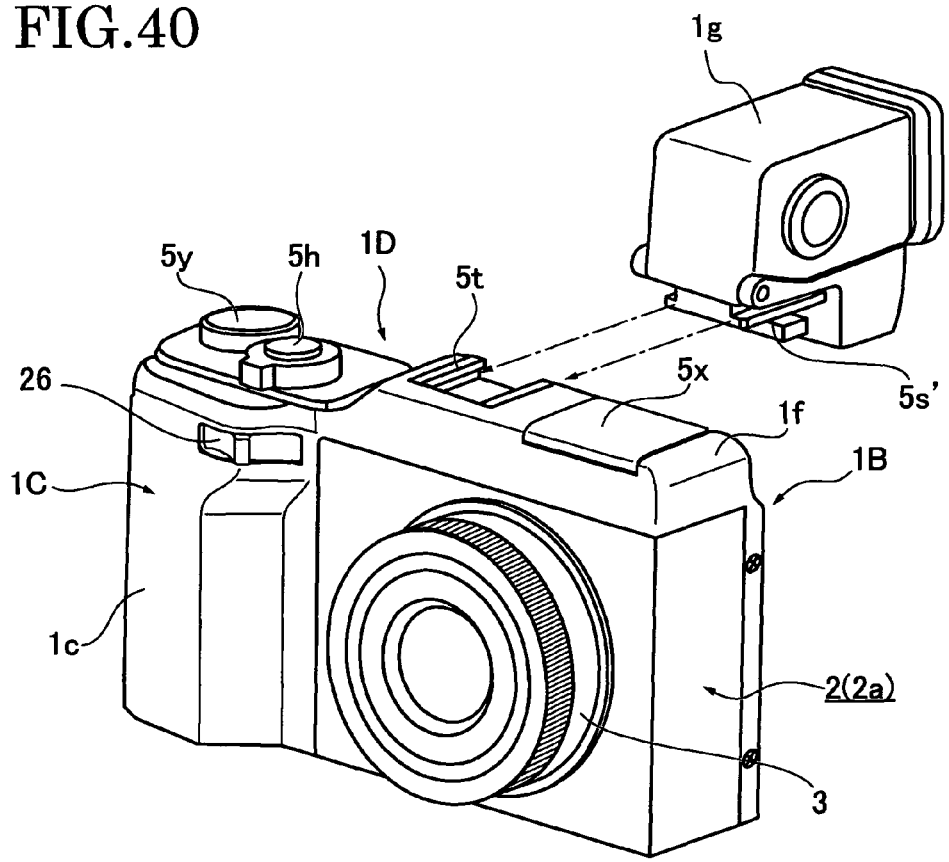
FIG. 40 is an external view showing a state before an electronic viewfinder is attached to the camera body, as viewed from the front side.
Figure 41:
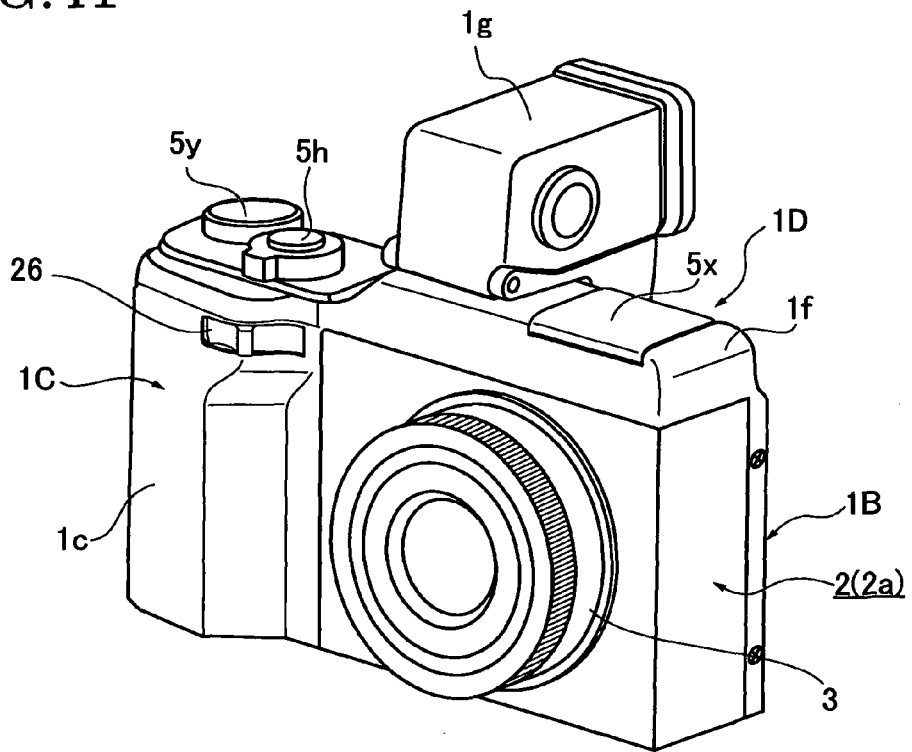
FIG. 41 is an external view showing a state where an electronic viewfinder is attached to the camera body, as viewed from the front side.

In addition, in FIGS. 38 to 41, FIG. 38 shows a state before the electronic viewfinder 1g is attached to the camera body 1 when the camera body 1 is viewed from the rear side, FIG. 39 shows a state where the electronic viewfinder 1g is attached to the camera body 1 when the camera body 1 is viewed from the rear side, FIG. 40 shows a state before the electronic viewfinder 1g is attached to the camera body 1 when the camera body 1 is viewed from the front face side, and FIG. 41 shows a state where the electronic viewfinder 1g is attached to the camera body 1 when the camera body 1 is viewed from the front face.

Although the embodiments have been described above, the imaging apparatus according to the present invention can be formed by combining the configurations of these embodiments as appropriate.

[Effect of the Invention]

According to the present invention, when an image pickup unit is attached to or detached from a camera body, a connection of the camera body and the image pickup unit can be performed accurately and smoothly.

Although the present invention has been described in terms of exemplary embodiments, it is not limited thereto. It should be appreciated that variations may be made in the embodiments described by persons skilled in the art without departing from the scope of the present invention as defined by the following claims.

CROSS REFERENCE TO RELATED APPLICATIONS

The present application is based on and claims priority from Japanese Application Numbers, 2009-254029 filed on Nov. 5, 2009, 2009-240596 filed on Oct. 19, 2009, and 2009-211446 filed on Sep. 14, 2009 the disclosure of which is hereby incorporated by reference herein in its entirety.

The invention claimed is:

1. A camera body comprising:
a recess to which an image pickup unit is detachably attached to be placed therein, wherein
the image pickup unit includes an optical system configured to guide light incoming from a subject, an image pickup device configured to convert a subject image guided by the optical system into an electrical signal, an image-pickup-unit connector section configured to perform communication with outside, and a housing configured to house the optical system, the image pickup device, and the image-pickup-unit connector section,
the recess includes three wall sections; one of the three wall sections being a back wall section facing a rear of the housing of the image pickup unit when the image pickup unit is placed in the recess, another one of the three walls being a side wall section facing a side surface of the housing of the image pickup unit when the image pickup unit is placed in the recess and including a camera-body connector section to be connected to the image-pickup-unit connector section to perform communication,
the back wall section is provided with a controlling member,
a rear of the image pickup unit is provided with an insertion opening into which the controlling member is configured to be inserted and a controlling member abutting section configured to allow the controlling member to abut thereon, and
when the image pickup unit is attached to the recess, the image-pickup-unit connector section and the camera-body connector section are connected to each other when the controlling member is inserted into the insertion opening, and the image-pickup-unit connector section and the camera-body connector section are not connected to each other when the controlling member abuts on the controlling member abutting section.

2. The camera body according to claim 1, wherein the controlling member is configured to control an angle between the image-pickup-unit connector section and the camera-body connector section such that the image-pickup-unit connector section and the camera-body connector section are connected to each other at an appropriate angle,
when the controlling member is inserted into the insertion opening, the rear of the image pickup unit and the back wall section of the camera body are configured to abut on each other in parallel to connect the image-pickup-unit connector section and the camera-body connector section are connected to each other as the image pickup unit is moved in a direction toward the side wall section,
when the controlling member abuts on the controlling member abutting section, the rear of the image pickup unit is configured to not abut in parallel on the back wall section of the camera body, and the image-pickup-unit connector section and the camera-body connector section are not connected to each other.

3. The camera body according to claim 1, wherein
the side wall section is provided with an opening,
the side surface of the housing has a protrusion section protruding from the side surface of the housing,
the camera-body connector section is placed in the opening of the side wall section, and the image-pickup-unit connector section is placed in the protrusion section of the housing, and
the camera-body connector section and the image-pickup-unit connector section are connected to each other with the protrusion section fitted into the opening.

4. The camera body according to claim 1, wherein
the side wall section is provided with a protrusion section protruding from the side wall section,
the side surface of the housing has an opening,
the camera-body connector section is placed in the protrusion section of the side wall section, and the image-pickup-unit connector section is placed in the opening of the housing, and
the camera-body connector section and the image-pickup-unit connector section are connected to each other with the protrusion section fitted into the opening.

5. The camera body according to claim 1, further comprising a biasing section configured to bias the image pickup unit to the back wall section of the camera body with the image pickup unit attached to the camera body.

6. The camera body according to claim 5, wherein the biasing section includes
an engaging claw formed in any one of the back wall section of the camera body and the rear of the image pickup unit,
an engaging plate section which is formed on the other one of the back wall section of the camera body and the rear of the image pickup unit and which faces the engaging claw with the image pickup unit attached to the camera body, and
a biasing spring which is provided on a surface of the engaging plate section facing the engaging claw and which is engaged with the engaging claw and biases the image pickup unit to the back wall section of the camera body.

7. The camera body according to claim 6, wherein
the biasing section includes a first biasing section and a second biasing section which are arranged at an interval in a direction perpendicular to a first direction in which the image pickup unit moves toward or away from the side wall section, and the controlling member is placed at the center between the first biasing section and the second biasing section as viewed in a direction perpendicular to the first direction.

8. The camera body according to claim 1, wherein the back wall section of the camera body and the rear of the image pickup unit are each provided with a guiding mechanism which controls a positional relationship of the camera-body connector section with respect to the image-pickup-unit connector section and which guides the image pickup unit in a first direction in which the image pickup unit moves toward or away from the side wall section.

9. The camera body according to claim 8, wherein
the guiding mechanism includes a camera-body guiding mechanism and an image-pickup-unit guiding mechanism,
the image-pickup-unit guiding mechanism includes a guiding groove which is provided on the rear of the image pickup unit and extends in a direction corresponding to the first direction,
the camera-body guiding mechanism includes a guide protrusion which is provided on the back wall section of the camera body and is to be inserted into the guiding groove,
the guiding protrusion includes a first guiding protrusion and a second guiding protrusion which are arranged at an interval in a direction perpendicular to the first direction, and
in a state where the image pickup unit is placed in the recess of the camera body and the camera-body connector section and the image-pickup-unit connector section are connected to each other, the controlling member is placed between the first guiding protrusion and the second guiding protrusion as viewed in a direction perpendicular to the first direction.

10. An image pickup unit to be detachably attached and placed in a camera body including a camera-body connector section which performs communications with the image-pickup-unit connector section, the image pickup unit comprising:
an optical system configured to guide light incoming from a subject;
an image pickup device configured to convert a subject image guided by the optical system into an electrical signal;
an image-pickup unit connector section configured to perform communication with outside and a housing configured to house the optical system, the image pickup device, and the image-pickup-unit connector section, wherein
the housing is configured to be placed in a recess of the camera body, the recess including three wall sections; one of the three wall sections being a back wall section of the camera body facing the rear of the housing, another one of the three wall sections being a side wall section of the camera body facing a side surface of the housing when the image pickup unit is placed in the recess, when the housing is placed in the recess,
the rear of the housing is provided with a controlling member,
the back wall section of the camera body is provided with an insertion opening into which the controlling member is configured to be inserted and a controlling member abutting section configured to allow the controlling member to abut thereon, and
when the housing is attached to the recess of the camera body, the image-pickup-unit connector section and the camera-body connector section are connected to each other when the controlling member is inserted into the insertion opening, and the image-pickup-unit connector section and the camera-body connector section are not connected to each other when the controlling member abuts on the controlling member abutting section.

11. The image pickup unit according to claim 10, wherein
the controlling member is configured to control an angle between the image-pickup-unit connector section and the camera-body connector section such that the image-pickup-unit connector section and the camera-body connector section are connected to each other at an appropriate angle,
when the controlling member is inserted into the insertion opening, the rear of the image pickup unit and the back wall section of the camera body are configured to abut on each other in parallel to connect the image-pickup-unit connector section to the camera-body connector section as the image pickup unit is moved in a direction toward the side wall section, and
when the controlling member abuts on the controlling member abutting section, the rear of the image pickup unit is configured to not abut in parallel on the back wall section of the camera body, and the image-pickup-unit connector section and the camera-body connector section are not connected to each other.

12. The image pickup unit according to claim 10, wherein
the side wall section is provided with an opening,
the side surface of the housing has a protrusion section protruding from the side surface of the housing,
the image-pickup-unit connector section is placed in the protrusion section of the housing, and the camera-body connector section is placed in the opening of the side wall section, and
the camera-body connector section is connected to the image-pickup-unit connector section with the protrusion section fitted into the opening.

13. The image pickup unit according to claim 10, wherein
the side wall section is provided with a protrusion section protruding from the side wall section,
the side surface of the housing has an opening,
the image-pickup-unit connector section is placed in the opening of the housing, and the camera-body connector section is placed in the protrusion section of the side wall section, and
the camera-body connector section is connected to the image-pickup-unit connector section with the protrusion section fitted into the opening.

14. An imaging apparatus comprising:
an image pickup unit having an optical system configured to guide light incoming from a subject;
an image pickup device configured to convert a subject image guided by the optical system into an electrical signal; and
an image-pickup-unit connector section configured to perform communications with outside; and
a camera body including a recess to which the image pickup unit is detachably attached to be placed therein, wherein
the recess of the camera body includes three wall sections; one of the three wall sections being a back wall section facing a rear of the image pickup unit when the image pickup unit is placed in the recess, another one of the three wall sections being a side wall section facing a side surface of the image pickup unit when the image pickup unit is placed in the recess, the side wall section of the camera body is provided with a camera-body connector section which is connected to the image-pickup-unit connector section and performs communications, a controlling member is provided in one of the back wall section of the camera body and the rear of the image pickup unit, the other one of the back wall section of the camera body and the rear of the image pickup unit is provided with an insertion opening into which the controlling member is to be inserted and a controlling member abutting section configured to allow the controlling member to abut thereon, and when the image pickup unit is attached to the recess of the camera body, the image-pickup-unit connector section and the camera-body connector section are connected to each other when the controlling member is inserted into the insertion opening, and the image-pickup-unit connector section and the camera-body connector section are not connected to each other when the controlling member abuts on the controlling member abutting section.

15. The imaging apparatus according to claim 14, wherein the controlling member is configured to control an angle between the image-pickup-unit connector section and the camera-body connector section such that the image-pickup-unit connector section and the camera-body connector section are connected to each other at an appropriate angle, when the controlling member is inserted into the insertion opening, the rear of the image pickup unit and the back wall section of the camera body abut on each other in parallel, and the image-pickup-unit connector section and the camera-body connector section are connected to each other as the image pickup unit is moved in a direction toward the side wall section, and when the controlling member abuts on the controlling member abutting section, the rear of the image pickup unit and the back wall section of the camera body do not abut on each other in parallel, and the image-pickup-unit connector section and the camera-body connector section are not connected to each other.

16. The imaging apparatus according to claim 15, wherein the camera body includes a biasing section configured to bias the image pickup unit to the back wall section of the camera body with the image pickup unit attached to the camera body, and the biasing section includes:

an engaging claw formed in one of the back wall section of the camera body and the rear of the image pickup unit;

an engaging plate section which is formed on the other one of the back wall section of the camera body and the rear of the image pickup unit and which faces the engaging claw with the image pickup unit attached to the camera body; and a biasing spring which is provided on a surface of the engaging plate section facing the engaging claw and which is engaged with the engaging claw and biases the image pickup unit to the back wall section of the camera body.

17. The imaging apparatus according to claim 16, wherein the biasing section includes a first biasing section and a second biasing section which are arranged at an interval in a direction perpendicular to a first direction in which the image pickup unit moves toward or away from the side wall section, and the controlling member is placed at the center between the first biasing section and the second biasing section as viewed in a direction perpendicular to the first direction.

18. The imaging apparatus according to claim 14, wherein one of the back wall section of the camera body and the rear of the image pickup unit is provided with a guiding mechanism which controls a positional relationship of the camera-body connector section with respect to the image-pickup-unit connector section and which guides the image pickup unit in a first direction in which the image pickup unit moves toward or away from the side wall section.

19. The imaging apparatus according to claim 14, wherein the guiding mechanism includes a camera-body guiding mechanism and an image-pickup-unit guiding mechanism, the image-pickup-unit guiding mechanism includes a guiding groove which is provided on the rear of the image pickup unit and extends in a direction corresponding to the first direction, the camera-body guiding mechanism includes a guide protrusion which is provided on the back wall section of the camera body and is to be inserted into the guiding groove, the guiding protrusion includes a first guiding protrusion and a second guiding protrusion which are arranged at an interval in a direction perpendicular to the first direction, and in a state where the image pickup unit is placed in the recess of the camera body and the camera-body connector section and the image-pickup-unit connector section are connected to each other, the controlling member is placed between the first guiding protrusion and the second guiding protrusion when viewed in a direction perpendicular to the first direction.

20. The imaging apparatus according to claim 14, wherein the image pickup unit is one of a first image pickup unit having a first optical system, a first image pickup device, and a first image-pickup-side connector section or a second image pickup unit having a second optical system, a second image pickup device, and a second image-pickup-side connector section, the first image pickup unit and the second image pickup unit are detachably attachable to the recess of the camera body, and the first image pickup device and the second image pickup device are different in size, and the first image pickup unit and the second image pickup unit are different in size.

* * * * *